(12) United States Patent
Chen

(10) Patent No.: US 9,587,804 B2
(45) Date of Patent: *Mar. 7, 2017

(54) LIGHT CONTROL SYSTEMS AND METHODS

(71) Applicant: Chia Ming Chen, Cambridge, MA (US)

(72) Inventor: Chia Ming Chen, Cambridge, MA (US)

( * ) Notice: Subject to any disclaimer, the term of this patent is extended or adjusted under 35 U.S.C. 154(b) by 555 days.

This patent is subject to a terminal disclaimer.

(21) Appl. No.: 13/826,177

(22) Filed: Mar. 14, 2013

(65) Prior Publication Data

US 2013/0293722 A1 Nov. 7, 2013

Related U.S. Application Data

(60) Provisional application No. 61/643,535, filed on May 7, 2012, provisional application No. 61/684,336, filed on
(Continued)

(51) Int. Cl.
*F21V 14/02* (2006.01)
*A63F 13/02* (2006.01)
(Continued)

(52) U.S. Cl.
CPC ............. *F21V 14/02* (2013.01); *A63F 13/06* (2013.01); *A63F 13/213* (2014.09); *F21V 14/04* (2013.01);
(Continued)

(58) Field of Classification Search
CPC .......... F21V 14/02; F21V 14/04; F21V 14/06; F21V 23/0471; H04N 5/332; H04N 5/2256;
(Continued)

(56) References Cited

U.S. PATENT DOCUMENTS 4,843,522 A 6/1989 Rosenberg
4,985,651 A 1/1991 Chitayat
(Continued)

FOREIGN PATENT DOCUMENTS

EP 0903608 3/1999
GB 2421074 6/2006
(Continued)

OTHER PUBLICATIONS

Ashok et a. "Challenge Mobile Optical Networks Through Visual MIMO". MobiCom'10. Sep. 2010, pp. 1-8.*
(Continued)

*Primary Examiner* — Christopher S Kelley
*Assistant Examiner* — Zhihan Zhou
(74) *Attorney, Agent, or Firm* — Onello & Mello, LLP

(57) ABSTRACT

Provided is a light-emitting device control system, comprising a beam steering mechanism that directs a beam of light at a first surface location, wherein an illumination region is formed at the first surface location in response to the directed beam of light, a sensor that recognizes a hand gesture at the illumination region; a processor that converts data related to the hand gesture into a command signal, and a controller that instructs the beam steering mechanism to move the illumination region to a second surface location in response to the command signal corresponding to the hand gesture.

36 Claims, 56 Drawing Sheets

Related U.S. Application Data on Aug. 17, 2012, provisional application No. 61/760,966, filed on Feb. 5, 2013, provisional application No. 61/696,518, filed on Sep. 4, 2012.

(51) Int. Cl.

| | | |
|---|---|---|
| H04N 5/33 | (2006.01) | |
| A63F 13/213 | (2014.01) | |
| A63F 13/20 | (2014.01) | |
| G06K 9/00 | (2006.01) | |
| F21V 14/04 | (2006.01) | |
| F21V 14/06 | (2006.01) | |
| F21V 23/04 | (2006.01) | |
| H04N 5/225 | (2006.01) | |

(52) U.S. Cl.
CPC .......... *F21V 14/06* (2013.01); *F21V 23/0471* (2013.01); *G06K 9/00355* (2013.01); *A63F 2300/1093* (2013.01); *A63F 2300/6045* (2013.01); *H04N 5/2256* (2013.01); *H04N 5/332* (2013.01)

(58) Field of Classification Search
CPC .. A63F 13/02; A63F 13/06; A63F 2300/1093; A63F 2300/6045; G06K 9/00355
USPC ............ 348/164; 362/235, 276, 555; 463/36
See application file for complete search history.

(56) References Cited

U.S. PATENT DOCUMENTS

| | | | |
|---|---|---|---|
| 8,139,935 | B2 | 3/2012 | Pace et al. |
| 8,455,830 | B2 | 6/2013 | Westaway |
| 8,854,433 | B1 | 10/2014 | Rafii |
| 9,345,106 | B2 | 5/2016 | Jonsson |
| 2003/0067773 | A1 | 4/2003 | Marshall et al. |
| 2005/0029458 | A1* | 2/2005 | Geng et al. ................. 250/347 |
| 2005/0087601 | A1* | 4/2005 | Gerst et al. ................. 235/455 |
| 2005/0228366 | A1 | 10/2005 | Kessler et al. |
| 2006/0044800 | A1 | 3/2006 | Reime |
| 2006/0119865 | A1* | 6/2006 | Hoyt et al. ................. 356/625 |
| 2007/0023661 | A1* | 2/2007 | Wagner et al. ........... 250/338.1 |
| 2008/0215391 | A1 | 9/2008 | Dowling et al. |
| 2008/0256494 | A1 | 10/2008 | Greenfield |
| 2008/0292320 | A1 | 11/2008 | Pederson |
| 2008/0294017 | A1* | 11/2008 | Gobeyn et al. ............. 600/301 |
| 2008/0294315 | A1* | 11/2008 | Breed ........................... 701/49 |
| 2009/0027682 | A1* | 1/2009 | Hebert et al. ............... 356/445 |
| 2009/0040299 | A1 | 2/2009 | Harrison et al. |
| 2009/0042695 | A1 | 2/2009 | Chien et al. |
| 2009/0103780 | A1 | 4/2009 | Nishihara et al. |
| 2009/0278915 | A1 | 11/2009 | Kramer et al. |
| 2010/0066821 | A1* | 3/2010 | Rosener et al. .............. 348/77 |
| 2010/0128109 | A1* | 5/2010 | Banks ........................... 348/46 |
| 2010/0151946 | A1 | 6/2010 | Wilson et al. |
| 2010/0176270 | A1* | 7/2010 | Lau et al. .................. 250/203.2 |
| 2010/0200753 | A1* | 8/2010 | Westaway ................. 250/338.1 |
| 2010/0277074 | A1 | 11/2010 | Van Endert et al. |
| 2010/0309370 | A1 | 12/2010 | Ueshima et al. |
| 2011/0102763 | A1* | 5/2011 | Brown et al. ............... 356/4.01 |
| 2011/0103063 | A1 | 5/2011 | Jurik |
| 2011/0211754 | A1* | 9/2011 | Litvak ............... G06K 9/00375 382/165 |
| 2011/0221599 | A1* | 9/2011 | Hogasten ..................... 340/632 |
| 2011/0242042 | A1 | 10/2011 | Xu |
| 2011/0243380 | A1* | 10/2011 | Forutanpour ........... G06F 3/017 382/103 |
| 2011/0301934 | A1 | 12/2011 | Tardif |
| 2012/0075463 | A1* | 3/2012 | Chen et al. .................. 348/135 |
| 2012/0146903 | A1 | 6/2012 | Arihara et al. |
| 2012/0194083 | A1 | 8/2012 | Henig et al. |
| 2012/0320092 | A1 | 12/2012 | Shin et al. |
| 2013/0063042 | A1 | 3/2013 | Bora et al. |
| 2013/0101276 | A1* | 4/2013 | Keller et al. ................. 396/55 |
| 2013/0120238 | A1 | 5/2013 | Spaulding et al. |
| 2013/0128334 | A1 | 5/2013 | Stephen |
| 2013/0131836 | A1* | 5/2013 | Katz et al. .................. 700/12 |
| 2013/0193315 | A1* | 8/2013 | Shemesh .................. 250/226 |
| 2013/0208481 | A1 | 8/2013 | Sooferian |
| 2013/0293722 | A1 | 11/2013 | Chen |
| 2014/0225526 | A1 | 8/2014 | Jonsson |
| 2015/0002046 | A1 | 1/2015 | Schlangen |
| 2015/0002391 | A1 | 1/2015 | Chen |
| 2015/0023019 | A1 | 1/2015 | Chen |
| 2015/0049062 | A1 | 2/2015 | Kim et al. |

FOREIGN PATENT DOCUMENTS

| | | |
|---|---|---|
| IL | WO2012001677 A2 * | 1/2012 |
| JP | 2004303685 | 10/2004 |
| JP | 2009153583 | 7/2009 |
| JP | 2011037386 | 2/2011 |
| JP | 2012043722 | 3/2012 |
| KR | 1019980080509 | 11/1998 |
| KR | 1020040037219 | 5/2004 |
| WO | 03031923 | 4/2003 |
| WO | 2010138741 | 12/2010 |
| WO | 2010146446 | 12/2010 |
| WO | 2013076606 | 5/2013 |
| WO | 2013085600 | 6/2013 |

OTHER PUBLICATIONS

Kodaira. "JP 2011-037386 Translation". Feb. 2011.*
International Search Report dated Sep. 23, 2013, issued in corresponding International Application No. PCT/US2013/039666.
International Search Report and Written Opinion dated Nov. 7, 2014, issued in corresponding International Application No. PCT/US14/44643.
International Search Report and Written Opinion dated Oct. 27, 2014, issued in corresponding International Application No. PCT/US14/46807.
International Search Report and the Written Opinion dated Oct. 8, 2015, issued in corresponding International Patent Application No. PCT/US15/28163.
Borah et al.: A review of communication-oriented optical wireless systems. EURASIP Journal on Wireless Communications and Networking 2012, 2012:91.
Elgala et al.: OFDM Visible Light Wireless Communication Based on White LEDs. IEEE 2007, pp. 2185-2189.
Elgala et al.: Indoor Optical Wireless Communication: Potential and State-of-the-Art. IEEE Communications Magazine, Sep. 2011, pp. 56-62.
Herbst et al.: Basics of 3D Digital Image Correlation. Dantec Dynamics Application Note—T-Q-400-Basics-3DCORR-002a-EN.
Kumar et al.: Visible Light Communication Systems Conception and VIDAS. IETE Technical Review, vol. 25 Issue 6, Nov.-Dec. 2008, pp. 359-367.
Sun: Fast Stereo Matching Using Rectangular Subregioning and 3D Maximum-Surface Techniques. International Journal of Computer Vision, vol. 46, No. 1/2/3, pp. 99-117, May 2002.
Wang, et al.: 12.5 Gbps Indoor Optical Wireless Communication System with Single Channel Imaging Receiver, ECOC Technical Digest 2011 OSA.
Wu, et al.: Modulation based cells distribution for visible light communication. Optics Express, vol. 20, No. 22, Oct. 2012.
Office Action issued Jul. 2, 2016 issued in U.S. Appl. No. 14/318,019.
Final Office Action issued on Jan. 4, 2016 in U.S. Appl. No. 14/318,019.
Office Action issued on Feb. 5, 2016 in U.S. Appl. No. 14/048,505.
Extended European Search Report dated Nov. 18, 2016 issued in corresponding European Application No. 13787647.0.

* cited by examiner

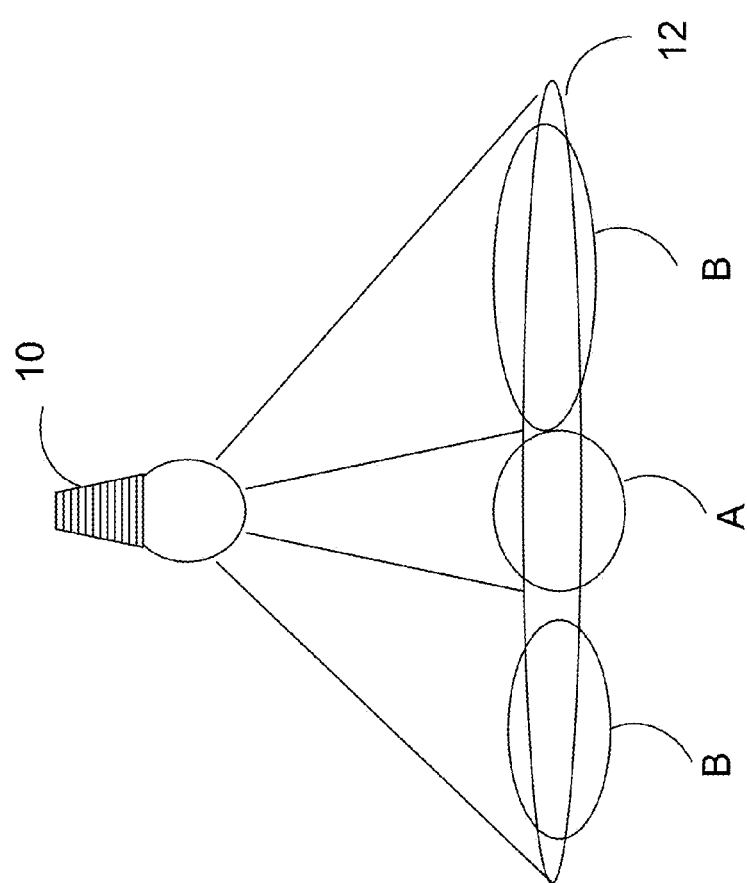

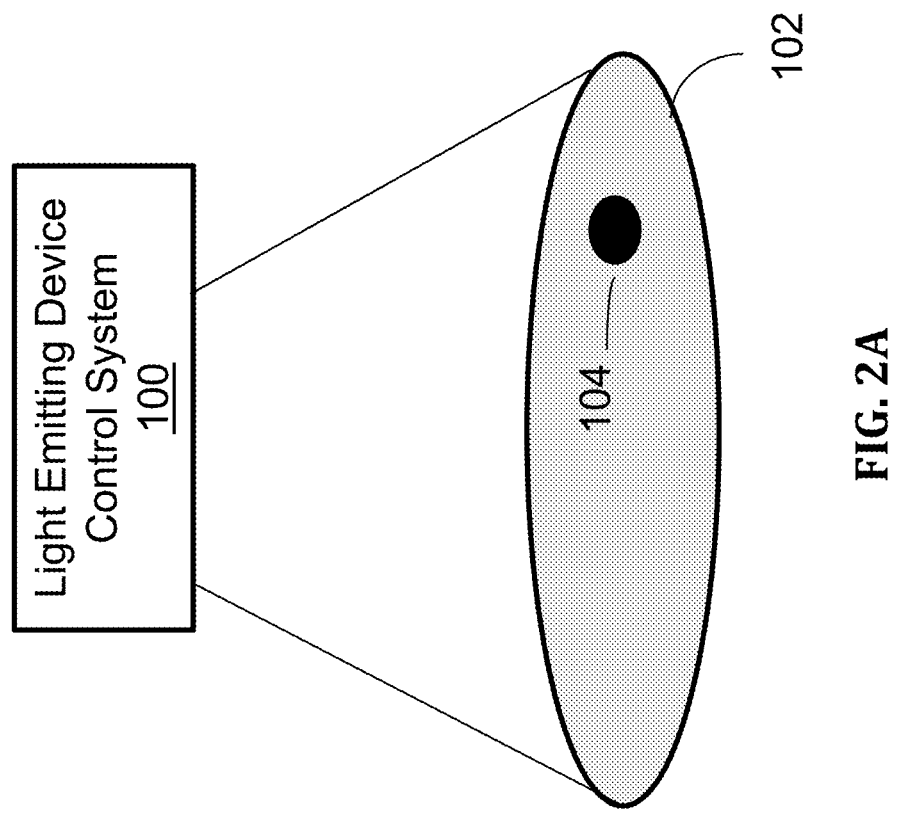

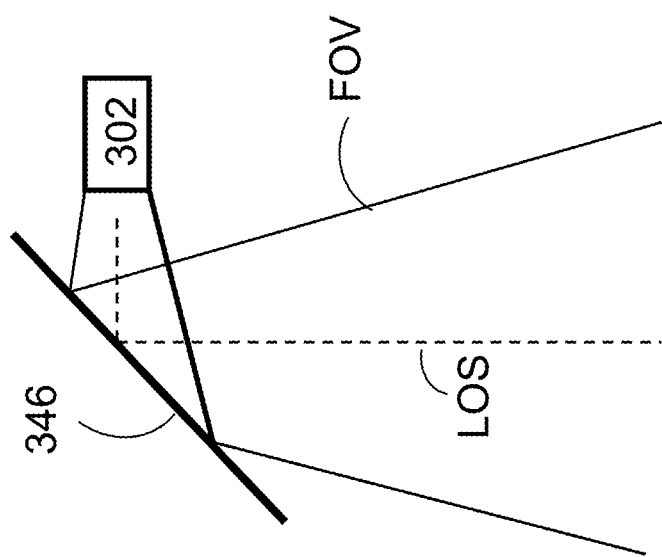

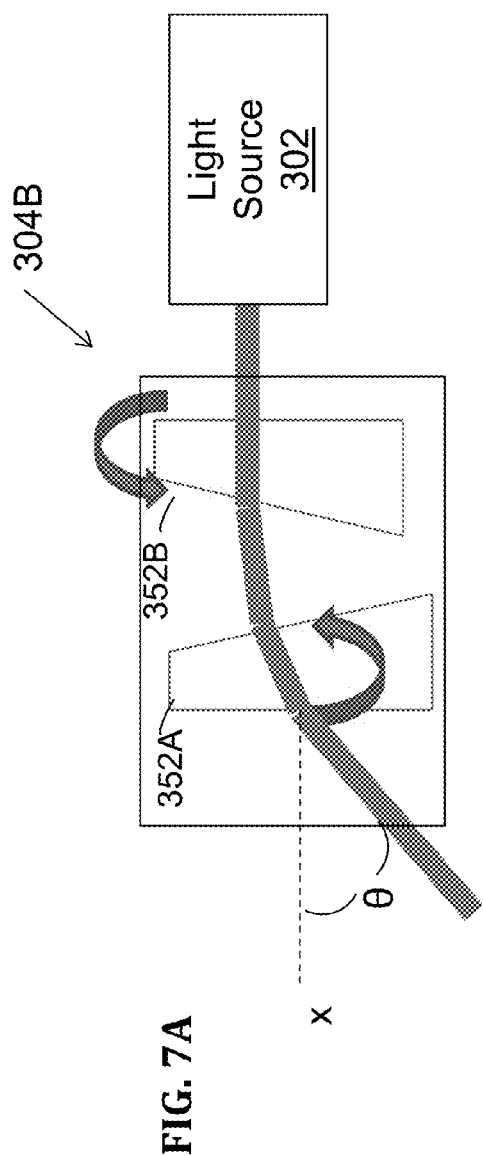
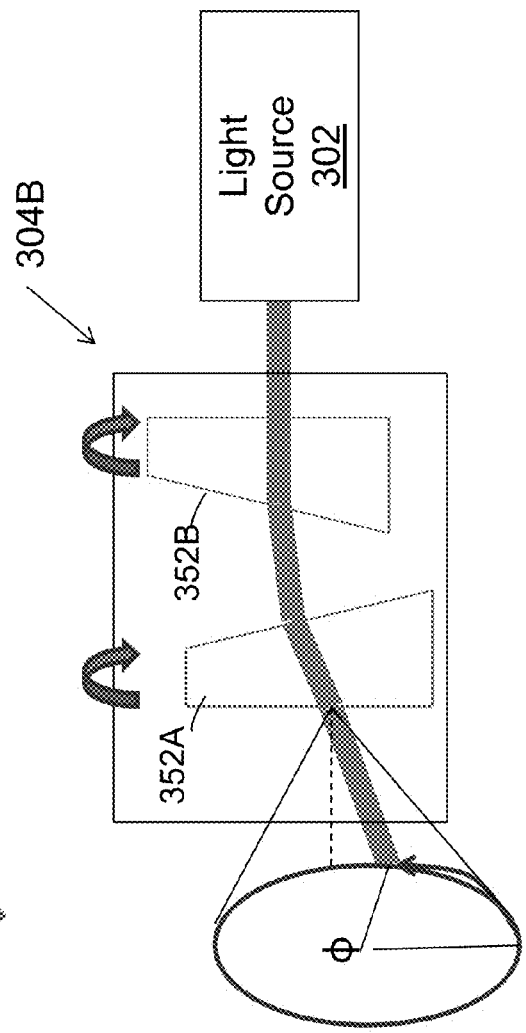
FIG. 7A
FIG. 7B

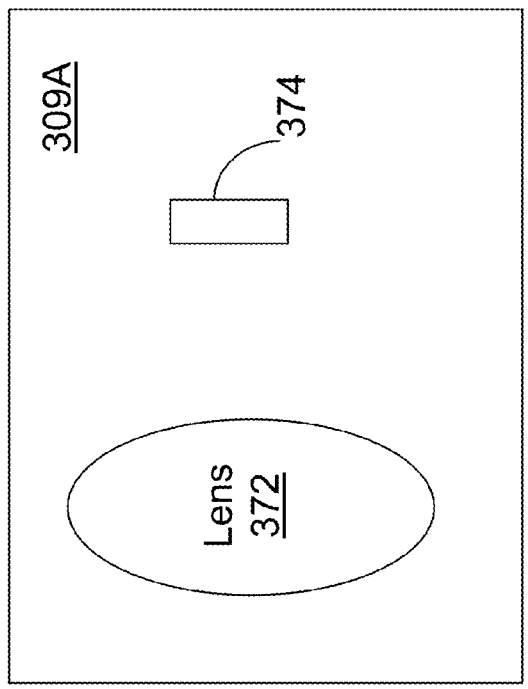

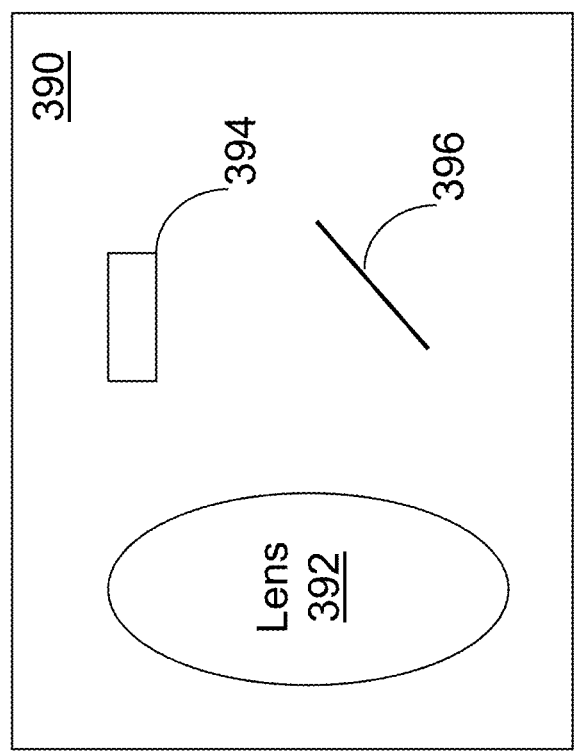

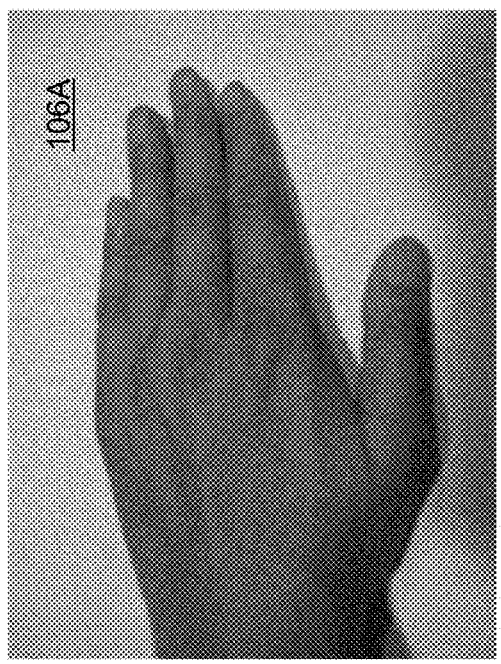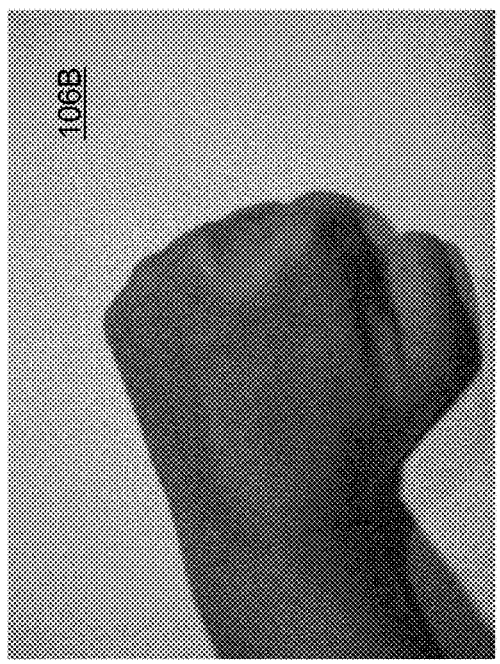
FIG. 11A
FIG. 11B

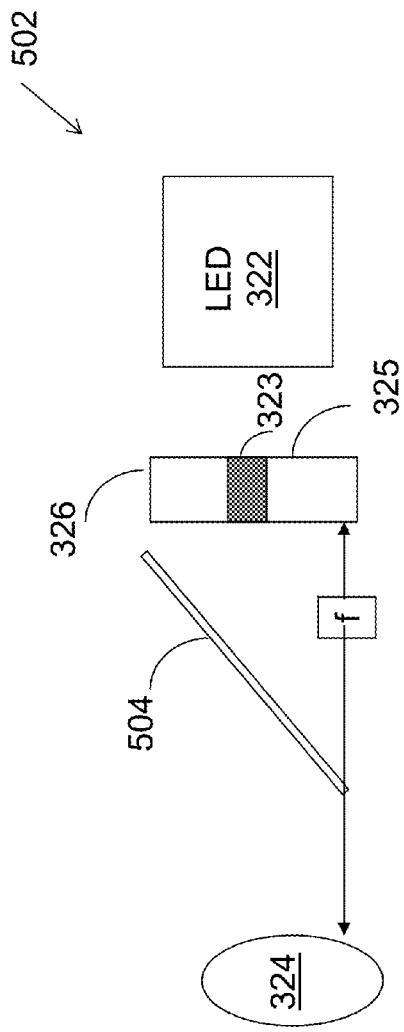
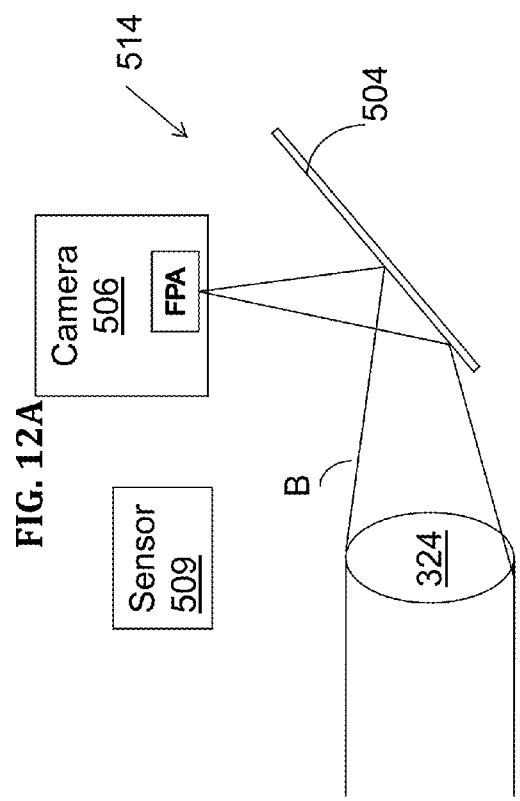
FIG. 12A
FIG. 12B

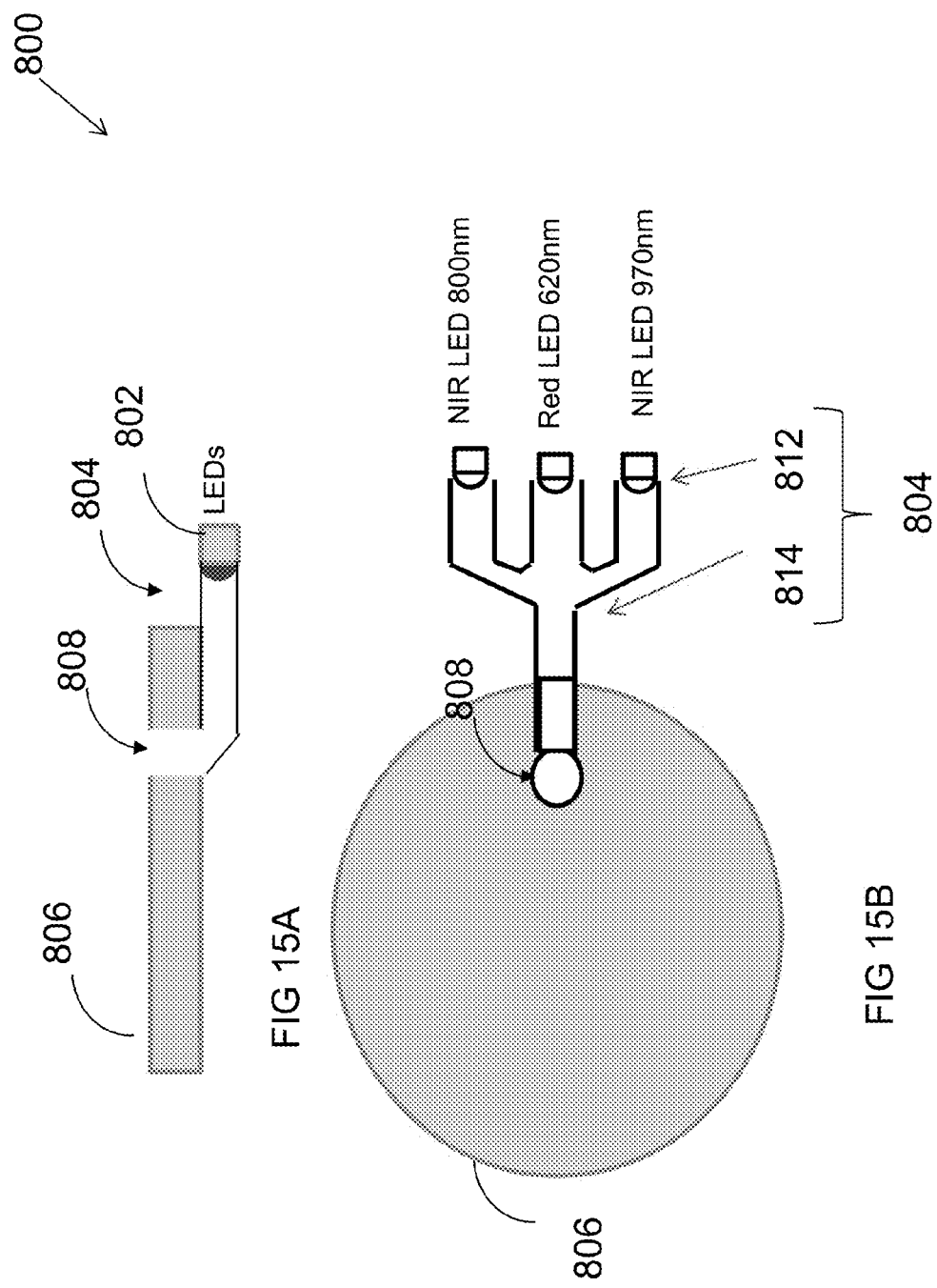

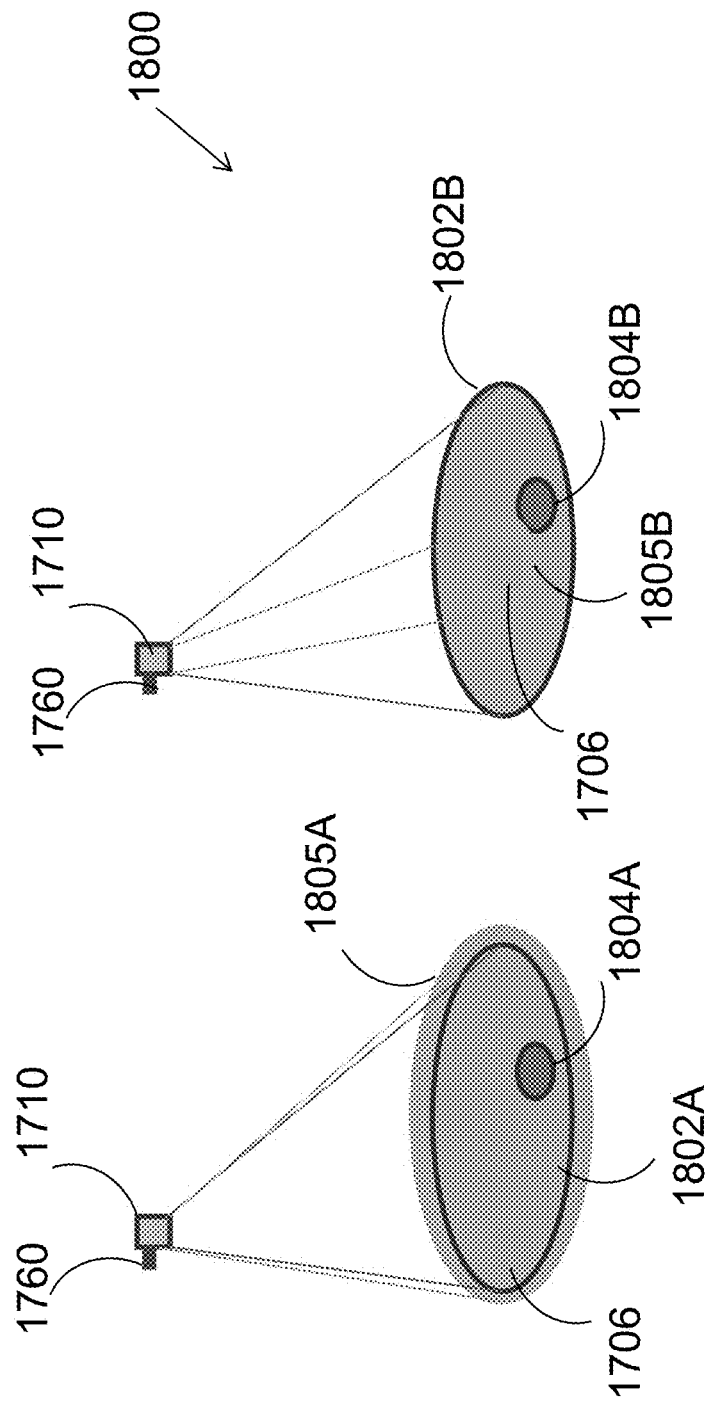

LIGHT CONTROL SYSTEMS AND METHODS

RELATED APPLICATIONS

This application claims the benefit of U.S. Provisional Patent Application No. 61/643,535 filed on May 7, 2012, U.S. Provisional Patent Application No. 61/684,336 filed on Aug. 17, 2012, U.S. Provisional Patent Application No. 61/760,966 filed on Feb. 5, 2013, and U.S. Provisional Patent Application No. 61/696,518 filed on Sep. 4, 2012, the content of each of which is incorporated herein by reference in its entirety.

TECHNICAL FIELD

The present inventive concepts generally relate to the field of light-emitting devices, and more particularly, to systems and methods for employing and controlling the output of one or more light-emitting devices.

BACKGROUND

A typical light source such as a lamp or the like emits electromagnetic radiation in the visible spectrum. Light sources are well-known for providing a large illumination angle (120°~180° cone angle). In addition, the brightest light spot provided by an emitting light source is typically positioned generally directly below the light source, which has the shortest distance to the source. The bright spot is fixed. Thus, in order to take advantage of the brightest region of the light spot, a user must physically move his position relative to the bright spot.

SUMMARY

In one aspect, provided is a light-emitting device control system, comprising: a beam steering mechanism that directs a beam of light at a first surface location, wherein an illumination region is formed at the first surface location in response to the directed beam of light; a sensor that recognizes a hand gesture at the illumination region; a processor that converts data related to the hand gesture into a command signal; and a controller that instructs the beam steering mechanism to move the illumination region to a second surface location in response to the command signal corresponding to the hand gesture.

In an embodiment, the system further comprises a light source module that outputs the beam of light to the beam steering mechanism for directing the beam of light to at least one of the first surface location and the second surface location.

In an embodiment, the light source module includes at least one light emitting diode (LED), and wherein the controller controls a state of the at least one LED including adjusting a brightness of the at least one LED.

In an embodiment, the light source module includes a control spot generator that generates a control spot for positioning in the illumination region.

In an embodiment, the control spot generator comprises a partial filter having a filtered region that projects an image corresponding to the control spot at the illumination region.

In an embodiment, the control spot generator includes a three-colored light emitter diode (LED) comprising a light pipe assembly having an exit port and three LEDs having various colors, wherein the light source module includes a lens, and wherein the light pipe assembly transports light from the three LEDs to the exit port of the light pipe assembly at a focal plane of the lens.

In an embodiment, the control spot generator includes a control spot LED comprising a single or multi-colored LED at a focal plane of a light source of the light source module.

In an embodiment, the sensor detects a presence of a hand making the hand gesture at the control spot, and wherein the beam steering mechanism moves the illumination region to the second surface location in response to the hand gesture.

In an embodiment, the control spot is at least one of a different color, shape, or size than the illumination region.

In an embodiment, the light source module comprises: a plurality of LEDs that generate the beam of light; a lens; a control spot generator; and narrow-beam optics that generate a narrow beam from the LEDs to maximize a throughput of light output via the lens.

In an embodiment, the beam steering mechanism includes a two-axis gimbal on which are mounted the light source module and the sensor for steering a line of sight (LOS) of the light source module and the sensor module, and wherein the two-axis gimbal can be of a pitch-yaw type, a pitch-roll type, or yaw-roll type.

In an embodiment, the beam steering mechanism comprises a mirror and a gimbal that adjusts gimbal angles of the mirror to steer a LOS of a light source generating the beam of light.

In an embodiment, the gimbal includes an outer ring and an inner ring, and the beam steering mechanism includes a motor on the outer ring and rotates the inner ring about an axis.

In an embodiment, the mirror is positioned in the inner ring, and the beam steering mechanism includes a motor that moves the mirror about an axis relative to the inner ring.

In an embodiment, the beam steering mechanism comprises two refracted wedge prisms that rotate relative to each other, and wherein a deviation angle of the light beam from a horizontal axis is obtained by rotating the two wedge prisms relative to each other, and an azimuth angle of the light beam is obtained by rotating both wedge prisms in the same direction.

In an embodiment, the beam steering mechanism includes a micro-electrical-mechanical system (MEMS) mirror array comprising a set of individual mirror elements, and wherein each mirror element has two axes of rotations.

In an embodiment, the tracking and control sensor comprises a thermal imager having a linear or area focal plane array (FPA).

In an embodiment, the tracking and control system further comprises a scan mirror for the linear array.

In an embodiment, the tracking and control sensor includes a lens that transmits both visible and thermal light, a thermal detector or array, and a visible FPA coupled to the thermal detector or array, the visible FPA positioned between the thermal detector or array and the lens.

In an embodiment, the tracking and control sensor comprises a thermal sensor and a visible camera for capturing an image of a hand making the hand gesture and recognizing the hand gesture, and wherein the thermal sensor comprises a lens and a thermal detector.

In an embodiment, the thermal detector is a single-element detector or a quadrant detector.

In an embodiment, the thermal sensor and the visible camera do not share the lens.

In an embodiment, the thermal sensor and the visible camera share the lens.

In an embodiment, the visible camera is outside the beam steering mechanism and the thermal sensor is inside of the beam steering mechanism.

In an embodiment, the thermal sensor distinguishes a temperature of a hand at the illumination region from a background temperature, and the processor generates the command signal from thermal image data corresponding to the hand.

In an embodiment, the sensor comprises a skin detection sensor and a three-colored light emitting diode (LED) that illuminates the hand gesture at the control spot at the illumination region, wherein the skin sensor senses the presence of a human hand by analyzing reflected light from the human hand.

In an embodiment, the skin detection sensor comprises a multi-color LED source for illuminating human skin at the control spot and a radiometric calibrated camera assembly or radiometer that measures reflectance at a control spot at the illumination region from the reflected light of the LED source.

In an embodiment, the multi-color LED source comprises a plurality of LEDs, each operating at a different wavelength, wherein two LEDs are near infrared (NIR) LEDs, the system further comprising a control spot generator at the exit port of a light-pipe assembly.

In an embodiment, the light-pipe assembly comprises three input light pipes and an output light pipe, wherein an LED of the plurality of LEDs is at an entrance of one of the three input light pipes, the output light pipe is bonded to a blank filter position at a focal plane of the light source module, an exit port of the output light pipe faces the beamsplitter and a lens.

In an embodiment, a first LED operates at 800 nm, a second LED operates at 620 nm, and a third LED operates at 970 nm.

In an embodiment, the radiometricly calibrated skin sensor or a radiometer detects hand gestures in the control spot by using the human skin reflectance at 800 nm and 970 nm.

In an embodiment, NIR images generated by the an imaging sensor of the skin detection sensor are employed to suppress or eliminate a hand gesture background, wherein the processor determines a ratio of NIR images provided by the two NIR LEDs to distinguish the hand gesture background from the hand gesture.

In an embodiment, the system further comprises a camera that captures an image at a control spot at the illumination region, the image including an image of the hand gesture and background data of the hand gesture.

In an embodiment, the processor converts the data related to the hand gesture into the command signal by removing the background data of the hand gesture from the image, processing the image of the hand gesture, comparing the processed image of the hand gesture with a set of stored hand gesture images, and generating the control signal in response to a match between the processed image of the hand gesture and a stored hand gesture image.

In an embodiment, the camera captures a plurality of images of a motion of the hand gesture, and wherein the processor converts the data related to the hand gesture into the command signal by subtracting images of the hand gestures to remove the background data from the images.

In an embodiment, the sensor includes quadrant detectors or other position-sensitive detectors that detect and record the positions of incident light beams.

In an embodiment, the system further comprises a multi-face pyramid mirror that divides the focusing beam of the lens into equal focusing sub-beams and directs the sub-beams in different directions, and wherein the multi-face pyramid mirror is a three-face mirror that directs the sub-beams in three different directions.

In an embodiment, a visible focal point array is positioned at a focus of a first sub-beam, a thermal detector or array is placed at a focus of a second sub-beam, and an LED or an exit port of a three-color LED light pipe is positioned at a focus of a third sub-beam.

In an embodiment, the light-emitting device control system is constructed and arranged in an optical wireless communications network, and wherein the beam steering mechanism moves the illumination spot to a location for both illumination and optical wireless communications, the light of the illumination spot carrying data that is received by an optical wireless device positioned at the location of the illumination spot.

In an embodiment, the light-emitting device control system is constructed and arranged in an optical wireless communications network, wherein the beam steering mechanism moves the illumination spot to a location, wherein the control system generates a transmitter beam spot that intersects at least a portion of the illumination spot, the transmitter beam spot including data that is received by a optical wireless device positioned at the first surface location of the illumination spot, wherein an optical wireless transmitter can is mounted at a light source platform, the transmitter beam spot and the illumination spot moving together from the first surface location to the second surface location.

In an embodiment, the light-emitting device control system is constructed and arranged in a controller-free video game system that uses players' gestures and gesture motions as commands for the video game, the system including a plurality of visible-thermal dual-band cameras to capture the gestures, the cameras arranged in orthogonal directions to capture 3-dimensional gesture motions, wherein the illumination region provides lighting for a visible camera of the visible-thermal dual-band cameras.

In an embodiment, the cameras include two cameras when a single player uses the controller-free video game system.

In an embodiment, the cameras include three cameras when multiple players use the controller-free video game system.

In another aspect, provided is a multi-spectral flashlight camera, comprising: a pyramid mirror; a light source; two or more focal plane array (FPA) devices, each operating in a different light wave spectrum; an aperture lens shared by the light source and the FPA devices at a foci of the lens, wherein light from the light source exits the aperture lens and illuminates a target, wherein reflected and emitted light from the target enters the aperture lens, wherein the pyramid mirror divides the received light so that a percentage of the received light enters an FPA device of the two or more FPA devices, and wherein the illumination area relates to an image corresponding to the FPA devices; and processing electronics for image acquisition and processing.

In an embodiment, the flashlight camera further comprises one or more batteries for supplying power to the flashlight camera.

In an embodiment, the flashlight camera further comprises a filter wheel having multiple bandpass filters, and wherein the FPA devices include a visible band, a short wave infrared band, and a long wave infrared band.

In another aspect, provided is a multi-spectral flashlight camera, comprising: a pyramid mirror; an LED light source; a visible channel; an uncooled thermal channel; an aperture lens that is shared by the light source, the visible channel, and the uncooled thermal channel at a foci of the lens, wherein light from the light source exits the aperture lens and illuminates a target, and wherein the visible image is provided of the illuminated target, and wherein the thermal image is provided of the self-emission target; and processing electronics for image acquisition and processing.

In an embodiment, the flashlight camera further comprises one or more batteries for supplying power to the flashlight camera.

In another aspect, provided is a method of controlling a light-emitting device, comprising: generating a control spot in an illumination region, the illumination region positioned at a first surface location; determining a hand gesture made at the control spot; and moving the illumination region to a second surface location in response to the hand gesture.

In an embodiment, the hand gesture includes a first hand gesture that activates the light-emitting device in a first state, and a second hand gesture that generates a command to move the illumination region to the second surface location.

In another aspect, provided is a smart lamp, comprising: a light source module that provides light for an illumination region at a surface location; a control spot generator that generates a control spot for positioning in the illumination region and controlling the lamp; a sensor that recognizes a hand gesture at the control spot; and a processor that converts data related to the hand gesture into a command signal for moving the illumination spot to a different surface location and controlling the lamp.

In an embodiment, the smart lamp further comprises a beam steering mechanism that directs a beam of light. In another aspect, provided is t from the light source module at the surface location to form the illumination region, wherein an illumination region is formed at the surface in response to the directed beam of light; and a controller that instructs the beam steering mechanism to move the illumination region to the different surface location or changing the brightness of the illumination region in response to the command signal.

In another aspect, provided is a method for hand gesture recognition, comprising: providing an illumination region at a first surface location; presenting a control spot at the illuminated surface region; positioning a hand at the control spot; detecting a presence of the hand at the control spot; generating a control signal corresponding to a gesture of the hand; moving the illumination region to a second surface location response to the command signal; and controlling a state of a lamp presenting the control spot.

In an embodiment, controlling the state of the lamp includes adjusting a brightness.

In an embodiment generating the control signal comprises: capturing an image at the control spot, the image including an image of the hand gesture and a background of the hand gesture; removing the image of the background of the hand gesture from the image; processing the image of the hand gesture; comparing the processed image of the hand gesture with a set of stored hand gesture images; and generating the control signal in response to a match between the processed image of the hand gesture and a stored hand gesture image.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIG. 1 is a diagram illustrating the inefficiencies of a conventional light source;

FIG. 2A is a diagram of a control system for a light-emitting device, in accordance with an embodiment;

FIG. 6A is a diagram of the mirror of FIG. 6 providing a light-of-sight (LOS) and field of view (FOV) of a light source module, in accordance with an embodiment;

FIG. 7A is a diagram of another beam steering mechanism including two rotating wedge prisms in a first position, in accordance with an embodiment;

FIG. 7B is a diagram of the beam steering mechanism of FIG. 7A, wherein the two rotating wedge prisms are in a second position, in accordance with an embodiment;

FIG. 9A is a block diagram of a thermal sensor, in accordance with an embodiment;

FIG. 9C is a block diagram of a thermal sensor, in accordance with an embodiment;

FIGS. 11A through 11H illustrate different hand gestures and corresponding commands, in accordance with embodiments;

FIG. 12A is a block diagram of a light source module of the lamp system of FIG. 12;

FIG. 12B is a block diagram of a tracking and control sensor of the lamp system of FIG. 12;

FIG. 15A is a side view of a 3-colored LED, in accordance with an embodiment.

FIG. 15B is a top view of the 3-colored LED of FIG. 15A;

FIGS. 29A and 29B are diagrams of an optical wireless communications network comprising an LED lamp system, in accordance with other embodiments showing non-illumination light being used as data carriers and data coverage range extended by movement of the illumination region along with the transmitter beam spot;

DETAILED DESCRIPTION OF EMBODIMENTS

Figure 2B:
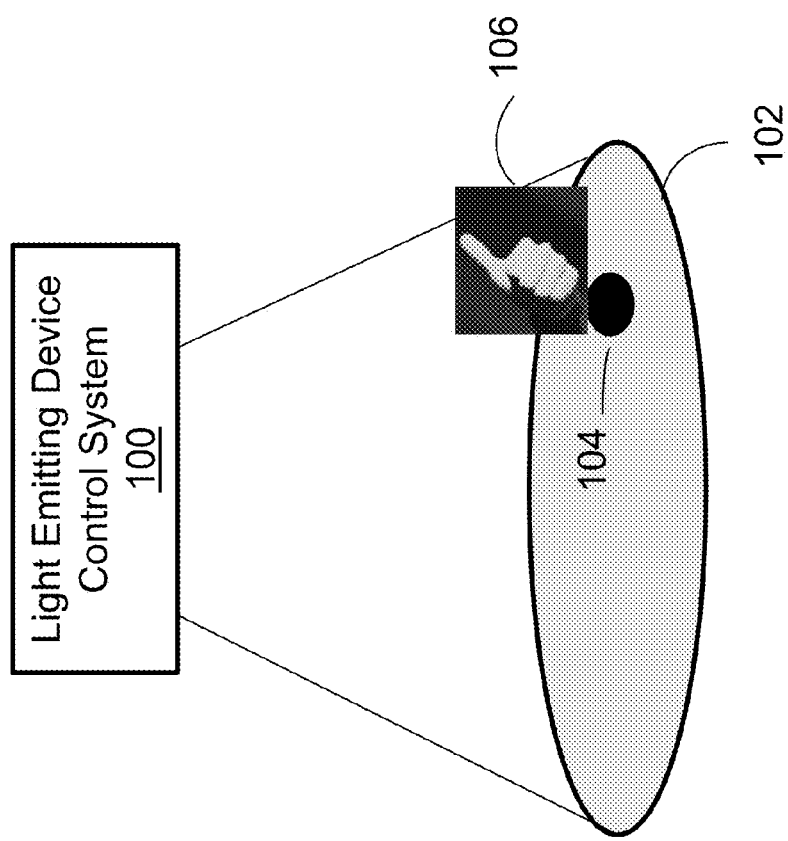
FIG. 2B is a diagram of the light-emitting device control system of FIG. 2A, wherein a hand gesture is made over a control spot at an illumination region generated by the control system, in accordance with an embodiment.

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Conventional lamps are inefficient and inconvenient. Often, a user only requires a small portion of the illumination angle, for example, ~40° cone angle, of a large illumination angle. As shown in FIG. 1, a large portion of the light output from a lamp 10 illuminating a surface 12 can be wasted, for example, at regions B. The brightest light spot is positioned generally directly below the light source, for example, at region A, which has the shortest distance to the surface. This bright spot (A) is fixed in space. Therefore, a user must physically move to a different position, i.e., position A, in order to take advantage of the brightest light spot. This is inconvenient because the user may be unwilling or unable to move so as to be positioned in the region of the bright spot, i.e., region A.

Figure 2C:
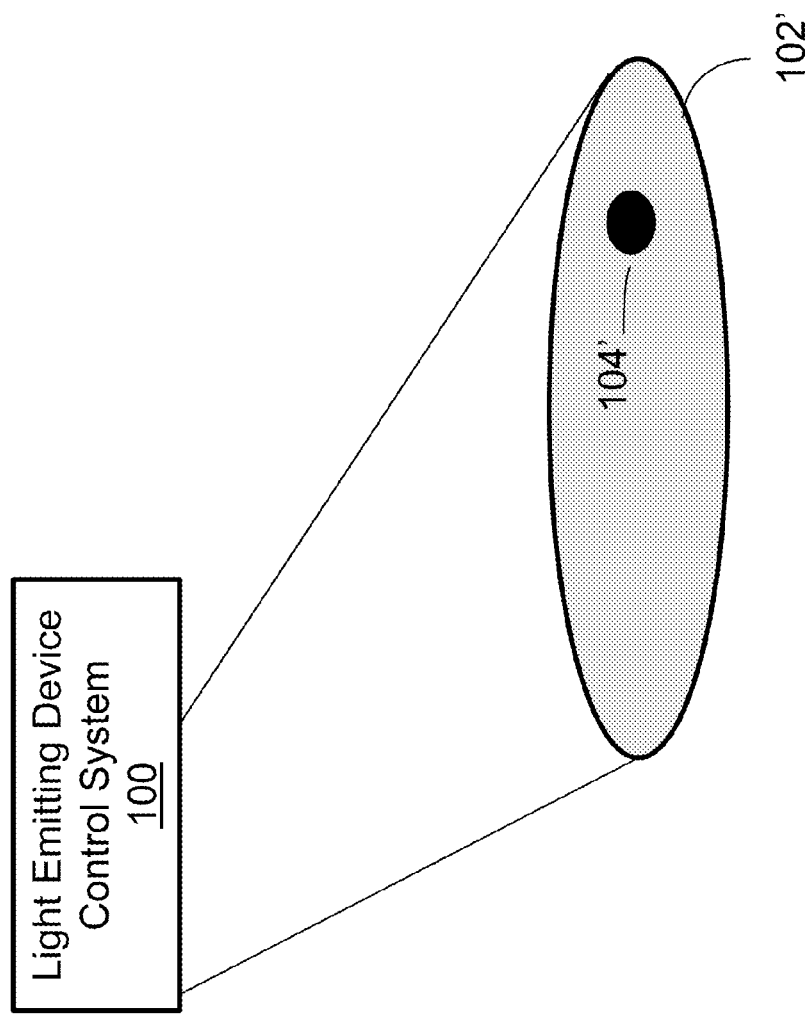
FIG. 2C is a diagram of the light-emitting device control system of FIGS. 2A and 2B, illustrating the movement of the illumination region and the control spot to a different location in response to the hand gesture of FIG. 2B, in accordance with an embodiment.

FIG. 2A is a diagram of a control system 100 for a light-emitting device, in accordance with an embodiment. FIG. 2B is a diagram of the light-emitting device control system 100 of FIG. 2A, wherein a hand gesture is made over a control spot at an illumination region generated by the control system 100, in accordance with an embodiment. FIG. 2C is a diagram of the light-emitting device control system 100 of FIGS. 2A and 2B, illustrating the movement of the illumination region to a different location in response to the hand gesture of FIG. 2B, in accordance with an embodiment.

In some embodiments, the light emitting device control system 100 comprises a light emitting diode (LED) light source. In another embodiment, the light emitting device control system 100 comprises an organic light emitting diode (OLED). Although not shown, other sources that emit light can equally apply. The light managed by the control system 100 can be in the visible light spectrum, or other light spectrum. In some embodiments, the emitted light is concentrated from the light emitting device control system 100 onto an illumination region 102 as a light spot, for example, a white light spot or the like. The illumination region 102 can include a reduced light spot, for example, having an illumination cone angle of 50° or less. In some embodiments, the location of the illumination region 102 is controlled by a user. For example, a user can determine by a hand gesture a movement of the illumination region 102 from a first location shown at FIGS. 2A and 2B to a second location shown in FIG. 2C. In some embodiments, the user can activate and interrupt the illumination region 102 without restriction. In some embodiments, the control system 100 includes a controller (described below) that can adjust the brightness, intensity, distribution, size, color, and/or other characteristic of the emitted light in response to a hand gesture or other signal-generating motion. The control system 100 can perform control operations without aid of a physical device, such as a hand-held device.

In some embodiments, a single control spot 104 is employed. In other embodiments, multiple control spots are employed at an illumination region 102. The control spot 104 can be a different color, shade, or other characteristic than the illumination region 102 so that a human eye can distinguish the control spot 104 in the illumination region 102 from the illumination region 102 itself. In some embodiments, the control spot 104 is a color in the visible spectrum and positioned in a light spot of the illumination region 102 so that a user of the light emitting device control system 100 can distinguish the control spot 104 from the illumination region 102. In some embodiments, the control spot 104 is dark and the illumination region 102 includes a white light spot visible to a user of the light emitting device control system 100. In some embodiments, the control spot 104 is a small portion, or minority, of the size of the illumination region 102. The control spot 104 can be produced by a filter, a light pipe, a control spot LED, or a combination thereof, for example, described herein.

In some embodiments, a user can place a hand in the region of the control spot and make a hand gesture 106 to move the illumination region 102 to a different location. As shown in FIG. 2C, the control system 100 can move the illumination region 102 as a result of a hand gesture 106 made by a user, by positioning a hand or the like at the region at or proximal to the control spot 104. In some embodiments, the hand gesture 106 represents a command. For example, the hand gesture 106 at FIG. 2B refers to a command to move the illumination region 102. Accordingly, as shown in FIG. 2C, the illumination region 102 and the control spot 104 are moved to a new location in response to the hand gesture 106. In addition, or alternative to, movement of the illumination region 102, a hand gesture can be used to modulate, adjust, or otherwise modify the shape, size, brightness, intensity, distribution, or other feature of the region 102.

Figure 11C:
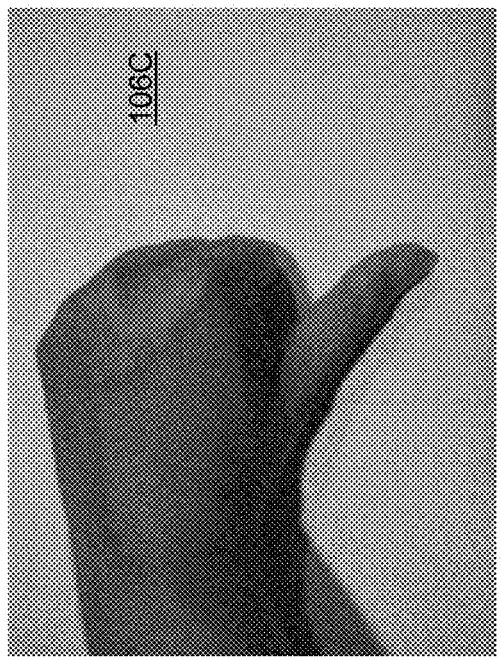
Figure 11D:
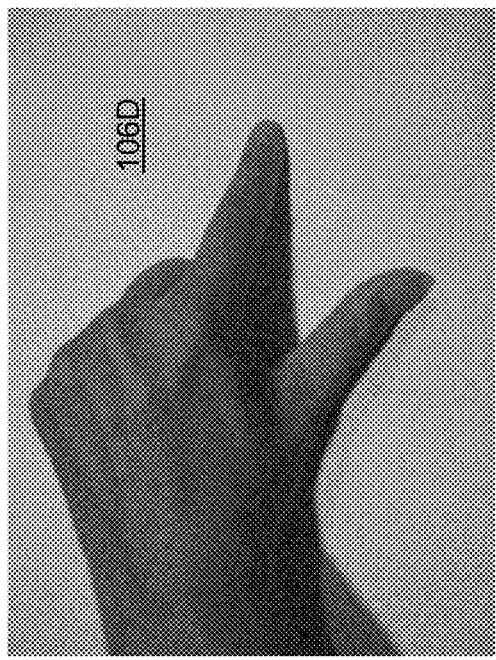
Figure 11E:
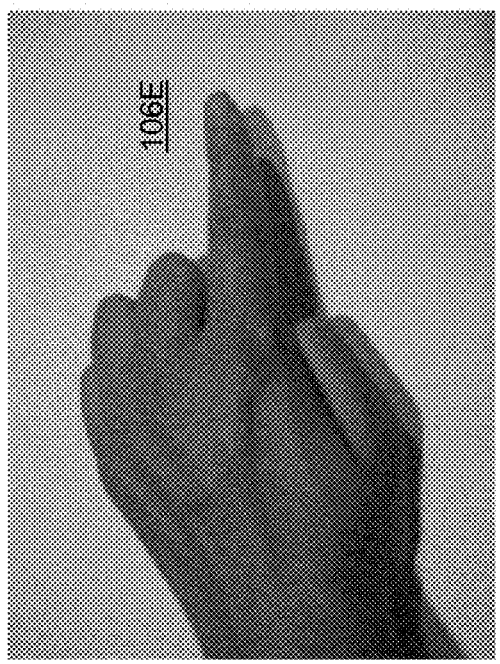
Figure 11F:
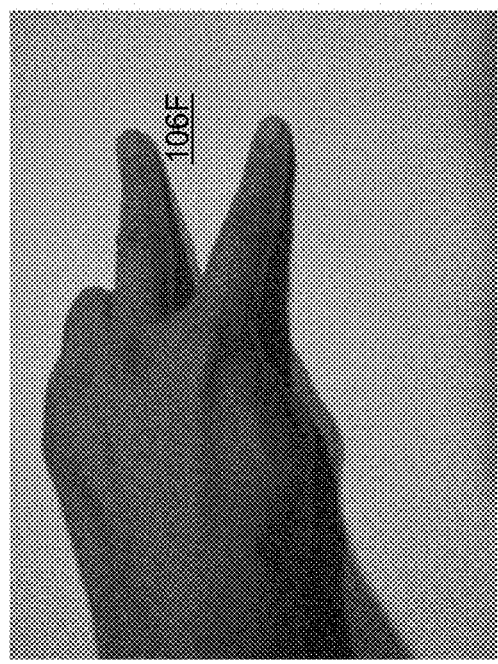
Figure 11G:
Figure 11H:
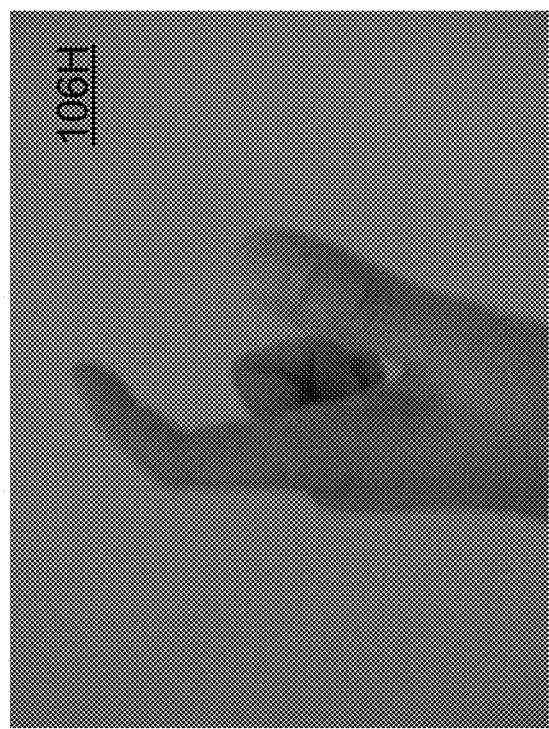

FIGS. 11A through 11H illustrate different hand gestures 106A-106H (generally, 106) and corresponding commands which can establish the manner and features of the illumination 102 and/or the control spot 104 related to a movement, in accordance with embodiments. In FIG. 11A, a hand gesture 106A relates to a command to move the illumination region 104. In FIG. 11B, a hand gesture 106B relates to a command to stop moving the illumination region 104. In FIG. 11C, a hand gesture 106C relates to a command to increase the brightness of the light source. In FIG. 11D, a hand gesture 106D relates to a command to decrease the brightness of the light source. In FIG. 11E, a hand gesture 106E relates to a command to turn on the light source. In FIG. 11F, a hand gesture 106F relates to a command to turn off the light source. FIG. 11G, a hand gesture 106G relates to a command for change of state of the lamp. FIG. 11H, a hand gesture 106H relates to a command for disengaging from the light source, for example, a lamp.

Returning to FIG. 2A, the light emitting device control system 100 can be attached to a ceiling, wall, floor, overhead light, or other supporting object. Other attachment mechanisms and supports are equally applicable to the present inventive concepts. In an embodiment, the diameter of the illumination region 102 is about 1 meter. Other illumination region shapes, sizes, or configuration features can equally apply.

Figure 3:
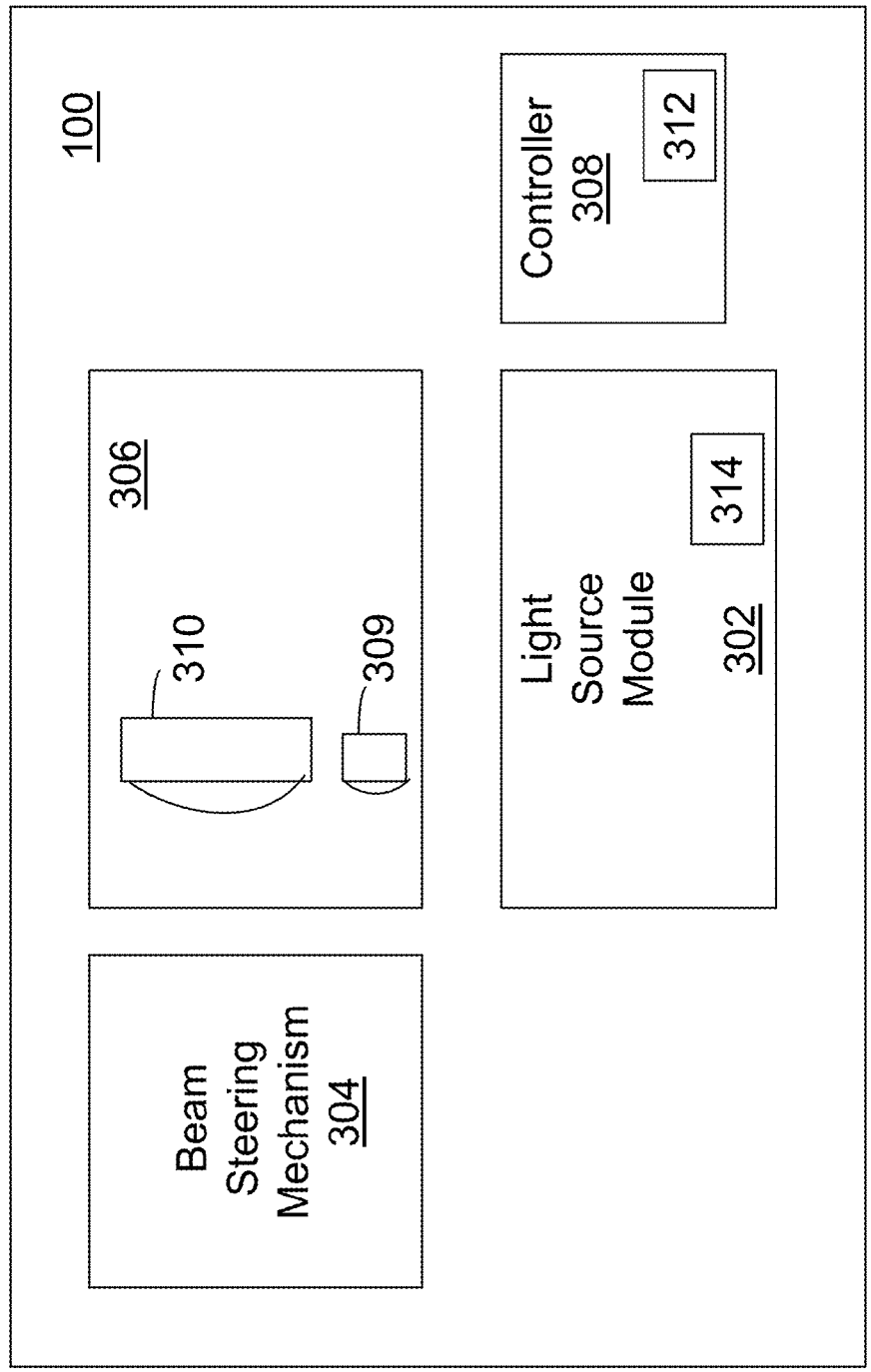
FIG. 3 is a block diagram of the light-emitting device control system of FIGS. 2A-2C, in accordance with an embodiment.

FIG. 3 is a block diagram of the light emitting device control system 100 of FIGS. 2A-2C, in accordance with an embodiment. The light emitting device control system 100 can include a light source module 302, a beam steering mechanism 304, a tracking and control sensor 306, and a controller 308. One or more of these elements can be co-located at a common hardware device, such as a circuit board or housing, for example, shown in FIG. 4, or can be at on different hardware devices, for example, at physically different locations.

Figure 4:
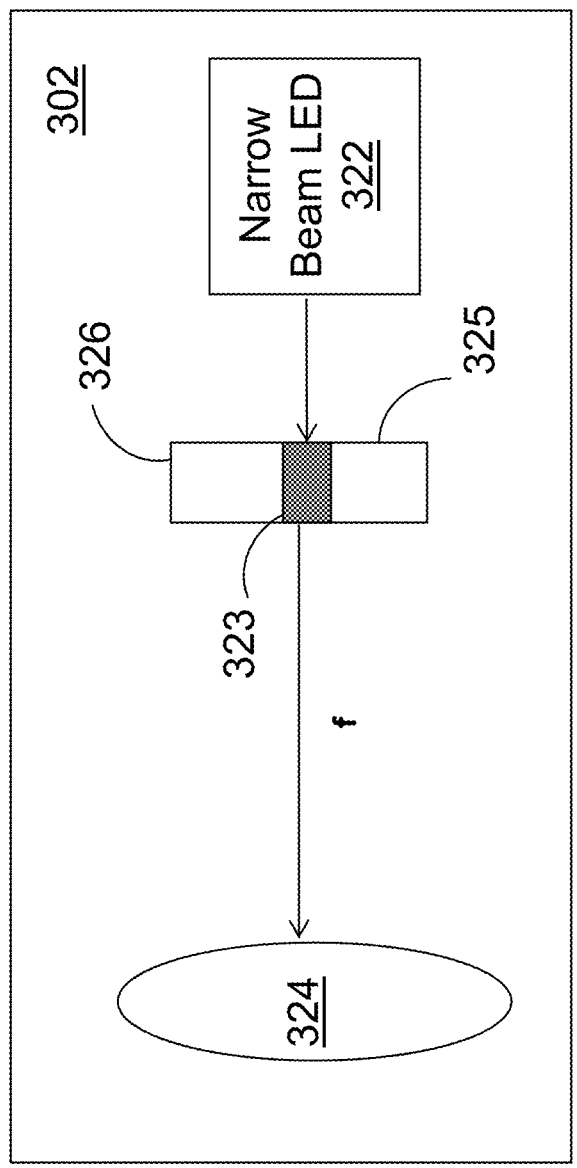
FIG. 4 is a block diagram of a light source module, in accordance with an embodiment.

In some embodiments, as shown in FIG. 4, the light source module 302 can include an LED light source 322, such as a narrow beam LED. The light source module 302 can include a control spot generator 314 that produces a control spot 104. The control spot generator 314 can include a filter, a light pipe, a control spot LED, or a combination thereof, for example, described herein. The light source module 302 can include a lens 324, and the control spot generator 314 shown in FIG. 3 can include a partial filter 326. In some embodiments, the partial filter 326 can be positioned between the light source 322 and the lens 324 at or near the focal plane of the lens 324 having a focal length (f). The projected image of a filtered region 323 can translate to a control spot, for example, the control spot 104 shown in FIGS. 2A-2C.

As previously described, the partial filter 326 can be constructed and arranged to generate a control spot 104 for positioning in an illumination region 102. The filter 326 can comprise glass, plastics, or related material. The filter 326 can include a small region that is coated with a dark or colored coating, or related coating that forms a filtered region 323 and permits a high contrast control spot 104 against the white illumination region 102. In some embodiments, a remainder of the region, or unfiltered region 325 of the partial filter 326 is uncoated or coated with an anti-reflection (AR) material. The AR coating can minimize a Fresnel reflection loss.

Figure 5:
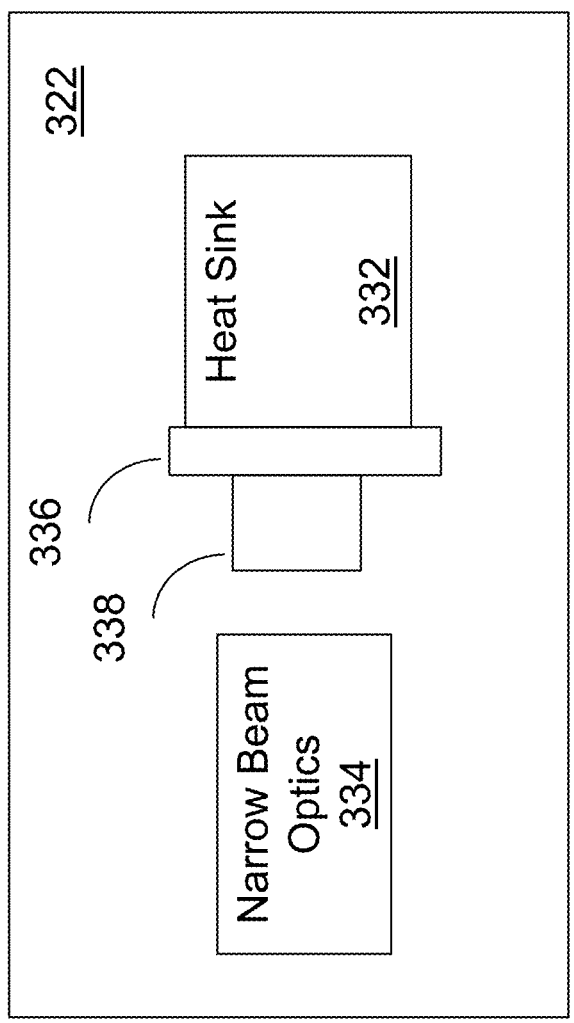
FIG. 5 is a block diagram of a narrow beam light emitting diode (LED), in accordance with an embodiment.

In some embodiments, as shown in FIG. 5, the LED light source 302 when constructed and arranged as a narrow beam LED 322 can comprise a compound LED chip 338 or the like, which can include one or more LEDs. The narrow beam LED 302 can further comprise narrow-beam optics 334 for generating a narrow light beam at the lens so that its diameter is equal or smaller than the aperture diameter of the lens. This ensures maximum throughput and minimum light absorption by internal housing wall. The narrow beam LED 302 can further include a heat sink 332 for dissipating heat generated by the LEDs. The heat sink 332 can be coupled to a one side of an LED board 336, and the LED chip 338 can be coupled to an opposite side of the LED board 336.

In some embodiments, the lens 324 comprises glass, plastic, or related material that projects the image of the partial filter onto the ground. The illumination region is the image of the unfiltered region 325 and 326. The control spot is the image of filtered region 323. The lens 324 can have, but not be limited to, a focal length at or about 1 inch and/or a diameter in the range at or about 1 inch.

Figure 6:
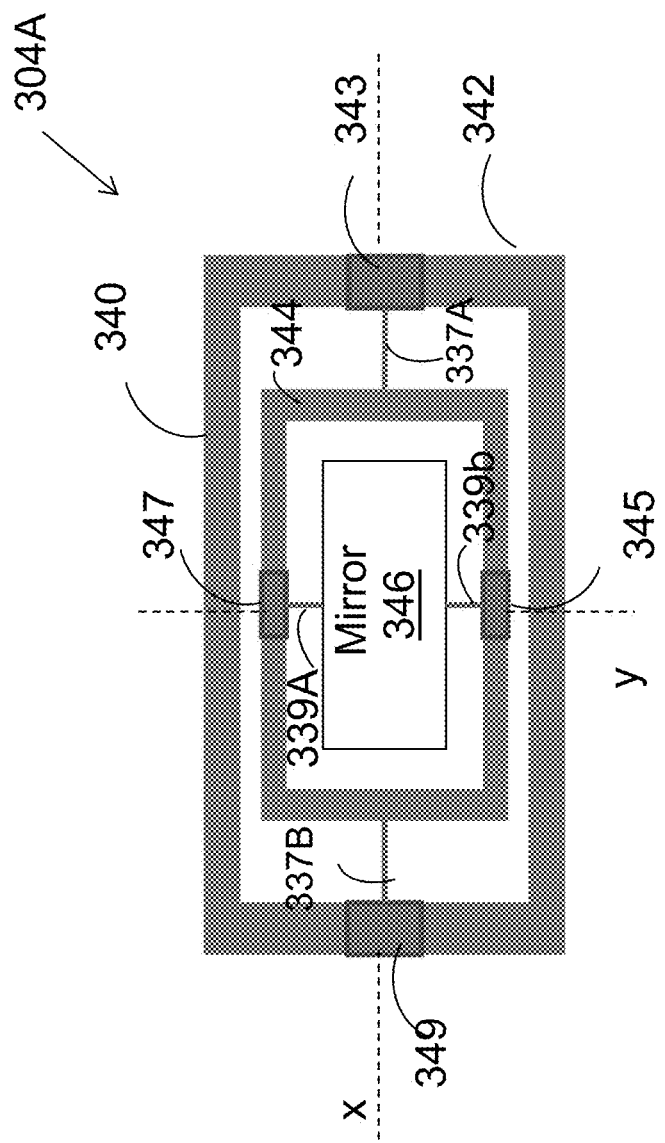
FIG. 6 is a diagram of a beam steering mechanism, in accordance with an embodiment.

FIG. 6 is a diagram of a beam steering mechanism 304A, in accordance with an embodiment, which can be implemented at the light emitting device control system 100 shown in FIG. 3. The beam steering mechanism 304A can comprise a dual-axis gimbal 340 and a mirror 346. The gimbal 340 can include an outer ring 342 and an inner ring 344 that can be connected to each other by shafts 337A, B that extend along a first axis. Motors 345 and 343 are mounted on the inner ring 344 and outer ring 342, respectively. Counterweights 347, 349 can be mounted on the outer ring 342 and inner ring 344, respectively, for balancing and stabilizing the gimbal 340. Counterweight 347 is coupled to the shaft 339A at one side of the inner ring 344 and the second motor 345 is coupled to the shaft 339B at an opposite side of the inner ring 344 as the counterweight 347. Counterweight 349 is coupled to the shaft 337B at one side of the outer ring 342 and the first motor 343 is coupled to the shaft 337A at an opposite side of the outer ring 342 as the first counterweight 347. The rotation of the mirror 346 about the inner axis can be referred to as pitch. The rotation of the inner gimbal including parts 346, 344, 345, 339A, and 339B can be referred to as yaw.

FIG. 6A is a diagram of the mirror 346 of FIG. 6 providing a light-of-sight (LOS) and field of view (FOV) with respect to a light source module 302, in accordance with an embodiment. In order to have to a LOS extending, for example, in a vertical direction, from the mirror 346 to an illuminated surface, the mirror 346 can pitch at a 45° angle. Beam steering can be achieved by a pitch, yaw, and/or other movement of the mirror 346. The required mirror length can be increased, which can in turn increase the pitch angle increase, for example, to increase an area of the illuminated surface. In order to move the illumination region away from a nadir in the forward direction, the pitch angle must increase as shown in FIG. 6A. Light loss at the bottom of the mirror 346 may occur, for example, as the bottom FOV ray starts to miss the mirror 346. In order to minimum the loss, the length of the mirror 346 must be increased, thereby increasing the size of the lamp.

FIGS. 7A and 7B are views of a beam steering mechanism 304B, in accordance with another embodiment, which can be implemented at the light emitting device control system 100 shown in FIG. 3. The beam steering mechanism 304B can receive and redirect light from the light source 302, for example, a lamp, LED, and so on, to a surface location to form an illumination region 102 having a control spot 104. The beam steering mechanism 304B can include wedge prisms 352A, 352B that can rotate relative to each other, permitting the beam steering mechanism 304B to be implemented in small configurations.

The beam steering mechanism 304B can operate in two steps. In a first step as shown in FIG. 7A, a deviation angle θ of a received light beam relative to a horizontal axis x can be obtained by rotating the two wedge prisms 352A, 352B relative to each other, i.e., counter-rotating. For example, the first wedge prism 352A can rotate in a first direction of rotation and the second wedge prism 352B can rotate in a second, opposite, direction of rotation with respect to the first direction of rotation. In a second step as shown in FIG. 7B, an azimuth angle φ of the light beam can be obtained by rotating both wedge prisms 352A, 352B in the same direction. Thus, by relative rotation and co-rotation of the prisms 352A, 352B, respectively, a light beam can be output in any direction.

Figure 8:
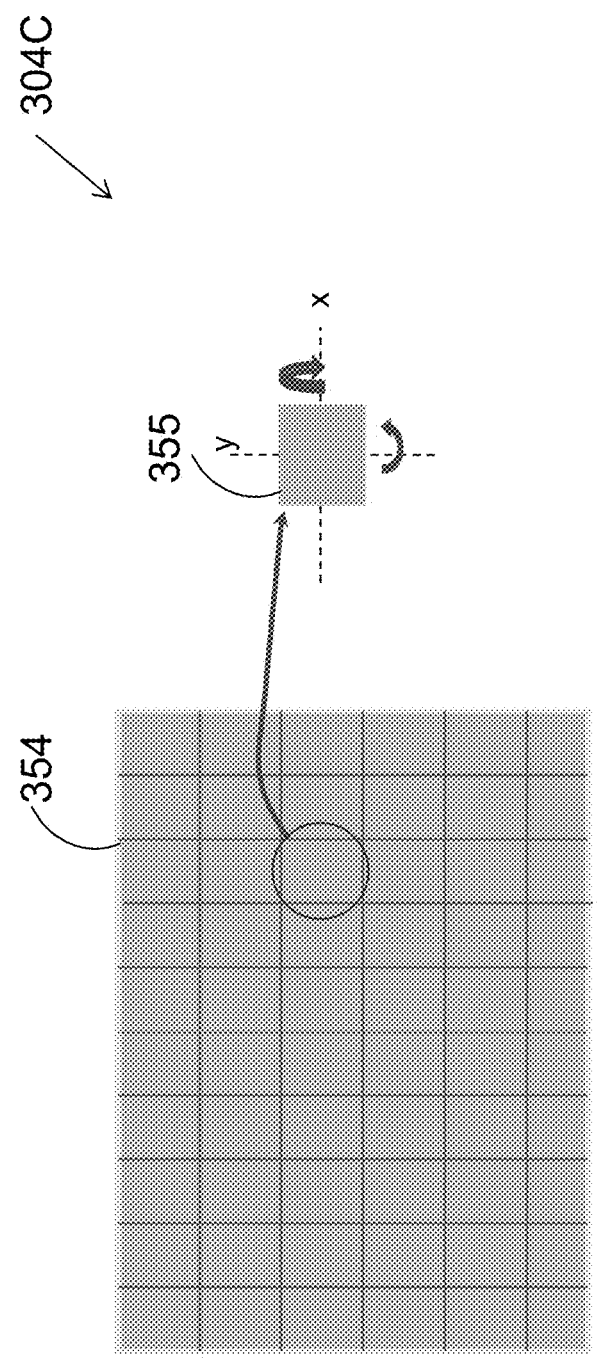
FIG. 8 is a diagram of another beam steering mechanism, in accordance with an embodiment.

FIG. 8 is a diagram of another beam steering mechanism 304C, in accordance with an embodiment, which can be implemented at the light emitting device control system 100 shown in FIG. 3. Here, the beam steering mechanism 304C includes a MEMS mirror array 354 comprising a set of individual mirror elements 355. Each MEMS mirror element 355 can have two axes of rotation, i.e. an x axis and a y axis. It can accurately and easily steer a beam by simply applying a voltage to the MEMS mirror array 354. The MEMS mirror array 354 is compact and has an internal beam steering mechanism, and therefore can eliminate the need for a mechanical gimbal, resulting in a reduction in size of an LED lamp or related device in which embodiments of the control system 100 are implemented.

Figure 10:
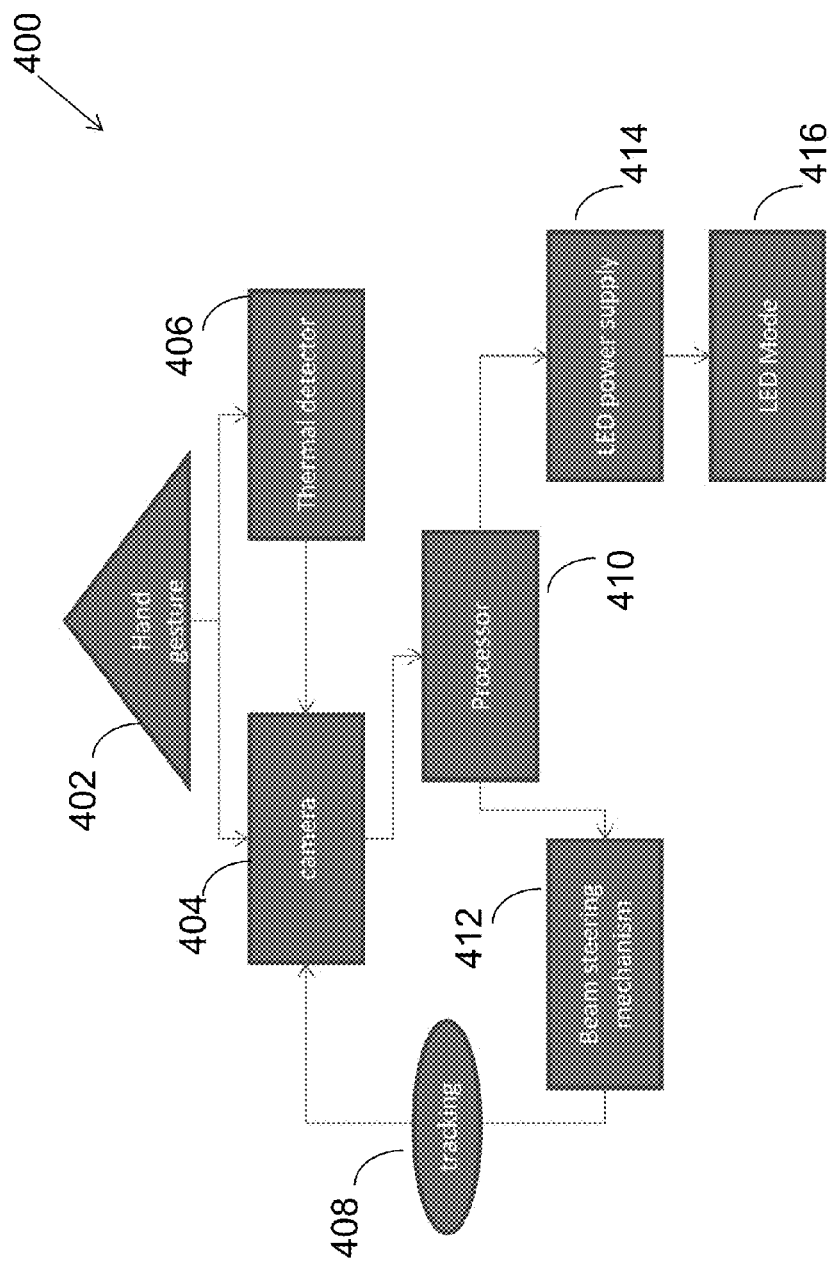
FIG. 10 is a flowchart illustrating an interoperability between elements of a light-emitting device control system, in accordance with an embodiment.

Returning to FIG. 3, in some embodiments, the tracking and control sensor 306 comprises a sensor 309 and a visible camera 310. The sensor 309 can be a thermal sensor that is radiometricly calibrated and constructed and arranged to measure the temperature of the target. The camera 310 captures an image and, as shown in FIG. 10, can output the image data to a DSP chip or other processor at the controller 308 for processing if the target temperature is close to or at that of a human body temperature, e.g., ~36° C. In some embodiments, an image is generated in response a hand gesture, whereby the processor, e.g., a digital signal processor (DSP), compares a set of hand gesture images stored at a repository such as a database and known commands corresponding to the stored hand gesture images, and determines from the comparison a command based on the hand gesture.

Figure 12:
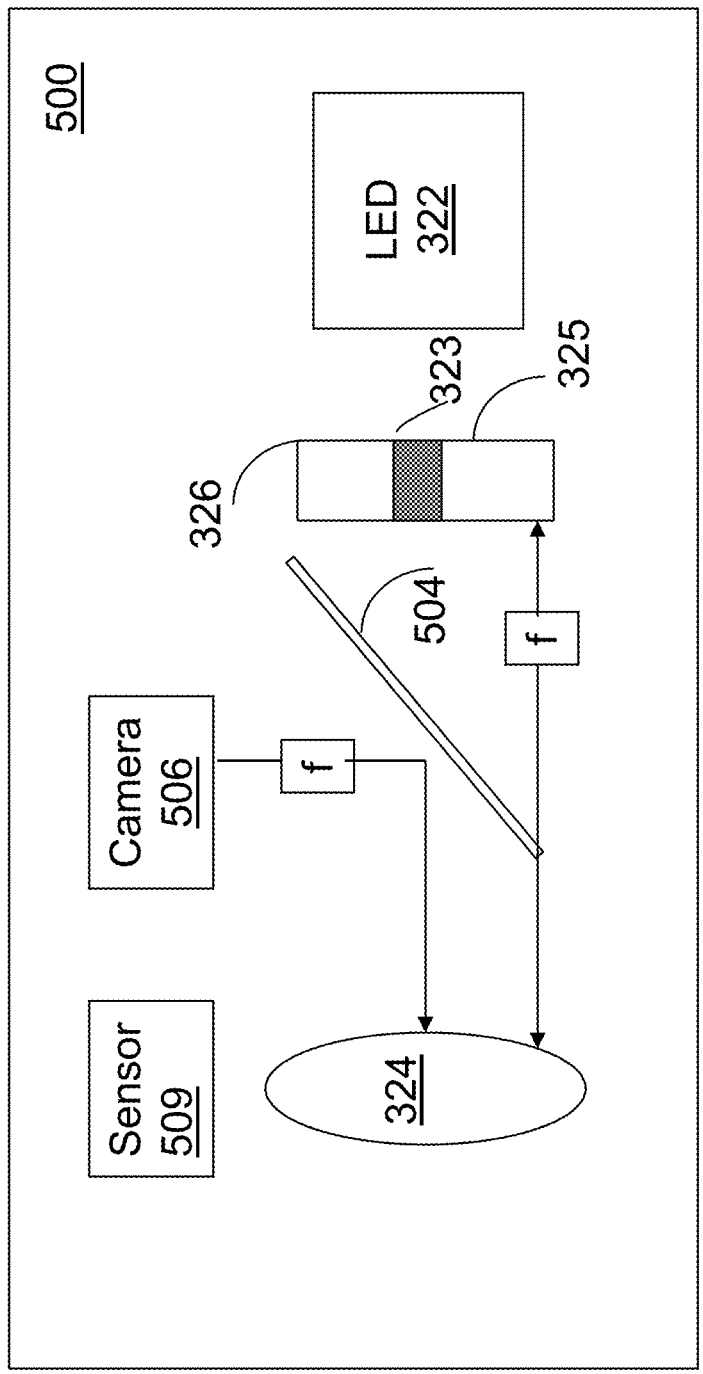
FIG. 12 is a block diagram of a lamp system, in accordance with an embodiment.
Figure 20:
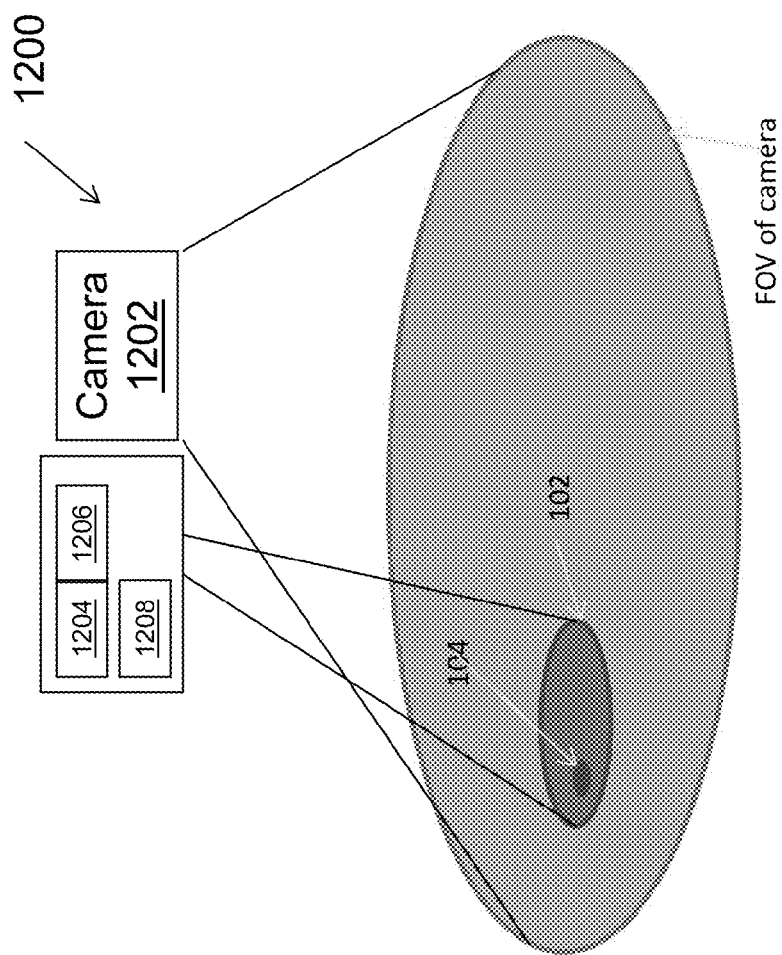
FIG. 20 is a diagram of a light-emitting device control system, in accordance with another embodiment.
Figure 21:
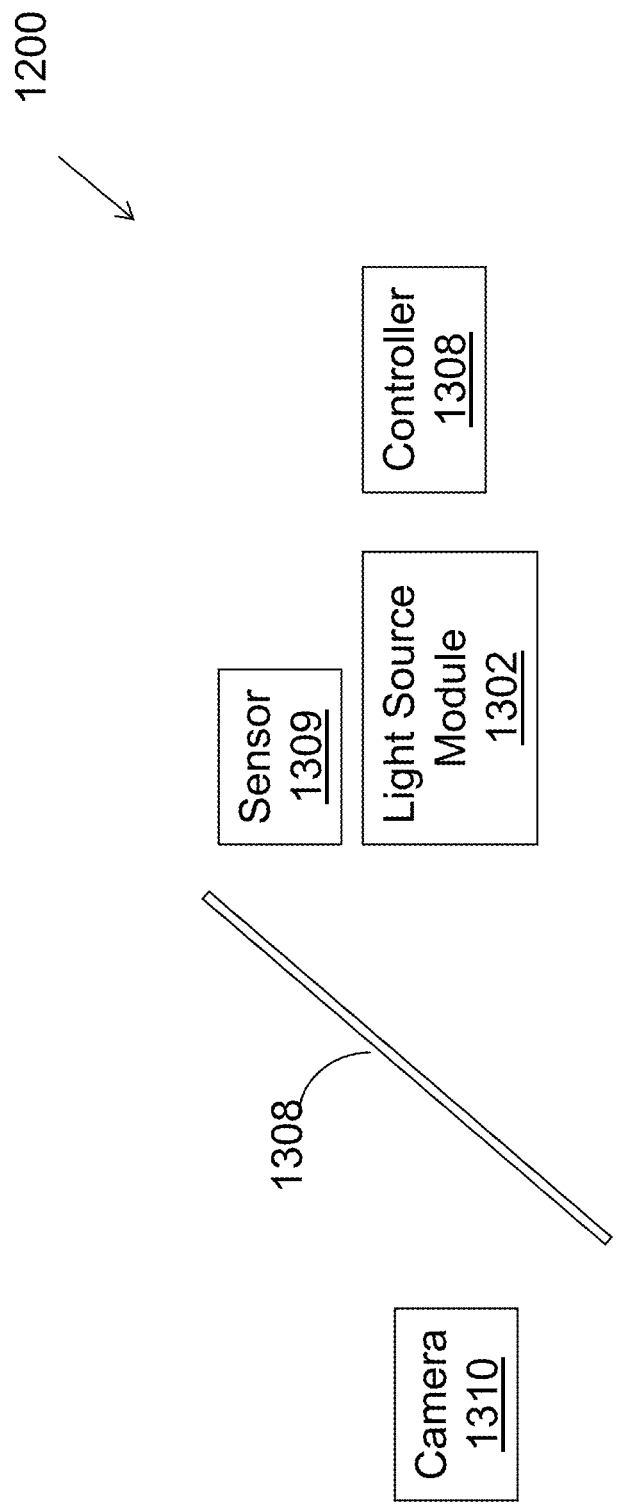
FIG. 21 is a diagram of a light-emitting device control system, in accordance with another embodiment.

In some embodiments, the camera 310 and the thermal sensor 309 can each include a lens or focusing optics, and do not share the same lens or focusing optics, for example, shown at FIG. 3. In some embodiments, the camera 310 and the thermal sensor 309 are mounted on the same mounting plate so that their respective LOS are parallel. A FOV of both the camera 310 and the thermal sensor 309 can be, proximal or part of a beam steering mechanism, for example, as illustrated by FIGS. 3, 12, and 12B. In some embodiments, the camera is placed outside the beam steering mechanism, for example, as shown in FIG. 20 and FIG. 21, or otherwise at a different location than the thermal sensor 309 relative to the beam steering mechanism.

Figure 9:
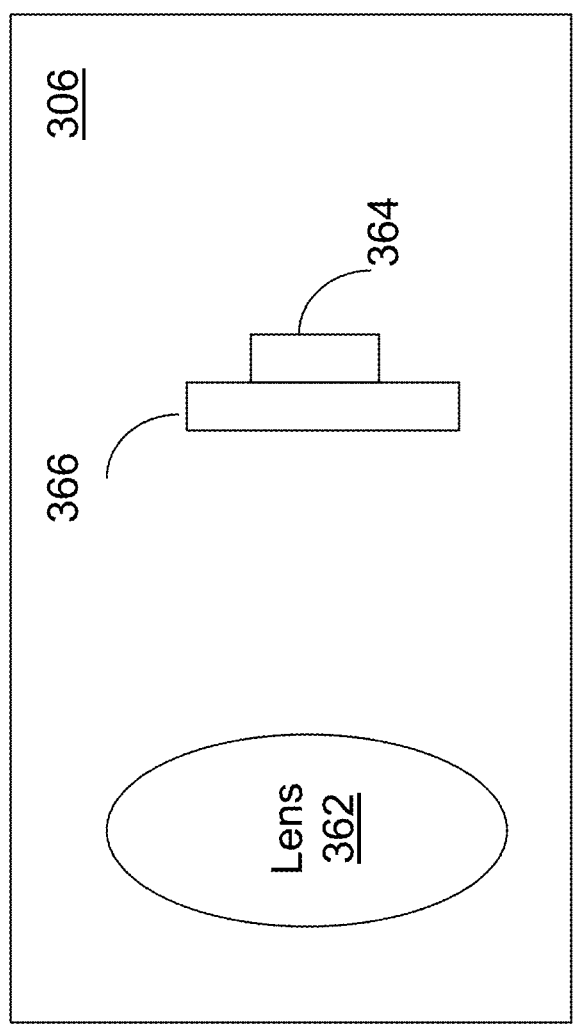
FIG. 9 is a block diagram of a tracking and control sensor, in accordance with an embodiment.

FIG. 9 is a block diagram of a tracking and control sensor 306, in accordance with an embodiment, which can be implemented at the light emitting device control system 100 shown in FIG. 3. In an embodiment, the tracking and control sensor 306 can comprise a dual-band visible and thermal imager, which includes a small thermal FPA 364, or detector, bonded to the back of a larger visible FPA 366. The visible FPA 366 and the thermal FPA 364 can respond to different wavelengths. In particular, the thermal FPA 364 can respond to wavelengths corresponding to emitted thermal light of a hand making a gesture, while the visible FPA 366 can response to wavelengths of light of the illumination region 102. The visible FPA can be made of silicon or other material that transmits thermal radiation. This configuration permits the sensor 306 to receive both visible image and thermal information about a target.

In some embodiments, for example, shown in FIG. 9A, a thermal sensor 309A comprises a thermal detector 374 and a lens 372 such as an infrared lens or Fresnel lens comprising an infrared material or plastics. In some embodiments, the thermal detector 374 can be a single detector. In other embodiments, the thermal detector 374 can be a quadrant detector. The thermal sensor 309A can detect the presence of a human hand for determining a command used to establish an adjustment to an illumination region. In some embodiments, the thermal sensor 309 can be replaced by a skin detector, for example, illustrated at least at FIGS. 14, 15A, 15B, and 16.

Figure 22:
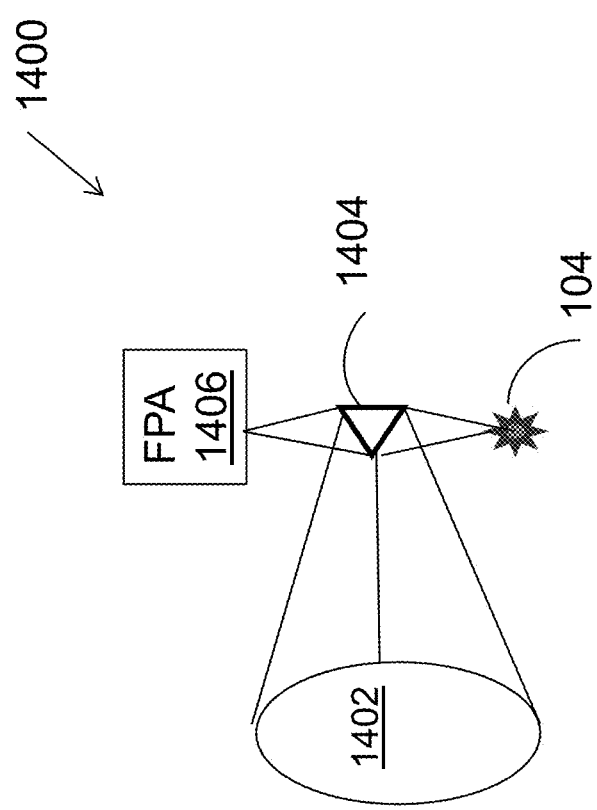
FIG. 22 is a side view of a tracking and control sensor, in accordance with an embodiment.
Figure 23:
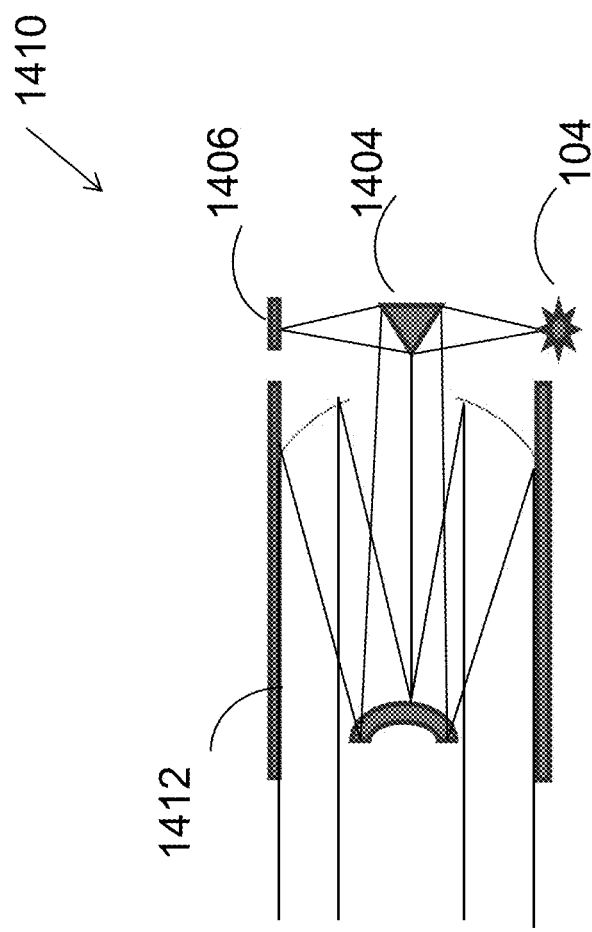
FIG. 23 is a side view of a tracking and control sensor, in accordance with another embodiment.
Figure 24:
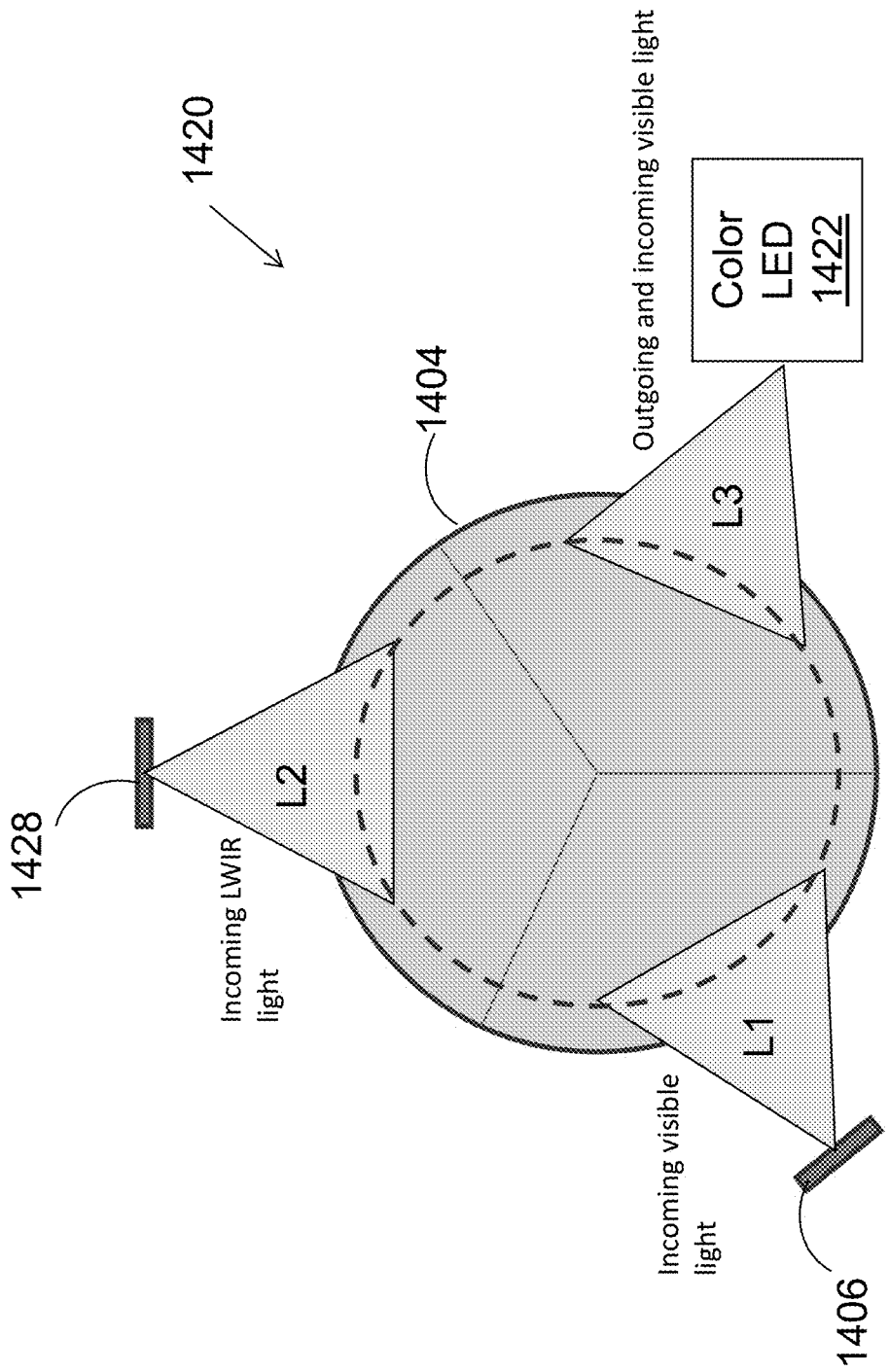
FIG. 24 is a top view of a tracking and control sensor, in accordance with another embodiment.

In some embodiments, for example, shown at FIG. 9, a tracking and control sensor 306 can include a visible FPA and a thermal sensor 364 that share a lens 362 or focusing optics. In some embodiments, the thermal detector (or array) can be placed behind the visible FPA, for example, as shown in FIG. 9. Here, the visible FPA 366 can include a detector array that is made of silicon, which can transmit thermal radiation that can be received by the thermal sensor 364. In some embodiments, the thermal detector (or array) and the visible FPA can be placed at two separate focal planes of the lens or focusing (Cassagrain) optics, for example, as illustrated in FIGS. 22-24.

Figure 9B:
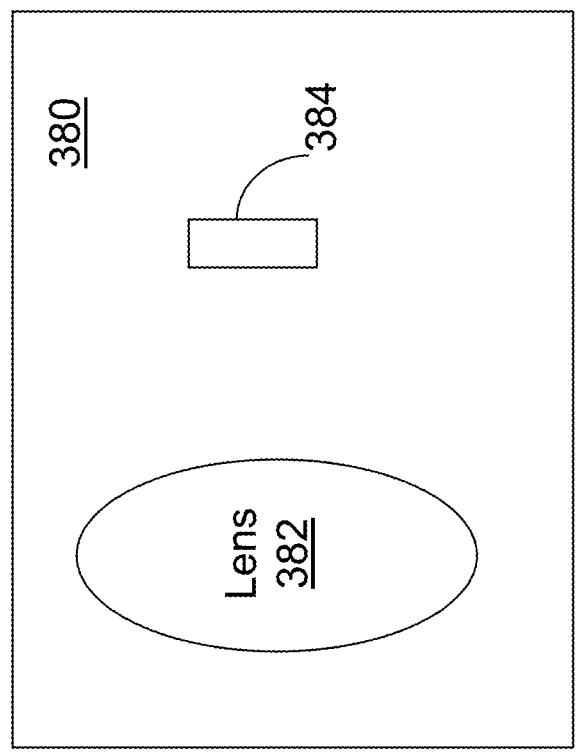
FIG. 9B is a block diagram of a thermal sensor, in accordance with an embodiment.

In some embodiments, the visible camera 310 and the thermal sensor 309 shown in FIG. 3 can be replaced by a thermal imager. As shown in FIG. 9B, a single thermal imager 380 can comprise a uncooled thermal FPA 384 and an infrared lens 382. In another embodiment, the thermal FPA 384 is an area array. In FIG. 9C, a thermal imager 390 includes a thermal FPA 394 and a lens 392, where the thermal FPA 394 is a line array. The thermal imager 390 includes a scan mirror 396. The uncooled thermal FPA 380, 390 can include microbolometer, thermopile, and pyroelectric detector arrays.

Returning to FIGS. 3, 11A, and 11H a gesture 106G can be an activation state gesture, and gesture 106H can be an inactivation state gesture. In order to change from one hand gesture command to another, the hand gesture 106G must be detected in the control spot 102. In order to eliminate a false alarm, the controller 308 can include a timer 312 that measures the time of the hand gesture 106G in a steady position, for example, staying still. In an embodiment, the camera 310 can be used as a timer. If the camera 310 captures images of the hand gesture 106G remaining relatively motionless for a predetermined number of consecutive images, for example, 3 consecutive images at 33 ms each, or 1 second, then a determination can be made that the system 100 is at an activation state. Otherwise, a determination can be made that a false alarm has occurred.

The controller 308, when in an activation state, can receive command information regarding consecutive images of the hand gesture, which can change a state of the lamp. For example, the controller 308 can receive commands indicating that three consecutive images taken are the same, e.g., no change in hand gestures. The controller 308 can determine from this data that the user wishes to change the state of the system 100 based on the same or similar hand gestures in the images.

FIG. 10 is a flowchart 400 illustrating interoperability between elements of a light-emitting device control system, in accordance with an embodiment. In describing the flowchart 400, reference can be made to, but not limited to, some or all of FIGS. 2-9.

A hand gesture 402 is made over a control spot, for example, the control spot 104 as shown in FIG. 2B. Thermal data, for example, a temperature, related to the hand gesture 402 is determined by the thermal sensor 406. The thermal sensor 406 can be the same as or similar to the thermal sensors described with respect to FIG. 3, 9, 9A, or 9B, respectively, or other embodiments such as those described herein. If the detected temperature of the hand making the gesture is determined to be within a predetermined range of temperatures known to be that of the human body, for example, ~36° C., then the thermal sensor 406, or a processor in communication with the sensor 406, generates a request that the camera 404 provide an image of the hand gesture 402 to a processor 410. The processor 410 can include a digital signal processing (DSP) chip or single board computer in the LED lamp control electronics, for example, at the controller 308 of the control system 100 of FIGS. 2-9. The image data provided by the camera 404 can be compared to a library of known hand gestures to determine a command intended by the hand gesture, for example, a command to move the illumination region to a different location. At the processor 410, the acquired data corresponding to the hand gesture 402 is converted into a command signal in response to the comparison result. If the command signal identifies the hand gesture 402 as indicating a command to move the illumination region 102 generated by an LED lamp or the like at the light source module 302, then the beam steering mechanism 412 can direct the illumination region 102 to a different surface location, or otherwise modify the illumination region 102 in accordance with the command. Alternatively, the hand gesture 402 can correspond to a command to increase the brightness. The beam steering mechanism 412 can rely on the camera 404 to track the hand motion relative to the control spot 104. Here, the DSP or single board computer can generate a control signal that is output to the LED power supply 414, which adjusts the LED lamp or the like accordingly. An LED mode processor can place the LED lamp or the like in different modes according to a control signal, for example, turning the LED lamp on or off, increasing or decreasing brightness, and so on.

As previously described, some embodiments include a camera of a tracking and control sensor that can be independent of, or physically separate from, a light source module. In other embodiments, a light source and the camera of a tracking and control sensor can be co-located at a same module, housing, or other single unit.

FIG. 12 is a block diagram of a lamp system 500, in accordance with an embodiment. FIG. 12A is a block diagram of a light source module 502 of the lamp system 500 of FIG. 12. FIG. 12B is a block diagram of the camera of a tracking and control sensor 514 of the lamp system of FIG. 12.

The lamp system 500 comprises a lens 324, a beamsplitter 504, a partial filter 326, and an illumination source 322, for example, comprising a narrow-beam LED module. The partial filter 326 is positioned at the focal plane of the lens 324. The light source module 502 and the sensor 514 can share common elements, such as the beam splitter 504 and the lens 324.

In an embodiment, a camera 506 is coupled to, or otherwise in communication with, the light source module 502. The lamp system 500 can include the beamsplitter 504. The camera 506 can include a focal plane detector array (FPA) that is positioned along the focus of the lens of the light source module 502 in the folded arm. A feature of the folded arm, or folded light beam is that the camera 506 and the light source module 502 can be packaged together under a same single housing. Here, the camera 506 and the light source module 514 via the filter 326 can share the same lens 324 forming a confocal system, which can provide for improved image quality over configurations in which the light source and camera do not share a common lens.

In an embodiment, the distance between the lens and the focus is equal to the focal length regardless the shape of the beam path. the fold distance from the lens 324 to the FPA 506 via the beamsplitter 504 is equal to the focal length (f) of the lens 324. The distance from the lens 324 to the partial filter 326, or (f), is the same.

In some embodiments, the beamsplitter 504 transmits 90% or so of the light from the light source 502 and reflects 10% or so of the light from the illuminated scene to the FPA of the camera 506. The light transmission and reflection values with respect to the beamsplitter 504 are not limited to the above percentage values; other suitable transmission and reflection parameters are equally applicable.

As shown in the layout of the light source module 502 portion of the lamp system 500 of FIG. 12A, light from the narrow beam LED or the like passes through the partial filter 326, the beamsplitter 504, and the lens 324 and projects onto an illumination spot in the area of the user's interest. The filter region 323 of the filter 326 provides for the image of the control spot in the illumination region. The control spot is illuminated by the filter light. The remainder of the illumination spot is illuminated by unfiltered light.

As shown in FIG. 12B, the sensor module portion 504 comprises a thermal sensor 509, a lens 324, the beamsplitter 504, and a focal plane detector array (FPA) in the camera 506. In some embodiments, a 2-dimensional position sensitive detector can be provided in lieu of the FPA. In some embodiments, only the illuminated area is imaged by the FPA or the 2-dimensional position sensitive detector. A light beam B can be directed by the beamsplitter 504 to the FPA. The sensor 509 can detect thermal light or the like from a hand gesture at the illuminated area, more specifically, positioned over the control spot.

Figure 13:
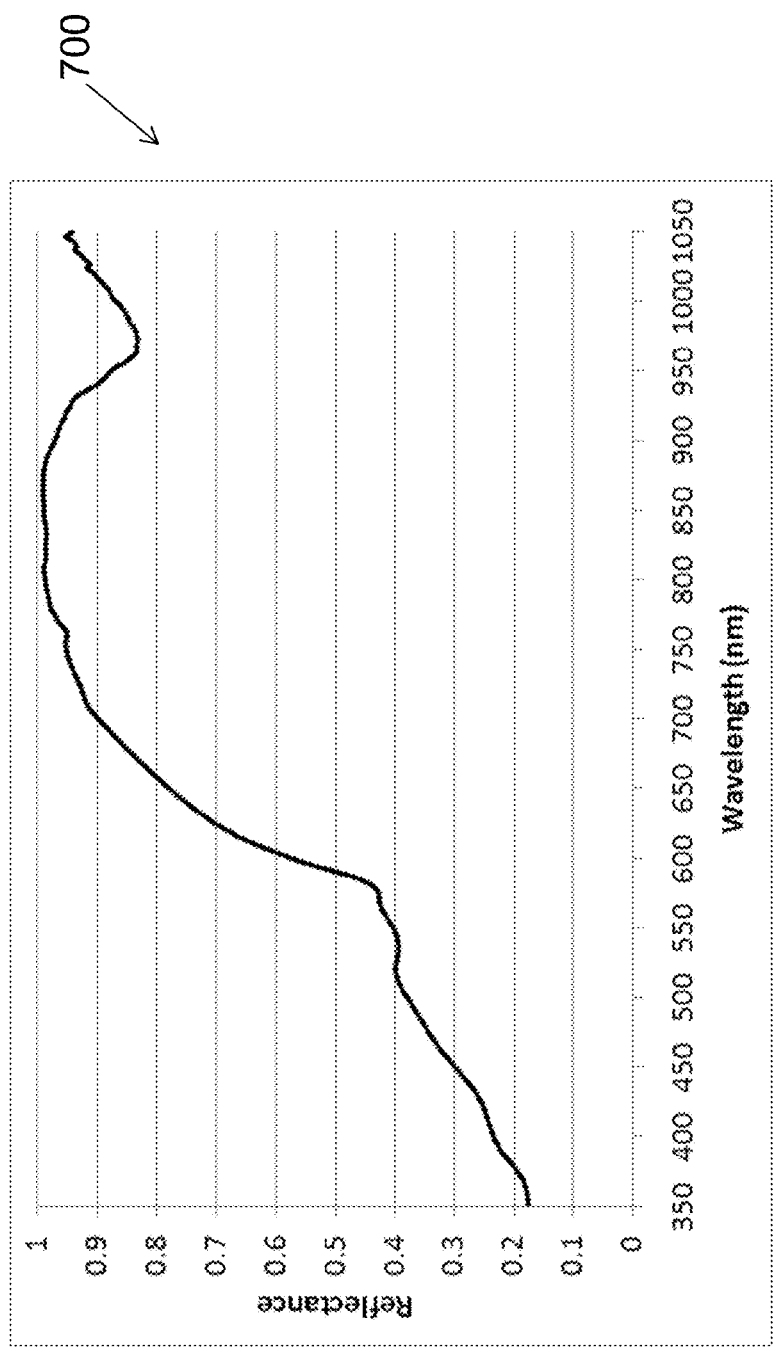
FIG. 13 is a graph illustrating spectral reflectance of human skin, in accordance with an embodiment.

FIG. 13 is a graph 700 illustrating the spectral reflectance characteristics of human skin, in accordance with an embodiment. As illustrated in FIG. 13, human skin exhibits an absorption valley in its reflectance spectrum at 970 nm. Its reflectance at 800 nm is high relative to other wavelengths. In addition, the illumination source (white LED module) has no light at and near these two wavelengths. Therefore, measurements using these two wavelengths are highly accurate. To exploit this property, skin sensor can be constructed. In some embodiments, a skin detection sensor in accordance with an embodiment can employ a two color detection in the near infrared (NIR) range to identify human skin in a control spot.

Figure 14:
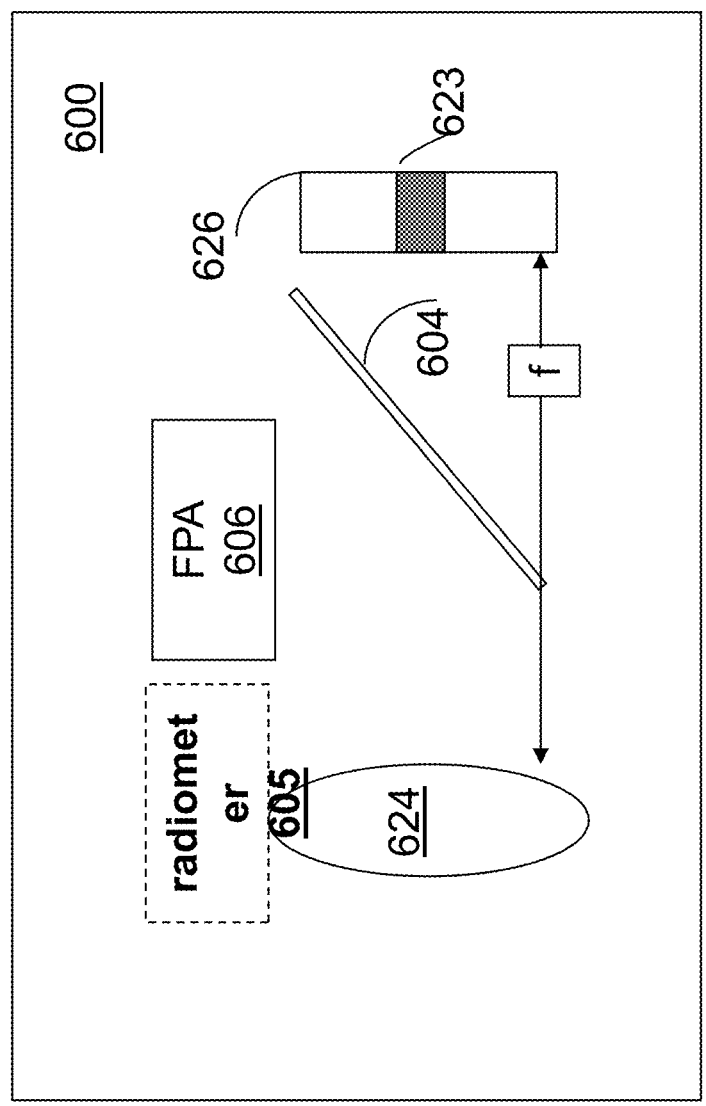
FIG. 14 is a block diagram of a skin detection sensor, in accordance with an embodiment.

FIG. 14 is a block diagram of a skin detection sensor 600, in accordance with an embodiment. As described herein, some embodiments include the sensing of human hand being performed by a thermal sensor. In other embodiments equally applicable to the principles of the present inventive concepts, the skin detection sensor 600 can be used instead of a thermal sensor for sensing the presence of a human hand, for example, to determine hand gesture commands. The skin detection sensor 600 can comprise a camera or a radiometer 605 and a 3-color LED source 623 of mounted on a blank filter 626. The radiometer 605 can comprise a lens and a silicon detector. It measures radiance. In some embodiments, the camera and the 3-colored LED source 623 do not share the lens. In some embodiments, the camera and the 3-colored LED share 623 the same lens as skin sensor 600 illustrated in FIG. 14. The camera of skin detection sensor 600 can include a lens 624, an FPA 606, and a beamsplitter 604. The beamsplitter 604 folds the focusing beam to the FPA 606 and allows the transmission of the 3-colored LED light. The transmission and reflection ratio is but limited to a ratio of 90:10. In some embodiments, the blank filter 626 and the 3-colored LED 623 can be positioned at or near the focal plane of the lens 624 having a focal length (f). This will ensure the 3-colored LED only illuminate the control spot.

FIGS. 15A and 15B provide a detailed description of a 3-colored LED. FIG. 15A is a side view of a 3-colored LED 800, in accordance with an embodiment. FIG. 15B is a top view of the 3-colored LED 800 of FIG. 15A. In some embodiments, the 3-colored LED source 800 comprises 3 LEDs, a blank filter substrate 806, and a light-pipe assembly 804, which in turn comprises of three input light pipes 812 and an output light pipe 814. The light pipes will transport the 3-colored LED light to the exit port 808 of the light pipe assembly. The 3 LEDs 802A, 802B, and 802C are operating at 800 nm (NIR), 620 nm (red), and 970 nm (NIR), respectively. The choice of 3 colors is not limited to the above values in this embodiment design. The 3 LEDs are placed at the entrance of the input light pipes 812. The output light pipe 814 is mounted on the blank filter substrate 806, for example, formed of BK7, plastic, or the like, so that its exit port 810 is facing the beamsplitter 604 and the lens 624 as illustrated in FIG. 13. The exit port and the blank filter 806 is positioned at the focal plane of the lens 624 so only the control spot is illuminated by the 3-colored LED.

Figure 15C:
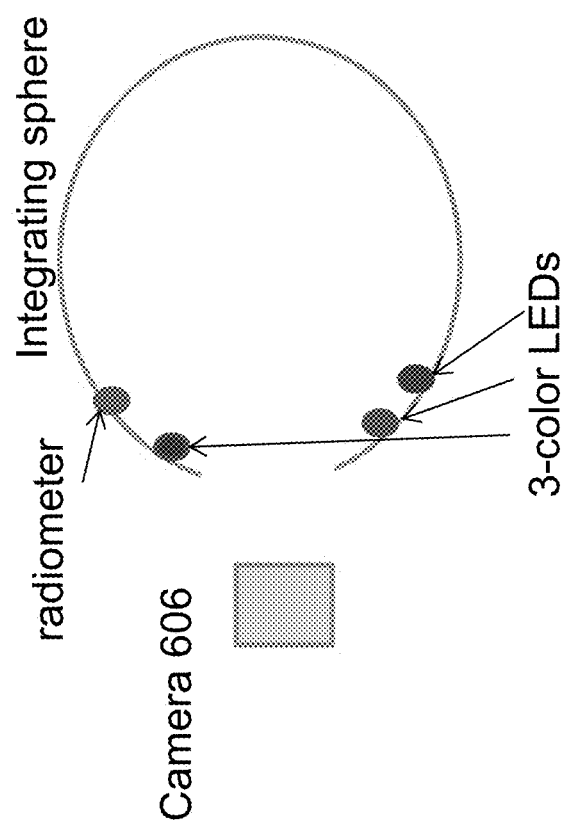
FIG. 15C is an illustration of a light-emitting control system undergoing a radiometric calibration, in accordance with an embodiment.

To perform skin detection, target reflectance at 800 nm and 970 nm must be measured in target images. The two NIR LEDs from the 3-colored LED at 800 nm and 970 nm can be used to illuminate the target in the control spot. The camera, the radiometer, and the 3-colored LED are synchronized. In some embodiments, the LEDs of the light source can turn on and off sequentially so the camera 606 can capture the images at the wavelengths corresponding to the three colors separately, and the radiometer radiance of the three illuminations separately. In an embodiment, each color has duration of 33 milliseconds. For example, the second LED 802B, e.g., the red LED, is activated first, followed by the first LED 802A, e.g., the 800 nm LED, then the third LED 802C, e.g., 970 nm LED. The output of the captured images are in unit of digital number (DN) not reflectance. Radiometric calibration of the camera is needed to obtain reflectance for each pixel. In some embodiments, skin detection relies on a radiometricly calibrated camera 606 to measure target reflectance. In some embodiments, performing a skin detection operation includes the use of a radiometer 605 to measure target reflectance. Radiometric calibration is typically performed to determine a set of radiometric coefficients to convert the camera images into input light at the camera aperture in unit of radiance. FIG. 15C and Eq. (1) to (4) illustrate the radiometric calibration process and its application.

Figure 15D:
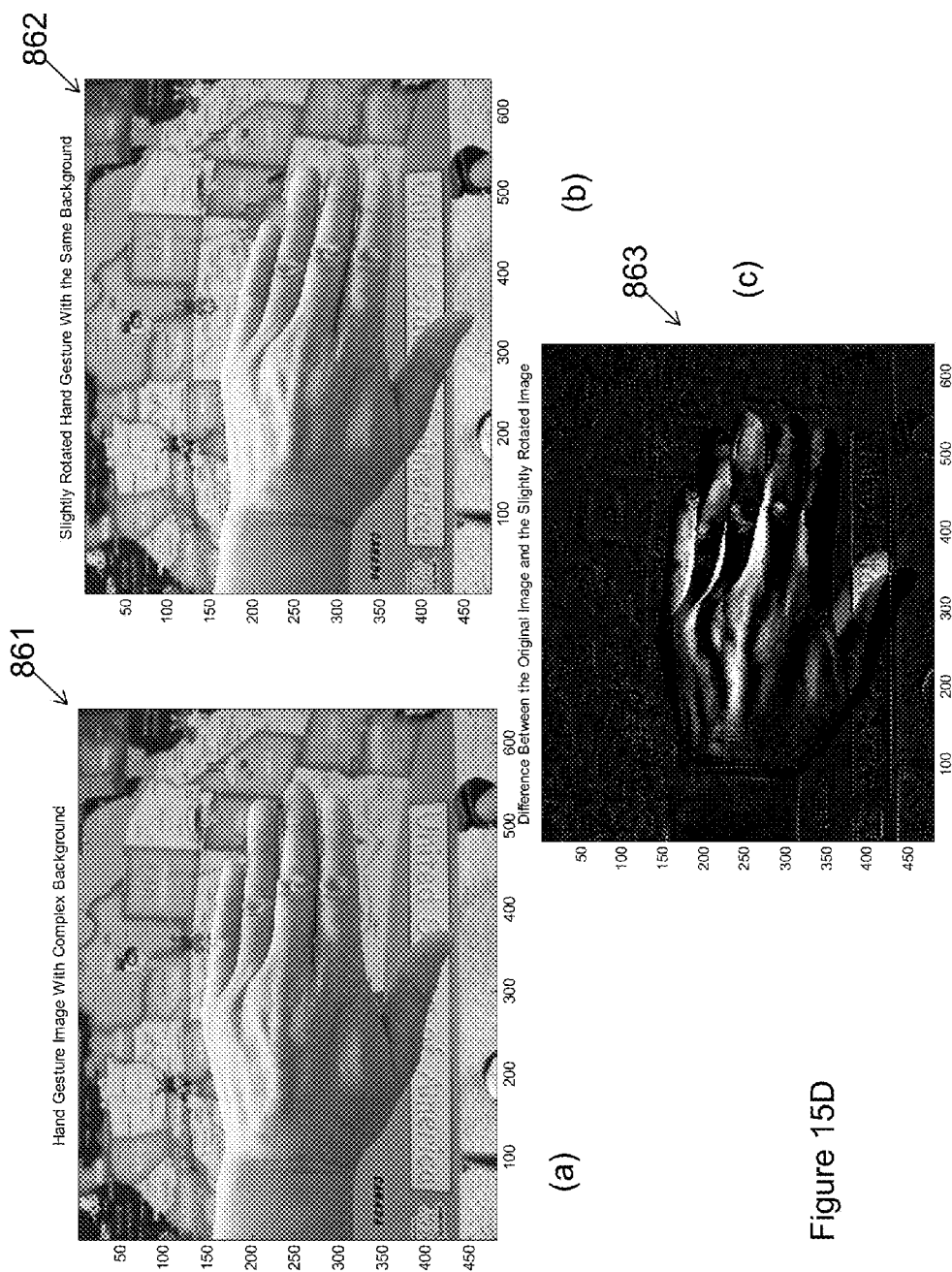
FIG. 15D is an illustration of a set of images generated in accordance with an embodiment.

As shown in FIG. 15D, the background of a hand gesture can be very complex. It is desirable to suppress or even eliminate it before hand gesture information is extracted. Since the reflectance of human skin is unique at 800 nm and 970 nm, one can use the skin sensor to obtain reflectance images at these two wavelengths and eliminate non-skin background. As in skin detection, radiometric calibration of the camera is necessary. In some embodiments, radiometric calibrated skin sensor 600 can be used to suppress or eliminate the hand gesture background.

Before the camera 606 is integrated into the system, it can be radiometricly calibrated by using a uniform, extended light source such as integration sphere 750 with 3-color LEDs 752 and a radiometer imbedded. The camera 606 is placed in front of the exit port of the integrating sphere as shown in FIG. 15C. The LEDs of each color can be turned on and off and adjusted individually. The radiometer measures the output radiance of the integrating sphere. Two images at two radiance levels are captured for each color. The procedure is called two-point radiometric calibration. For simplicity, only one detector of the FPA is shown in all calculations. The same calculations can be applied to all other detectors. For given aperture radiance $L_k$ at the camera, Equation 1 are the two-point radiometric calibration equations expressing the aperture radiance of the LED color k in terms of the camera output in digital number ($DN_k$) for a given detector. ($c_{k1}, c_{k0}$) are the radiometric coefficients of the detector.

$$\begin{cases} L_{k30} = c_{k1} * DN_{k30} + c_{k0} \\ L_{k70} = c_{k1} * DN_{k70} + c_{k0} \end{cases} \quad \text{(Eq. 1)}$$

To keep the camera response in the linear region, the signal levels are selected such that the detector DN is 30% and 70% of the full well, respectively. In Eq. (1) ($L_{k30}, L_{k70}$) are radiance of source k at two different signal levels. k=1, 2, 3 is the color index. Index 1 is for NIR LED at 800 nm, index 2 for red LED, and index 3 for NIR LED at 970 nm. ($DN_{k30}, DN_{k70}$) are the pixel value of the camera detector due to color k at two radiance levels ($L_{k30}, L_{k70}$). Radiometric calibration coefficients ($c_{k1}, c_{k0}$) can be solved from Eq (1) for each color k.

Once the camera radiometric coefficients ($c_{k1}, c_{k0}$) are found for all camera detectors, the coefficients can be stored in the processor 410. The camera 606 can be integrated into the system. Images of the control spot illuminated by the 3-color LEDs 800 can be converted into radiance by using radiometric coefficients as shown in Eq. (2). $DN_k'$ is the detector response to target radiance $L_k'$. The prime is used here to indicate the images are scene images.

$$L_k' = c_{k1} * DN_k' + c_{k0} \quad (2)$$

The radiance image of Eq (2) can be further converted into reflectance images. The reflected radiance at the camera aperture is target reflectance $r_k$ times the illuminated radiance $L_k$ of the 3-color LEDs. $L_k$ can be measured after the system is integrated. Therefore, the reflectance image can be determined as shown in Eq. (3)

$$r_k = \frac{L_k'}{L_k} \quad \text{(Eq. 3)}$$

If the illumination radiance of 800 nm LED is adjusted to equal to that of the 970 nm LED, then the ratio of the reflectance images due to NIR LED at 800 nm (index 1) and at 970 nm (index 3) is given by Eq. (4), which is simply the ratio of the aperture radiance of the two NIR images obtained from Eq. (2).

$$R_{13} = \frac{r_1}{r_3} = \frac{L_1'}{L_3'} \quad \text{(Eq. 4)}$$

Referring to Eq. (4), skin detection can be accomplished by simply find the ratio of the two radiometricly calibrated NIR image. The radiance ratio of each pixel can be compared to the reflectance ratio of the human skin reflectance curve at 800 nm and 970 nm in FIG. 13. In some embodiments, the above method is used for skin detection. If the radiance ratio of a pixel matches or closely matches to the reflectance ratio of the human skin at 800 nm and 970 nm in FIG. 13, then assign 1 to this pixel, otherwise assign 0 to it. In some embodiments, this above process is employ to eliminate background. When a radiometer is used, the measured radiance ratio between the 800 nm and 970 nm illuminations is compared to the skin reflectance ratio between 800 nm and 970 nm. If there is a match, presence of a hand is confirmed.

In sum, a processor at the skin detection sensor 600 can determine the imager ratio of the two NIR images due to the two NIR LEDs. If the ratio in a region within the image is close to that of the ratio of the two spectral points in the human skin spectrum, then this region is set to 1, and all other regions are set to zero. The regions with the zero value is determined to be the background.

Figure 16:
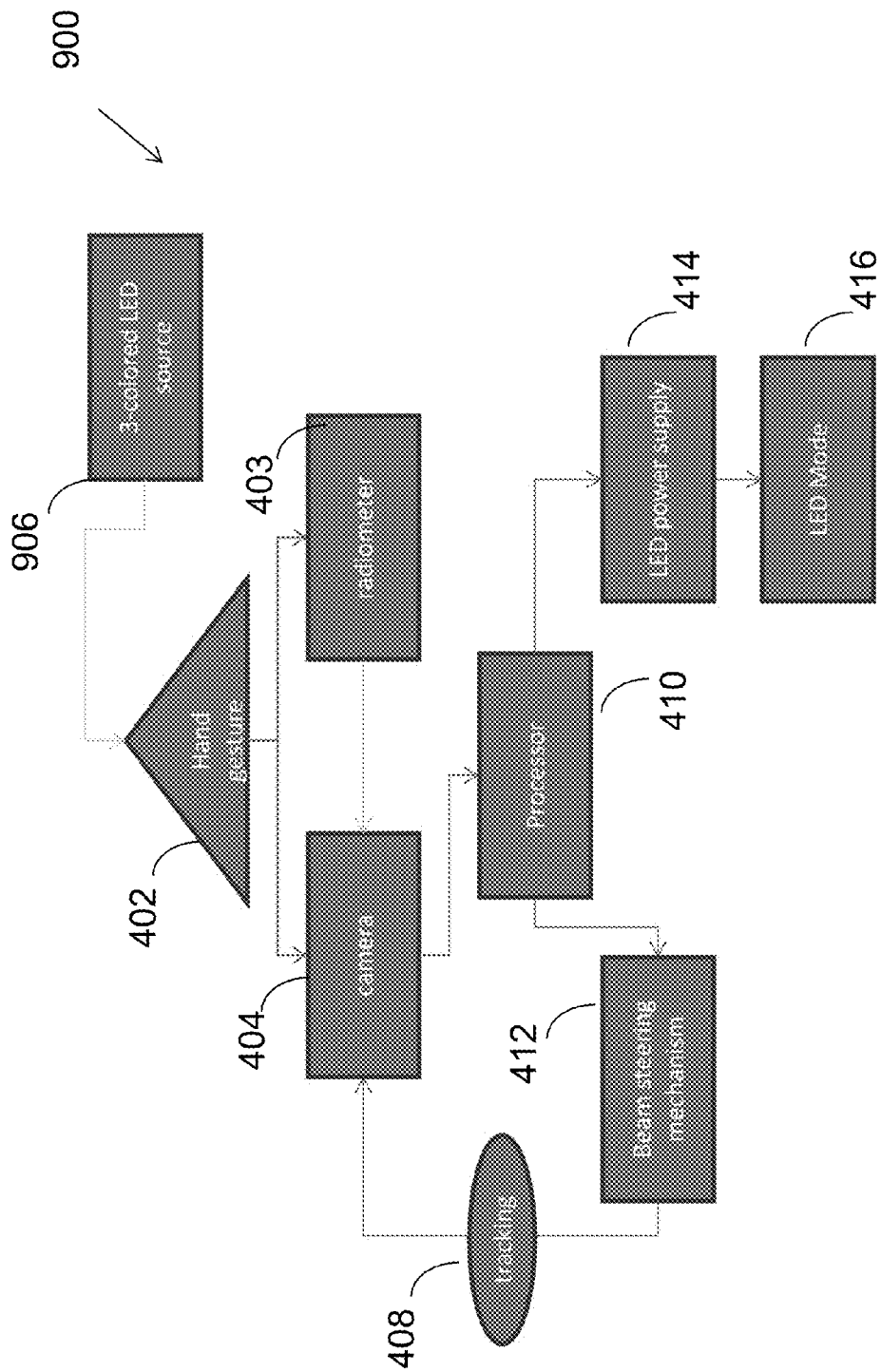
FIG. 16 is a flowchart illustrating an interoperability between elements of a light-emitting device control system, in accordance with an embodiment.

In the present embodiment, since a skin-detection-type human hand sensor is employed, for example, described herein, a method for performing a smart lamp operation can be different from the above embodiment of FIG. 10. Accordingly, as shown in FIG. 16, the thermal sensor 406, for example, described in FIG. 10, can be replaced by a skin sensor 600. In some embodiments, skin detection uses the 3-colored LED and a radiometrically calibrated camera. In some embodiments, skin detection uses the 3-colored LED and a radiometer. In some embodiments, radiometer is used for skin detection and radiometricly calibrated camera is used for hand gesture background removal and hand gesture recognition. In an embodiment, the 3 LEDs 802A, 802B, 802C, are turned on and off sequentially. In an embodiment, each color has duration of 33 milliseconds. For example, the second LED 802B, e.g., the red LED, is activated first, followed by the first LED 802A, e.g., the 800 nm LED, then the third LED 802C, e.g., 970 nm LED. In an embodiment, a camera 404 operates at 30 Hz and is in synchronization with the 3-colored LED arrangement. The camera 404 can capture all three color images. If the skin sensor detects human skin, the images will be sent to the processor 410, for example, a DSP or single board computer for processing.

Figure 17:
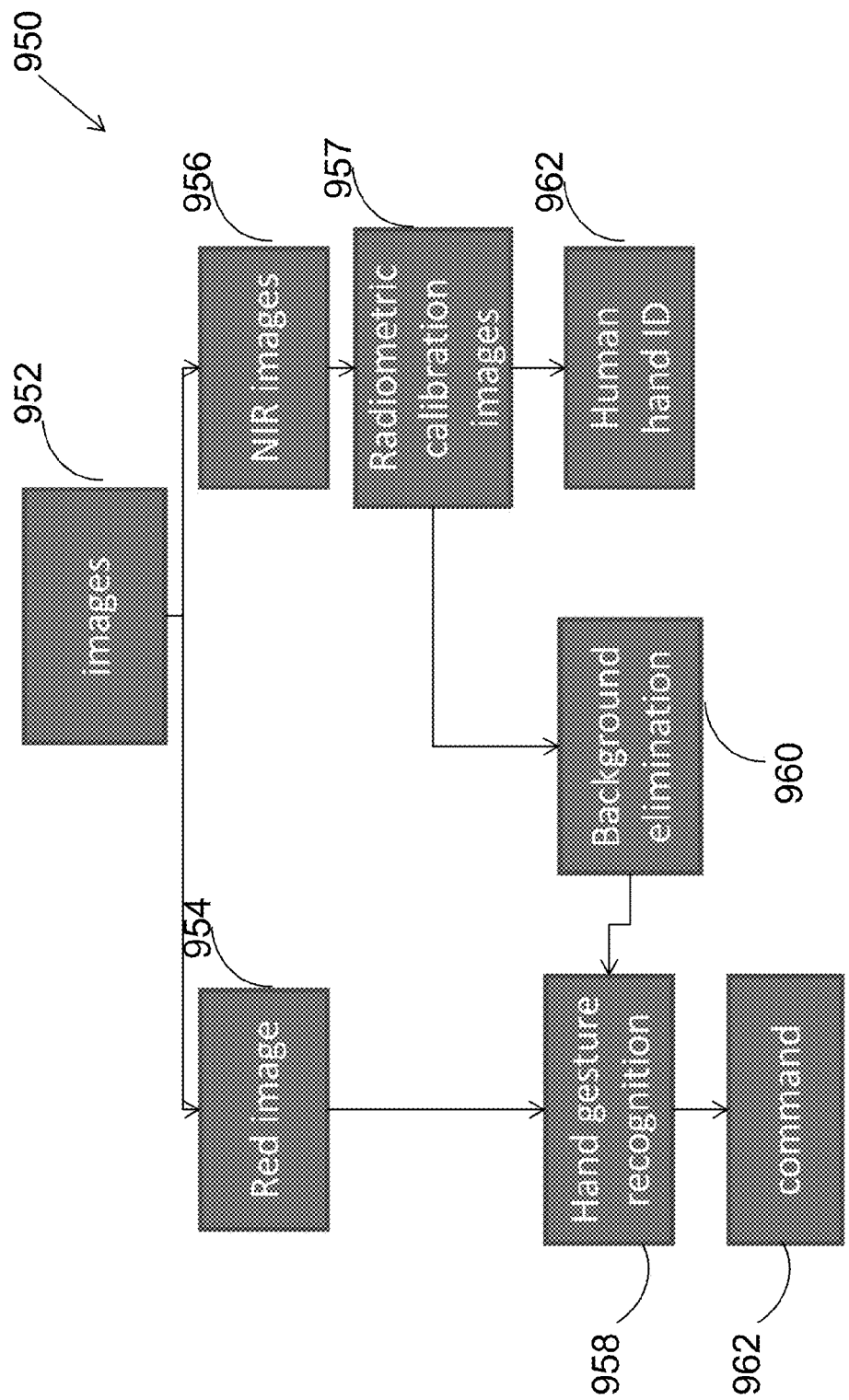
FIG. 17 is a flowchart illustrating a method for determining a hand gesture, in accordance with an embodiment.

FIG. 17 is a flowchart illustrating a method 950 for determining a hand gesture, in accordance with an embodiment. In describing the method 950, reference can be made to elements of FIGS. 15 and 16, or elements of other figures described herein. At the processor 410, the NIR (800 nm and 970 nm) images 956, related to the first and third LEDs 802A, 802C, respectively, are converted into an aperture radiance by using the radiometric calibration coefficients for human hand identification. If a determination is made, for example, at the processor 410, that the ratio of these two images 956 in the control spot region 104 matches the band ratio at 800 nm and 970 nm of the human hand, for example, shown in FIG. 13. Pixels in regions with human hand identified are set to 1. The rest of the regions belonging to background are set to zero. The background regions in all bands are the same. The processor 410 can then process the red image 954, i.e., related to the second LED 802B, for hand gesture determination. Once the hand gesture is recognized 958, the processor 410 can generate an appropriate command 962, as described herein, for example, after performing a comparison with known hand gesture images stored at a database or the like.

In some embodiments, the hand gesture motions can be employed to suppress background. FIG. 15D illustrates an operation. The top left picture is a hand gesture with a very complex background. The top right picture is the same hand gesture slightly rotated. The bottom picture is the difference between the two pictures. The background remains fixed while the hand gesture moves. The background is removed or suppressed when one image is subtracted from the other as illustrated in the bottom picture.

Figure 18A:
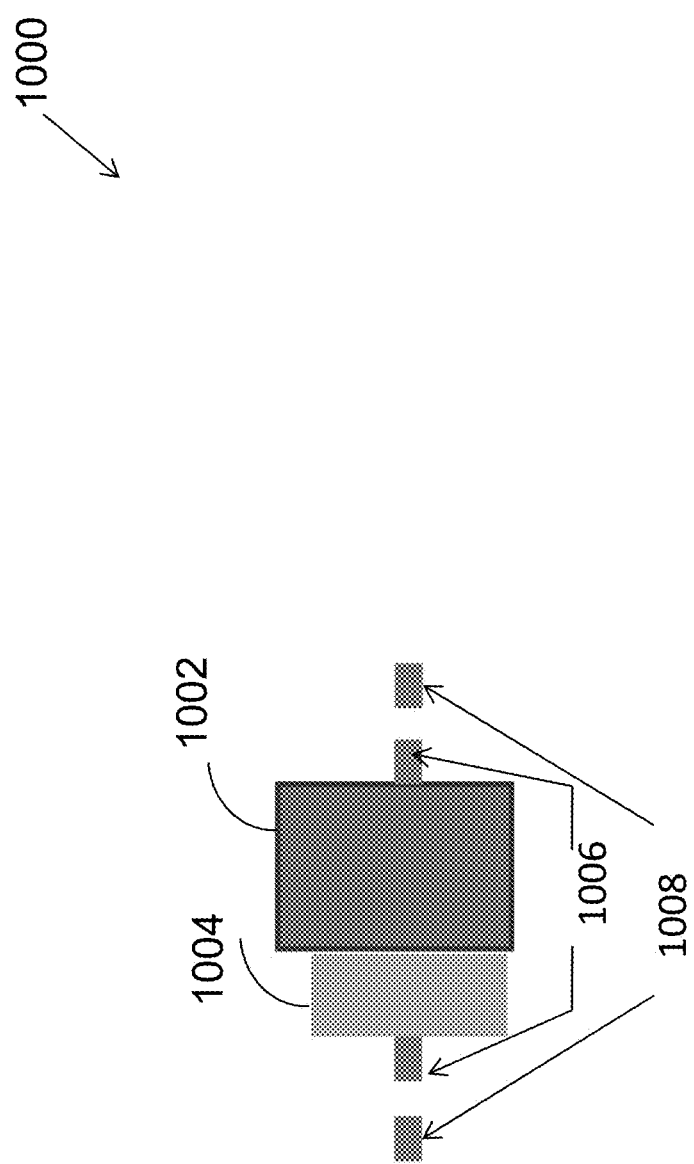
FIG. 18A is a side view of a beam steering mechanism, in accordance with an embodiment.
Figure 18B:
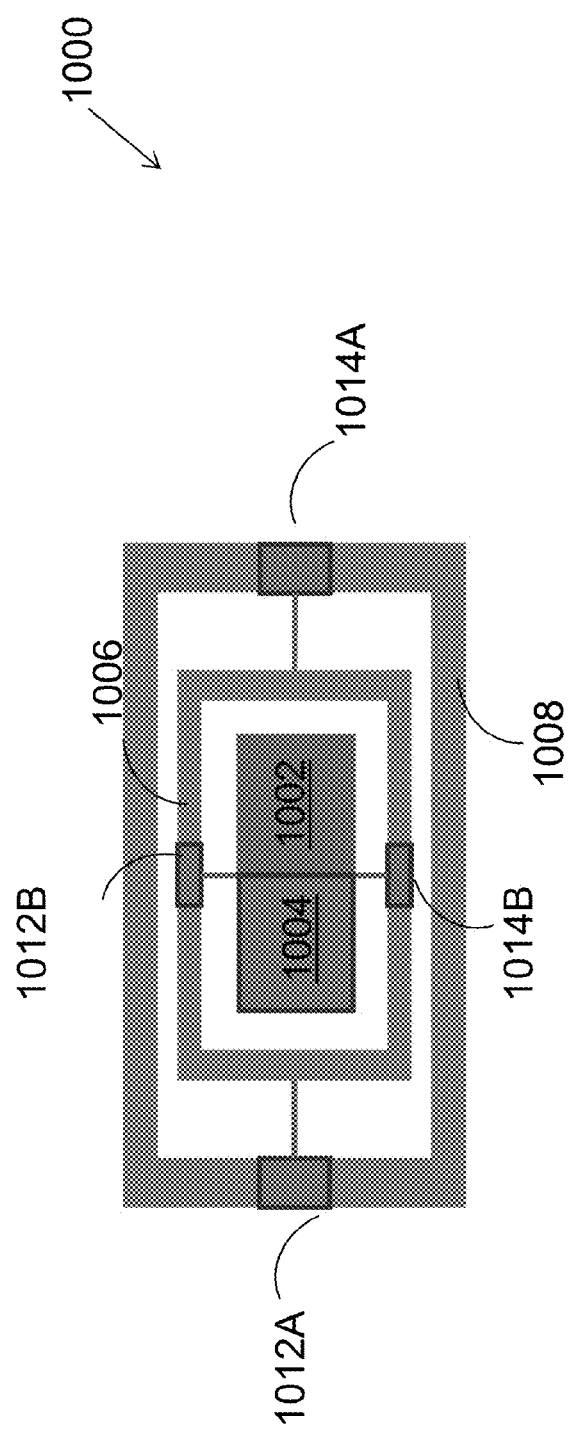
FIG. 18B is a top view of the beam steering mechanism of FIG. 18A.

FIG. 18A is a side view of a beam steering mechanism 1000, in accordance with an embodiment. FIG. 18B is a top view of the beam steering mechanism 1000 of FIG. 18A. Referring again to FIG. 6, the beam steering mechanism 304A includes a mirror 346 positioned on a gimbal 340. The light source module 302 and the tracking and control sensor 306 remain stationary while the moving gimbal mirror 346 steers a light beam. In another embodiment, as shown in FIGS. 18A and 18B, elements of a light source module 1002 and a sensor module 1004 can be, co-located, and directly mounted on a gimbal. The sensor module 1004 can include a camera. Optionally, the camera can at a separate location, for example, shown in FIG. 20.

The beam steering mechanism 1000 can comprise a dual-axis gimbal having an outer ring 1008 and an inner ring 1006. As shown in FIG. 6A, the required length of the mirror 346 increases as the pitch angle increases, which may require an increase in system size. The beam steering mechanism 1000 does not include a mirror and can have a smaller footprint than the system having the mirror 346. Beam steering is achieved by the yaw and pitch motions of the light source module 1002 and sensor module 1004. Yaw and pitch motors 1014A and 1014B are mounted on the inner and outer gimbal rings, respectively. Counterweights 1012A, 1012B can be mounted on the outer ring 108 and inner ring 1006, respectively, for balancing and stabilizing the gimbal. The gimbal in FIGS. 18A and 18B can be a pitch and yaw type. The light source module and the tracking and control sensor can be mounted on a pitch and roll gimbal.

Figure 19:
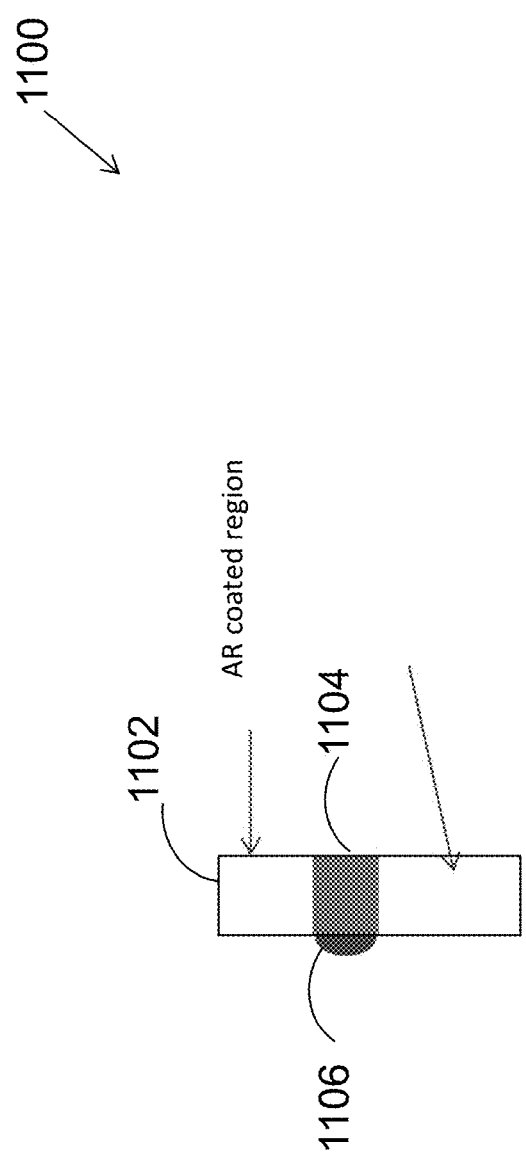
FIG. 19 is a diagram of a control spot illuminator, in accordance with an embodiment.

FIG. 19 is a diagram of a control spot illuminator 1100, in accordance with an embodiment. In some embodiments, for example, described herein, the illumination of the control spot is performed by filtering light from an LED at a light source module. In some embodiments, the filter region allows only colored light from the light source module to pass through the filter. Because the filter region corresponds with the image of the control spot, only filtered light illuminates the control spot. In another embodiment, as shown in FIG. 19, a color LED 1106, also referred to as a control spot LED, can be placed at the location of the filter region 1104 of a partial filter 1100, preferably at the focal plane of the light source. The color light that illuminates the control spot is provided from the color LED 1106, for example, instead of a lamp, LED, or other light source. In some embodiments, the substrate 1102 to which the color LED is attached comprises glass or plastic. In some embodiments, the substrate 1102 can be made from other materials known to those of ordinary skill in the art. In some embodiments, the substrate 1102 can be anti-reflection coated on one or more surfaces to increase light transmission. In some embodiments, the color LED 1106 can be a single color LED. In some embodiments, the color LED 1106 can be a red green blue (RGB) color LED. In some embodiments, the color LED 1106 can be a combination of red and two NIR LEDs.

FIG. 20 is a diagram of a control system 1200 for a light-emitting device, in accordance with another embodiment. In some embodiments described herein, the field of view (FOV) of a camera of a tracking and control sensor follows a generated illumination spot via a beam steering mechanism. As the beam steering mechanism steers the illumination spot to a different area, the FOV of the camera can also follow the illumination spot to this area. In some embodiments, for example, illustrated at FIG. 20, the camera 1202 can be detached from, and at a physically separate unit, than other elements of the control system such as the beam steering mechanism 1208, and/or an LED source 1204 and a sensor 1206. In this case, the field of view of the camera 1202 remains stationary as the illumination spot moves. In this embodiment, the field of view of the camera 1202 can be large enough to encompass the maximum movement of the illumination spot.

FIG. 21 is a diagram of the light-emitting device control system 1200 of FIG. 20, in accordance with another embodiment. Here, a camera 1310 placed outside beam steering portion 1308 of the light-emitting device control system 1300. Referring again to FIGS. 18A and 18B, a camera can be placed outside the gimbal. In some embodiments, a lens with a 2-dimensional position sensitive detector can be implemented instead of a camera. Other elements of the light-emitting device control system 1300, such as a light source module 1302, controller 1308, and sensor 1309 are similar to or the same as those described in FIG. 3, and/or corresponding elements described in FIG. 20; thus, details thereof are omitted for brevity.

Figure 20A:
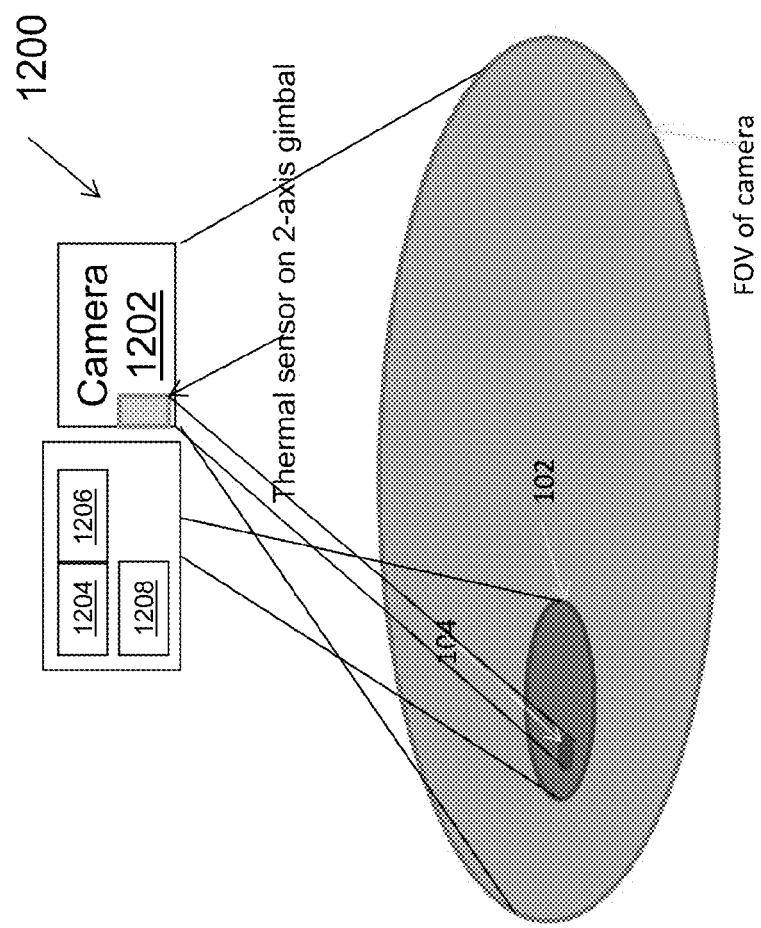
FIG. 20A is a diagram of a light-emitting device control system, in accordance with another embodiment.
Figure 21A:
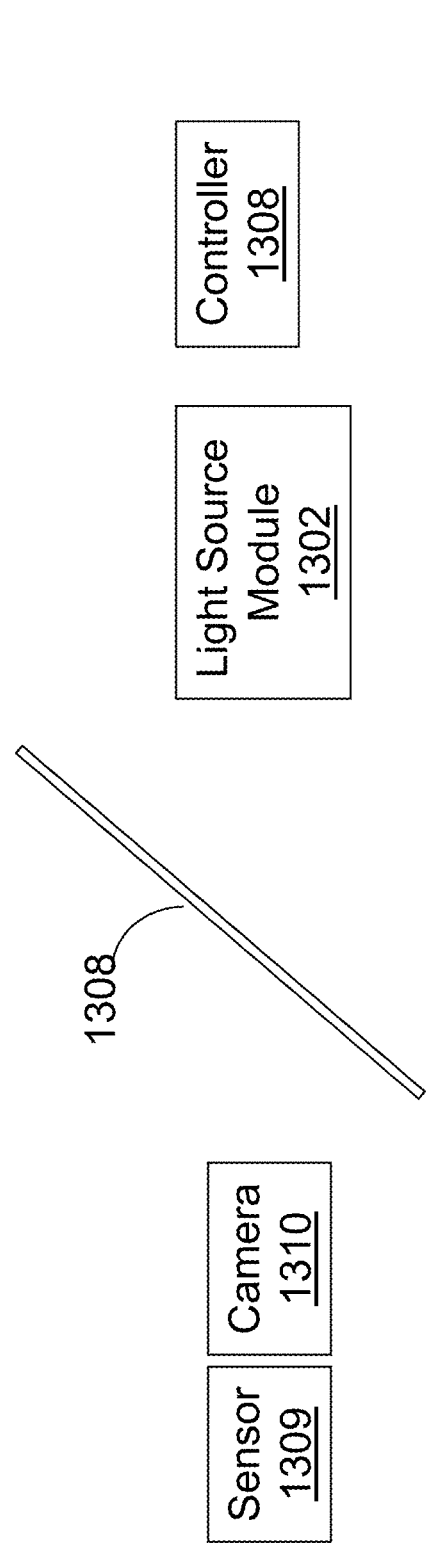
FIG. 21A is a diagram of a light-emitting device control system, in accordance with another embodiment.

In FIG. 20A both camera and thermal sensor are outside of the beam steering mechanism. The camera requirements and functionalities are the same as in FIG. 20 and will not be repeated for reasons related to brevity. The thermal sensor is however, mounted on a mini-gimbal similar to that in FIGS. 18A and 18B. The gimbal uses the gimbal angles of the beam steering mechanism of 304 to track the control spot. FIG. 21A is similar to FIG. 21 except that the thermal sensor is positioned outside of the beam steering mechanism.

FIG. 22 is a side view of a tracking and control sensor 1400, in accordance with an embodiment. FIG. 23 is a side view of a tracking and control sensor 1410, in accordance with another embodiment. The tracking and control sensor 1400 and/or sensor 1410 implemented at the light emitting device control system 100 shown in FIG. 3.

In an embodiment, the tracking and control sensors 1400, 1410 are each assembled in a common unit. Here, a plurality of LEDs or the like, a visible FPA, and a thermal detector or FPA can share the same lens but split the aperture, and illuminate at the same target. As shown in FIG. 22 and FIG. 24, the tracking and control sensor 1400 comprises a refracted optics element 1402, such as a refracted Cleartran™ lens, a multi-face pyramid prism mirror 1404, a thermal detector or array 1428 comprising thermopile, pyroelectric, or related materials, and a visible FPA 1406 preferably including a filter. As shown in FIG. 23, the sensor 1410 can include a reflected focusing optics 1412, such as a Cassagrain type, a three-face pyramid prism mirror 1404, a thermal detector 1428 (an array can equally apply), and a visible FPA 1416 (1416, 1406, and 1426 are the same). The thermal detectors in both 1410 and 1400 have filters. The tracking and control sensors 1400, 1410 can each include a color LED source or three-color LED-lightpipe assembly, for example, as shown in FIG. 15A and FIG. 15B.

An operation will now be described with reference to FIG. 24. FIG. 24 is the top view of a sensor 1420, which can be the same or similar to sensor 1400 or sensor 1410. The dotted circle denotes a lens or Cassagrain optics entrance aperture projected onto the 3-faced pyramid mirror. Light is received from a scene target, for example, an illuminated region 102 having the control spot 104 over which is positioned a human hand or other object as shown in FIG. 2B. The received light cone propagates through a lens, for example, lens 1402 of FIG. 22 or the Cassagrain optics 1412 of FIG. 23 to the pyramid prism mirror. The light cone is divided into a plurality of equal portions. The received light contains visible light from the control spot 104 and the thermal light from a hand gesture. A first portion L1 of the received light can pass through a visible filter (not shown) and focus onto a visible FPA 1406. In particular, the visible filter rejects the thermal light and permits the visible light pass through onto the visible FPA 1406. A second portion L2 of the received light can pass through an infrared filter (not shown) and focus onto a thermal FPA or thermal detector 1428. The thermal detector 1428 can be part of the thermal sensor 309 described herein. In particular, the thermal filter can reject the received visible light and permit the thermal light pass through to the thermal detector 1428. A third portion L3 of the received light is focused onto a color LED 1422 or the like, for example part of the light source module 302 described herein, and is not used. The light cone in the region L3 has both incoming light from the target and outgoing light from the color LED 1422. The incoming light is much weaker than the outgoing light from the color LED 1422. The outgoing light follows the path of the incoming light to illuminate the control spot 104. The control spot 104 is generated by the filter region of a partial filter, for example, as described by FIG. 4. The color LED in the region L3 can be used for modulation of the control spot so the user can see it more easily. If the 3-color LED-lightpipe assembly described in FIGS. 15A and 15B is placed at L3, one can use the two NIR LEDs to remove background of the hand gesture by using the radiometric band ratio method as described by Eq. (1), (2), (3), and (4) and FIG. 14, 15C herein.

Figure 25:
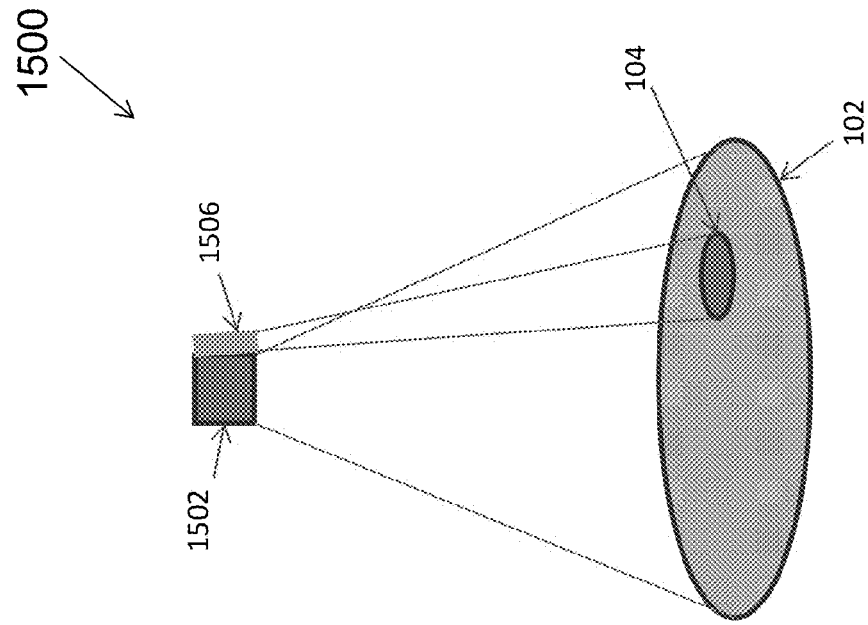
FIG. 25 is a diagram of a light-emitting device control system in accordance with another embodiment.

FIG. 25 is a diagram of a light emitting device control system 1500, in accordance with an embodiment showing how the tracking and control sensor 1410 or 1420 is mounted. The sensor 1410 or 1420 can be purposely tilted during assembly or otherwise is aligned with the control spot 104. The tracking and control sensor of 1410 or 1420 can then directly face the control spot 104.

It is well-known that white LEDs are produced for the purpose of illumination. Because white LEDs are solid state devices, precise modulation is possible. FIGS. 26-29 illustrate the use of LED lights or the like in an optical wireless communication environment. The beam steering properties in accordance with embodiments of the present inventive concepts can include the implementation of an embodiment of the light-emitting device control system to extend the range of data transmission and make data access more convenient. Optical wireless communication has very high data rate potential because of the very high bandwidth of the visible light. Data communication in this format is highly secure, since only the illuminated region can access data. Also, there is no interference between channels, since the illumination light used. No additional light source is required.

Figures 30A, 30B, 30C:
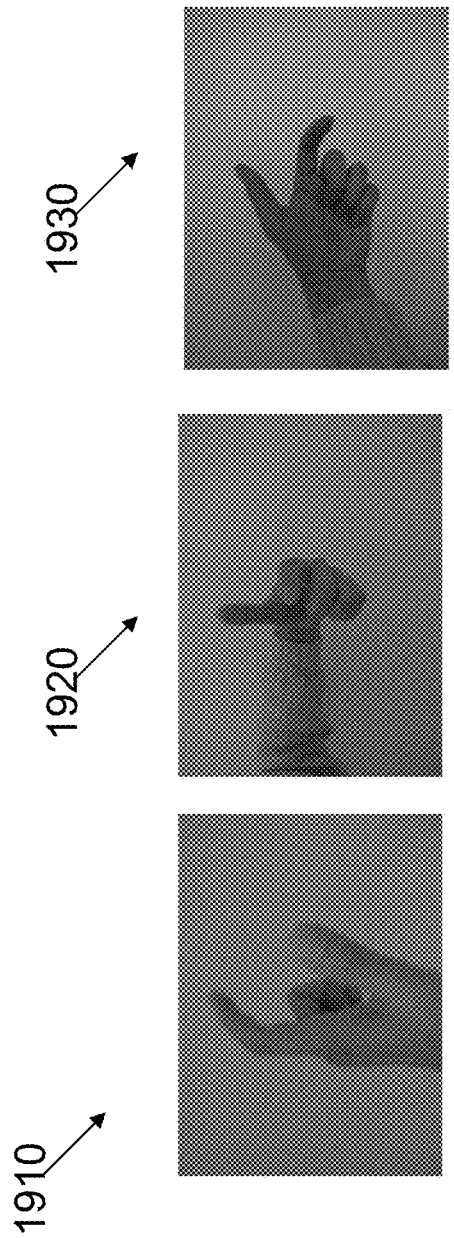
FIGS. 30A-30C are images of a hand gesture from 3 different directions, in accordance with embodiments.
Figure 31:
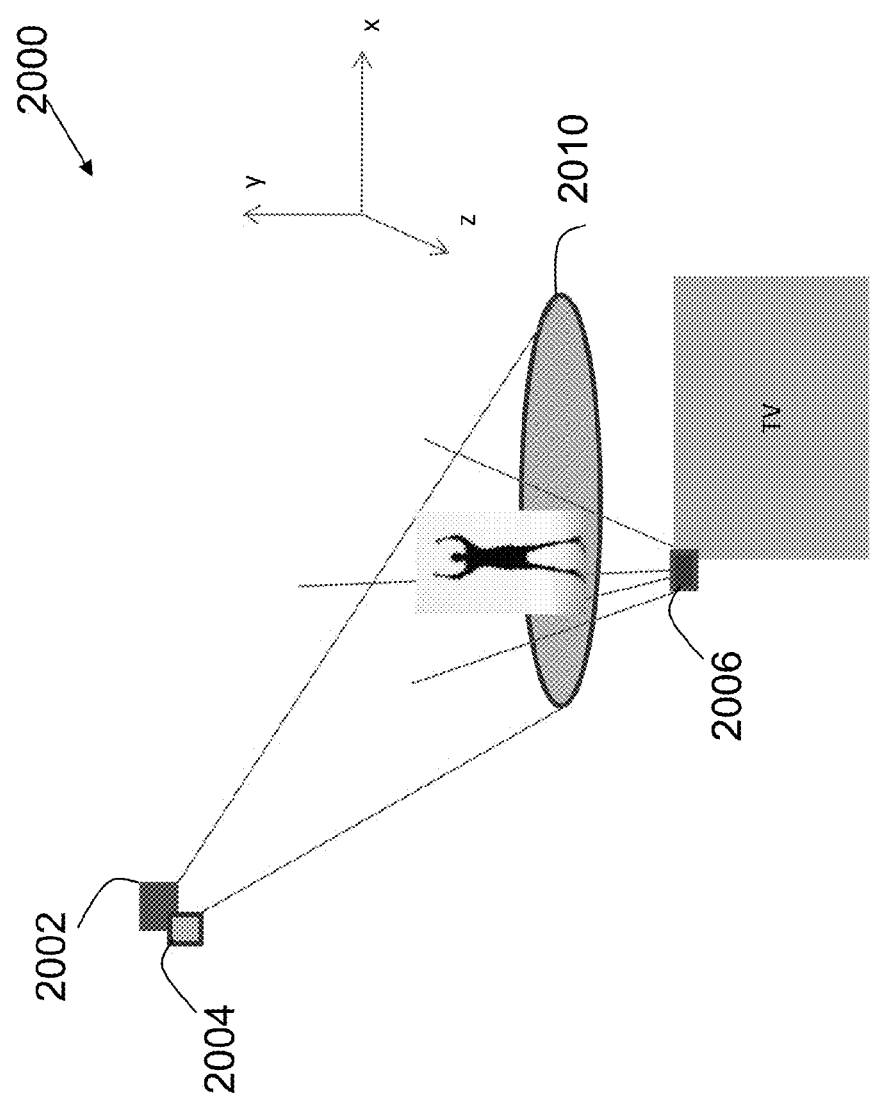
FIG. 31 is a diagram of a 3-D gesture recognition system for single player, in accordance with an embodiment.

Another application, as shown in FIGS. 30 and 31, can include the implementation of an embodiment of a light-emitting device control system with video games, for example, a gesture recognition based video game console such as Microsoft Connect™, which uses a single camera to capture human gestures. Only two-dimension gesture motion in the plane perpendicular to the LOS of the camera is captured by the camera. Motion along the LOS will not be seen. By mounting a camera on the smart LED platform, gesture motion in the third dimension can be captured. Thus, in this manner, the use of two cameras in two different directions makes three-dimension (3-D) gesture recognition possible. The 3-D gesture recognition will potentially allow users to play a video game without game controllers.

Figure 26:
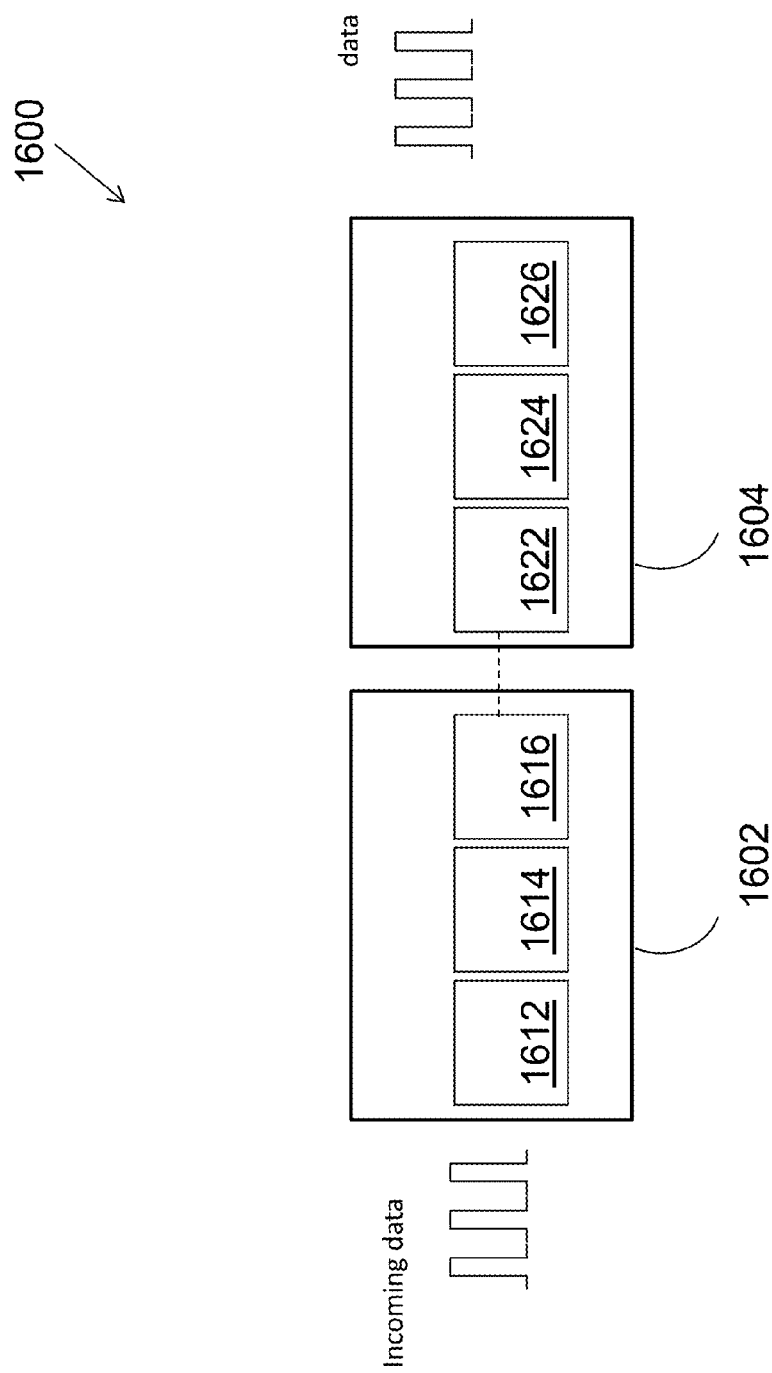
FIG. 26 is a diagram of an optical wireless communications network using illumination light as a carrier for data transmission, in accordance with an embodiment.

FIG. 26 is a diagram of an optical wireless communications network 1600 using illumination light as a carrier for data transmission, in accordance with an embodiment. The network 1600 includes a transmitter 1602 and a receiver 1604.

The transmitter 1602 includes a modulator 1612, a digital/analog (D/A) converter 1614, and an LED lamp 1616. The receiver 1604 includes a photo detector 1622, a demodulator 1624, and an A/D converter 1626.

In the transmitter 1602, incoming data is modulated at the modulator 1612, then converted to an input current at the D/A converter 1614, then output to the LED lamp 1616. The LED lamp 1616 can include some or all of the elements of a light-emitting device control system in accordance with an embodiment, for example, the control system 100 described herein. The LED lamp 1616 can output modulated light to the receiver 1604. In the receiver 1604, the photo detector 1622 converts the light signal from the transmitter into an electrical signal. The signal is demodulated and converted to data by a demodulator 1624 and the A/D converter 1626, respectively. Aspects of visible light wireless communication including transceiver designs and modulation methods can be found in H. Eglala, R. Mesleh, H. Haas, entitled "Indoor Optical Wireless Communication Potential and state-of-the-art," IEEE Communication Magazine, September 2011 at pp. 56-62, N. Kumar, N. Laurenco, M. Spiez, R. Aguiar, Visible Light Communication Systems: Conception and VIDAS, IETE Technical Review, September 2008 at pp. 359-367, R. Mesleh, H. Haas, B. Pricope, entitled "OFDM Visible Light Wireless Communication Based on White LEDs," VTC Spring 2007 IEEE at pp. 2185-2189, and Y. Wu, A. Yang, L. Feng, L. Zuo, Y. Sun, entitled "Modulation base cells distribution for visible light communication," 2012 Optical Society of America, published Oct. 12, 2012, each incorporated by reference in its entirety.

Figure 27:
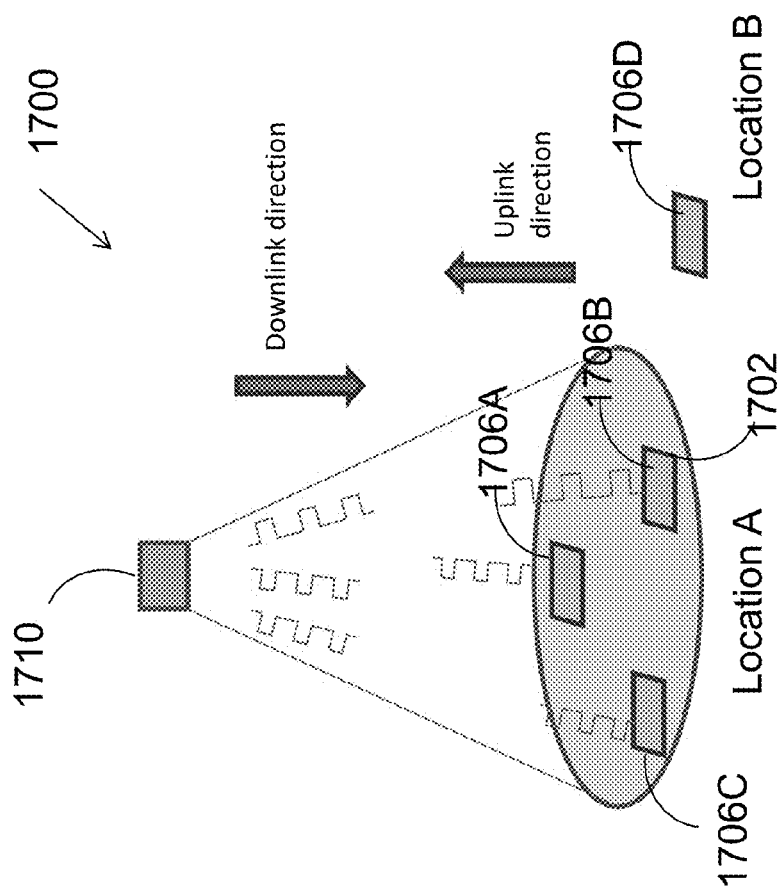
FIG. 27 is a diagram of an optical wireless communications network comprising an LED lamp system, in accordance with an embodiment.
Figure 28:
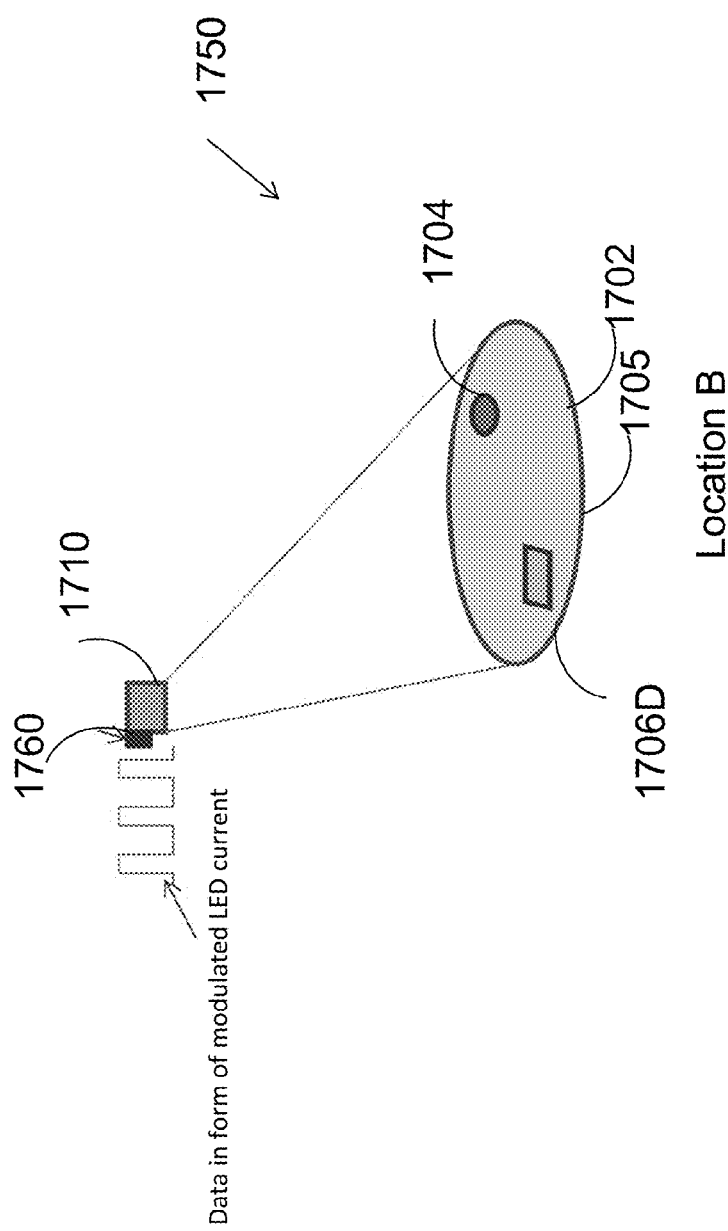
FIG. 28 is a diagram of an optical wireless communications network comprising an LED lamp system, in accordance with another embodiment showing a data coverage range being extended by movement of the illumination region.

FIG. 27 is a diagram of an optical wireless communications network 1700 comprising an LED lamp system 1710, in accordance with an embodiment. The network 1700 can be part of a common indoor optical wireless communication link topology. The network 1700 can include some or all elements of a light-emitting device control system in accordance with some embodiments, for example, those described herein. The LED lamp system 1710 of the light-emitting device control system can be mounted on a ceiling or other fixed surface. The LED lamp 1710 can cast an illumination spot 1702 on a floor or other surface. A control spot 1704 can be generated in accordance with embodiments described herein, for example, activating the LED lamp network 1700 for movement in response to an identified hand gesture positioned over the control spot 1704. The optical wireless communications network 1700 can use the illumination light as a carrier output data in a downlink direction to one or more user electronic devices 1706A, 1706B, 1706C (generally, 1706), for example, wireless computers, smart phones, and so on. The illumination spot 1702 can also serve as a transmitter beam spot. User electronic devices 1706A, 1706B, 1706C in a region of communication, i.e., within the illumination spot 1702, can receive data. Because the modulation rate of the data transmission is too fast for a human eye to detect, the quality of illumination will not be affected. The signal level outside the illumination spot 1702 may be significantly less. A wireless device, for example, electronic device 1706D at location B, in a conventional environment would be unable to access data at a location outside the illumination spot 1702. On the other hand, the LED lamp 1710 in according with some embodiments addresses this problem by providing the LED lamp system 1710, which can move the illumination spot 1702 to a different location, for example, at location B as illustrated in FIG. 28, thereby placing the electronic device 1706D in the illumination spot 1702, thereby increasing a data coverage range.

In some embodiments, the addition of an optical wireless feature requires a modification of the electronics of the LED lamp system 1710. Transmitter electronics can be added to the LED lamp system electronics. A light source module which includes optics and LEDs, for example, described herein, can be the same as the light source module described in embodiments thereon. Therefore, details regarding the light source module will not be repeated for brevity. In other embodiments, the addition of the optical wireless communication capability may change electronic components of the LED lamp system 1710. In an embodiment, a light source module, can include transmitter electronics for converting information into driving current for the light source module, a RF Wi-Fi receiver for uplink communication, a modulator, a D/A converter, a current amplifier, and other electronics, for example, elements shown in FIG. 26. Thus, as shown in FIG. 28, an LED lamp system 1710 can include a transmitter (not shown), and an RF Wi-Fi receiver 1760 mounted on a ceiling or other surface. In some embodiments, the RF Wi-Fi receiver 1760 in some embodiments is external to the LED lamp system 1710. In other embodiments, the RF Wi-Fi receiver 1760 is integrated with the LED lamp system 1710. As can be seen from FIG. 28, the LED lamp system allows the user to move the illumination spot 1702, or transmitter beam spot 1705, to different places. This not only extends the user data access range but also preserves link security because only electronic devices in the illumination spot can transmit and/or receive data.

An optical WiFi user may desire to reduce an illumination when using an electronic device such as a laptop computer or smart phone. However, if the user reduces the illumination too much, the signal at the receiver may become too weak to obtain quality data. A high data rate infrared transmitter can be mounted to the LED lamp system. The white light LED has very little spectrum in the infrared. Therefore, the illumination light will not increase the background of the data transmission light. Operations of the LED lamp system will not affect the data transmission. The user can dim down or turn off the LED lamp system 1710, the transmitter at the LED lamp system 1710 will continue to transmit data. In this embodiment, illumination and data transmission are separated. In some embodiments, near infrared (NIR) light can be used as the data carrier. In other embodiments, short wave infrared (SWIR) light can be used as the data carrier. In some embodiments, the transmitter light source can be LED. In other embodiments, the transmitter light source can be laser. The LOS of the transmitter can be parallel to that of the LED lamp system 1710. The transmitter beam spot 1705 and the illumination spot 1702 are almost concentric, and similar in shape, size, and related configuration parameters. Because the transmitter and the LED lamp system share the same gimbal platform, the illumination spot and the transmitter beam spot move together. In some embodiments where the signal strength is strong, the transmitter beam spot 1705 can be larger than or equal to the illumination spot 1702. In some embodiments where the signal strength is weak, the transmitter beam spot 1705 can be smaller than the illumination spot 1702. Because the transmitter light source is in the infrared not visible to human eye, color illumination of the transmitter beam spot 1705 is needed when it is smaller than the illumination spot 1702. A color illumination spot can be created using a technique described in the control spot in embodiments herein, for example, described with reference to FIGS. 4, 12, and 12A, respectively.

Other applications can include the use LED light for both illumination and optical wireless communication. Here, the beam steering mechanism of a smart LED lamp, for example, lamp system 1710 allows the user to extend the data access range by moving the illumination spot wherever he/she wishes. The user can access data by using his/her optical wireless devices within the illumination spot.

In sum, an optical wireless system in accordance with an embodiment, the transmitter beam spot intersects the illumination spot, they can move together. The beam steering mechanism allows the user to extend the data access range by moving the illumination spot wherever he/she wishes. The user can access data by using his/her optical wireless devices within the transmitter beam spot. The advantages of this configuration are that the transmitter can choose its own light source, the transmitter modulation is not tied to and limited by the illumination source, and data transmission is not affected by the brightness of the illumination spot.

FIGS. 29A and 29B illustrate cases when the transmitter beam spot has a different shape, size, or color configuration than an illumination spot. For example, in FIG. 29A, a transmitter beam spot 1805A greater than or equal to an illumination spot 1802A. In FIG. 29B, on the other hand, a transmitter beam spot 1805B is smaller than an illumination spot 1804B. A control spot 1804A, 1804B (generally, 1804) can be generated in accordance with embodiments described herein, for example, activating the network 1800 for movement in response to an identified hand gesture positioned over the control spot 1804. Details in infrared wireless communications can be found in D. Borah, A. Boucouvalas, C. Davis, S. Hranilovic, K. Yiannopoulos, entitled "A review of communication-oriented optical wireless systems," EURASIP Journal on Wireless Communications and Networking 2012, 2012:91, and K. Wang, A. Nirmalathas, C. Lim, Efstratios, entitled "12.5 Gbps Indoor Optical Wireless Communication System With Single Channel Imaging Receiver," 37th European Conference & Exhibition on Optical Communication, each incorporated by reference in its entirety.

FIGS. 30A-30C are images of a hand gesture 1910, 1920, 1930 taken in three orthogonal directions, respectively, in accordance with some embodiments. Conventional gesture recognition applications implemented in video game systems use a single camera. Thus, only two dimension gesture motion perpendicular camera's LOS can be captured. However, motion along the LOS of the camera cannot be detected by the camera. Gesture motions can include translations and rotations. Gesture rotations are best measured when the camera's LOS is perpendicular to gesture plane. Gesture rotations can occur in all three orthogonal planes. The pictures shown in FIGS. 30A-30C are images of a hand gesture performed with respect to the video game controller captured from three different directions. The hand gesture image 1910 of FIG. 30A is a top view, taken from a camera above the hand, which is positioned over a control spot in an illumination region in accordance with an embodiment, for example, described herein.

The hand gesture image 1920 of FIG. 30B is a front view, taken by a front camera. The hand gesture image 1930 of FIG. 30C is a side view, taken from a side camera. The hand gesture 1910 of FIG. 30A and the hand gesture 1930 of FIG. 30C illustrate a triggering motion by the index finger. However, image shown in FIG. 30A has more motion than the image shown in FIG. 30C because the motion is a rotation in the image plane with respect to the image of FIG. 30A. A button pressing motion by the thumb can be seen in FIGS. 30B and 30C. However, FIG. 30C has more motion than FIG. 30B because the motion is a rotation in the image plane of FIG. 30A.

Since most human gesture motions involve rotations, it is important to design and implement a camera geometry so that rotations of gestures in all directions are captured. In some embodiments, three cameras oriented in three orthogonal directions are used to capture the gesture motions. In other embodiments, as shown in FIG. 31, two cameras are sufficient to capture the 3-D motions.

FIG. 31 is a diagram of a 3-D gesture recognition system 2000, in accordance with an embodiment. In this embodiment concept, the 3-D gesture recognition system 2000 employs two synchronized cameras 2004, 2006 that are in communication with, for example, synchronized with, each other. In other embodiment concepts, the number of synchronized cameras is greater than two. The first camera 2006 is placed in front of the user. The second camera 2004 is mounted on the LED lamp system 2002, more specifically, a gimbal platform similar to or the same as a gimbal in accordance with other embodiments herein, so that its LOS is parallel to that of the LED lamp system 2002. In some embodiments, the LED lamp system 2002 is steered to the 45 degrees position by a hand gesture, for example, a hand gesture made at a control spot. The image plane has equal components in both x-z and y-z planes. In other embodiments, the angular position is not limited to 45 degrees. Motion in the x-y plane is captured by the front camera 2006. Motions in x-z and y-z planes are captured by the overhead camera 2004. Thus 3-D gesture motion can be obtained by these two cameras 2004, 2006. The two cameras 2004, 2006 synchronize in order to correlate the 3-D gesture motion.

Figure 32:
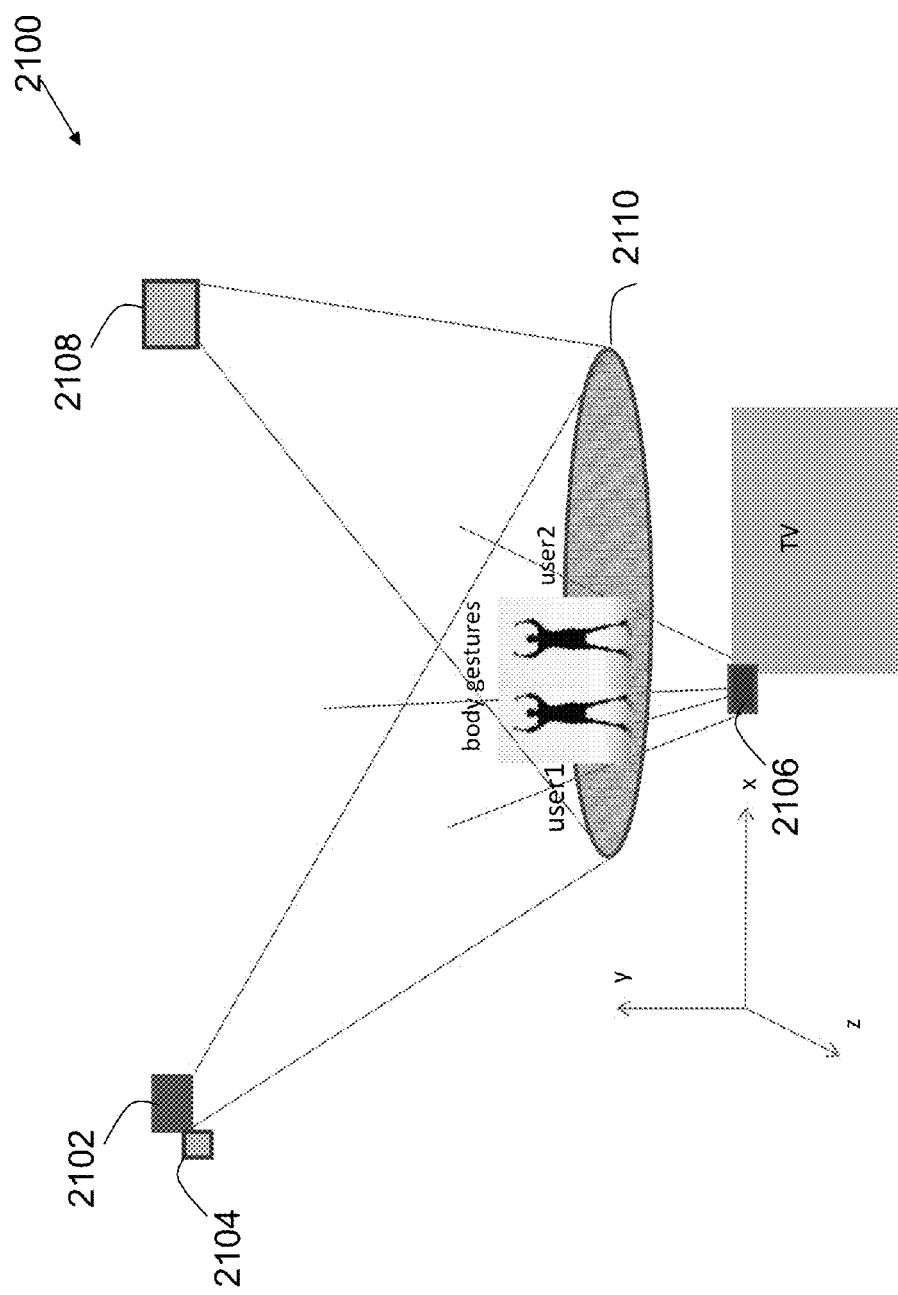
FIG. 32 is a diagram of a 3-D gesture recognition system for multiple players, in accordance with another embodiment.

For multiple users playing the 3-D video game at the same time, one user may block the camera view of gesture of another user. A second overhead camera is needed. As shown in FIG. 32, a 3-D gesture recognition system 2100 can include three synchronized cameras 2104, 2106, and 2108 can be employed.

The front camera 2106 and overhead cameras 2104, 2108 are constructed and arranged to each include visible and/or thermal dual band cameras. Since the user is in an illumination spot 2110 when playing video game, the LED lamp system 2100 provide good quality lighting for the visible channel. Because white LEDs have very little spectrum in the infrared, the light from the LED lamp system 2100 will not interfere with the thermal channel.

Figure 33:
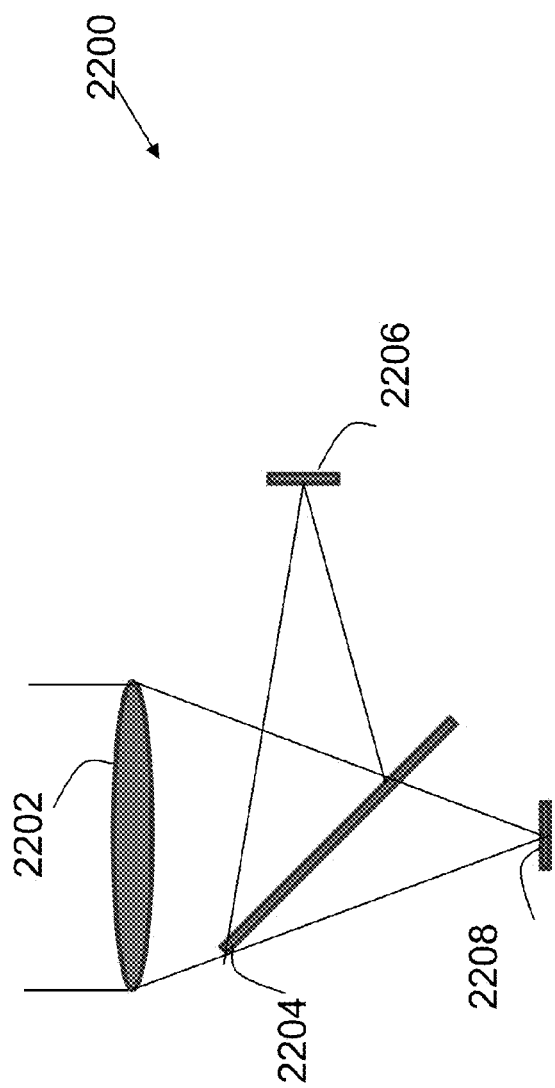
FIG. 33 is an optical design diagram of a gesture recognition camera, in accordance with another embodiment.

FIG. 33 is a diagram of a camera 2200, in accordance with another embodiment. The camera 2200 can be implemented in one or more applications such as a video game application, for example, described herein. The camera 2200 can be the same as or similar to other cameras referred to herein, for example, the overhead camera 2104 referred to in FIG. 32. The camera 2200 can comprise a lens 2202, a beam splitter 2204, a visible focal plane array (VISFPA) 2206, and a thermal detector array 2208. The lens 2202 can comprise a Cleartran material or the like for transmitting both visible and infrared light. In some embodiments, the thermal detector array 2208 can be low cost and low resolution thermopile detector arrays. In some embodiments, one or more cameras can comprise a high-resolution uncooled infrared detector array.

Figure 35A:
FIG. 35A is a diagram of an image of a high resolution visible image, in accordance with an embodiment.
Figure 35B:
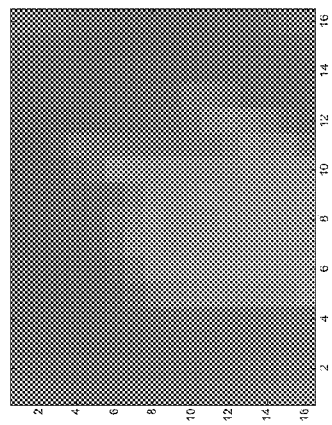
FIG. 35B is a diagram of a low resolution thermal image, in accordance with an embodiment.
Figure 36:
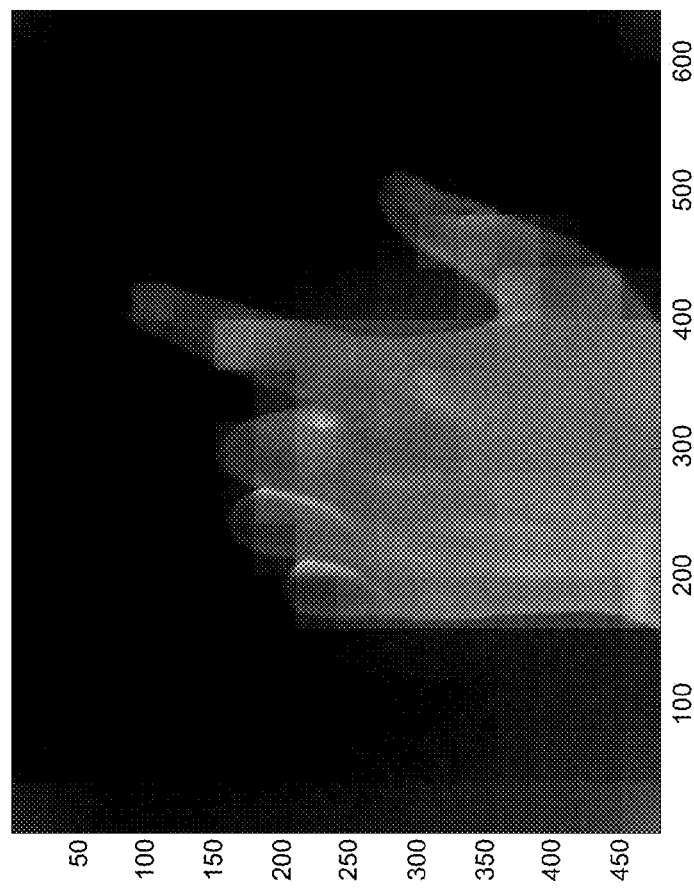
FIG. 36 is a diagram of a thermal and visible image, in accordance with an embodiment.

With respect to a thermal image, the human body, e.g., 36° C., can be perceived as relatively hot relative to the ambient thermal background, e.g., 25° C. Thus, thermal images of gestures have high contrast. The thermal background is usually simple because most of the scene contents are at ambient temperature. The gesture to background contrast in the visible spectrum depends on the relative reflectance. The background reflectivity can vary and can be complicated. The resulting contrast therefore varies. Thermal detector arrays are expensive. Visible FPAs are cheap. To lower the cost, a low resolution thermopile detector array and high resolution visible FPA can be employed in some embodiments. In order to be able to see the same scene in the thermal and visible channels, equal field of view (FOV) of both channels is required in the embodiment. The high contrast and low resolution thermal image will highlight the gesture region. The high resolution visible image will add details in the gesture region. To demonstrate this concept, a low resolution thermal image with 16×16 pixels can be generated from a high resolution visible image 2410 as shown in FIG. 35A. The reflectance of the background is higher than that of the hand in the visible picture. In a thermal image of the same scene, the hand is hotter than the ambient background. Based on these, a crude thermal image can be simulated using the following procedures. The high resolution visible image is first down sampled to a 16×16 image. The resultant image is subtracted from a flat image at 256 grayscale. The subtracted image is the low resolution thermal image 2420 as shown in FIG. 35B. Here, the hand is shown as being "hotter", or otherwise more visible to the user, than the background. However, the thermal image shown in FIG. 35B does not have enough resolution to give detail of the hand. However, it provides a region where the hand is contained. Once this region is known, details of the hand can be extracted from the visible image. This is evident from the fused thermal and visible image 2430 of FIG. 36.

Figure 34A:
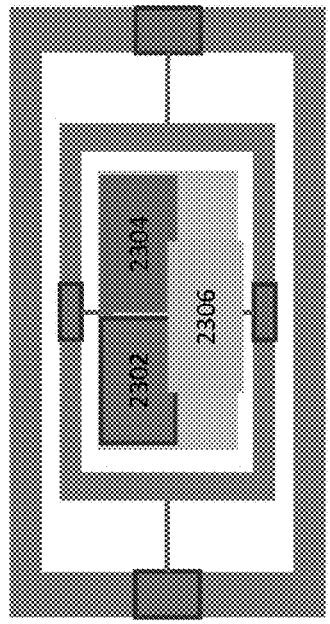
FIG. 34A is a modules diagram on the beam steering mechanism platform of a lamp system with illumination, optical wireless communications, and controller-free video game capabilities, in accordance with an embodiment; illumination light is used for optical wireless communications.
Figure 34B:
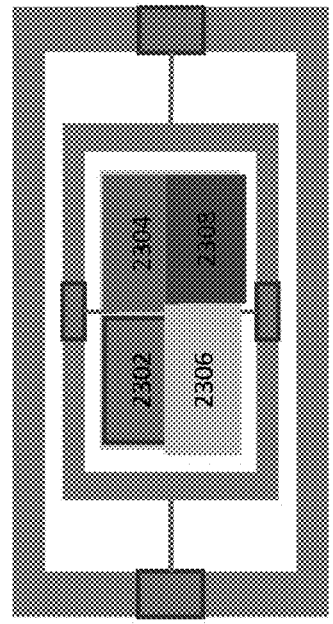
FIG. 34B is a modules diagram on the beam steering mechanism platform of a lamp system with illumination, optical wireless communications, and controller-free video game capabilities, in accordance with another embodiment; non-illumination light is used for optical wireless communications.

When optical wireless communications and 3-D gesture based video game capabilities are added to system 100, the number of modules on the gimbal platform will increase. For optical wireless transmitter using illumination light, three modules are on the platform. They can include but not be limited to a light source module, a tracking and control module, and an overhead camera. These elements are shown and described herein and descriptions thereof are not repeated for reasons related to brevity. This is illustrated by way of example in FIG. 34A. For a optical wireless transmitter using non-illumination light, four modules are on the platform. They can include but not be limited to the light source module, the tracking and control sensor, the optical wireless transmitter, and the overhead camera. This is illustrated by way of example in FIG. 34B.

Figure 37:
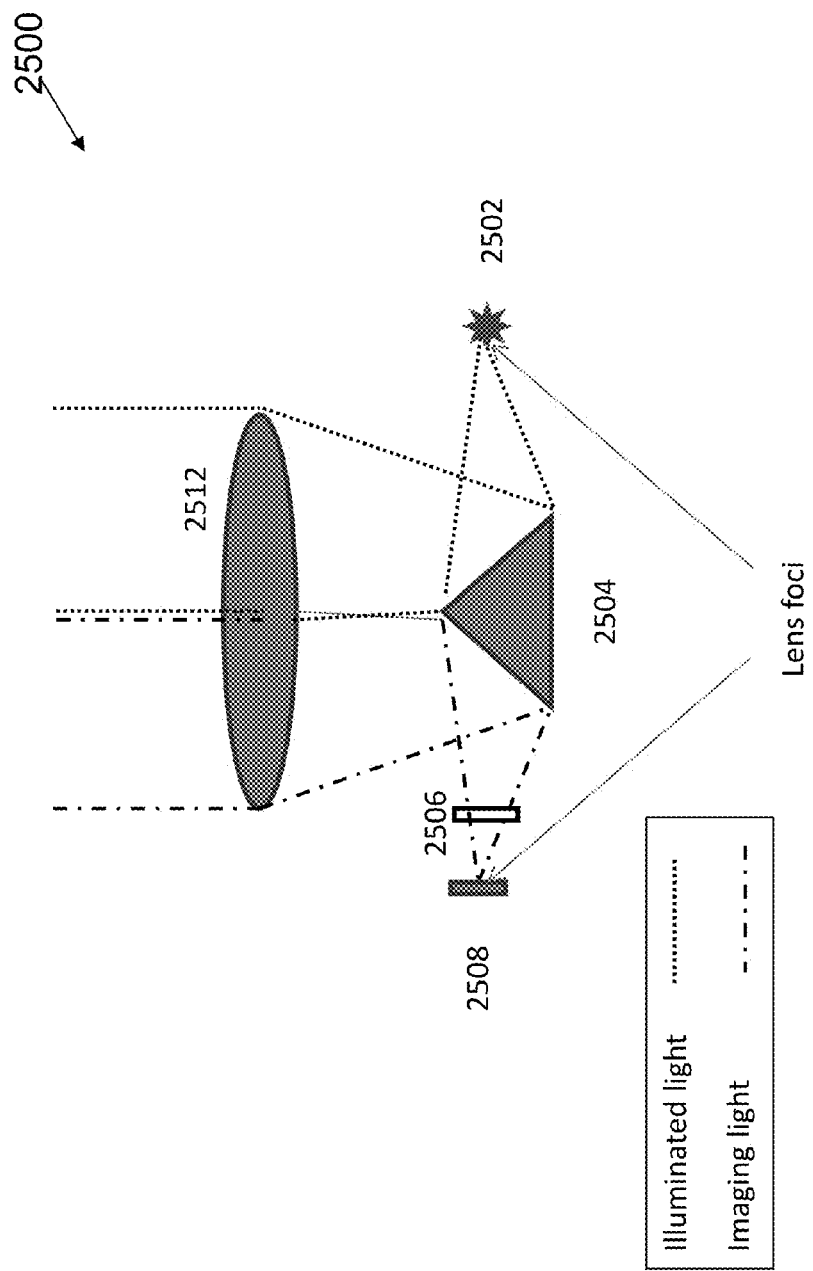
FIG. 37 is a side view of elements of a multispectral flashlight camera, in accordance with an embodiment.
Figure 38:
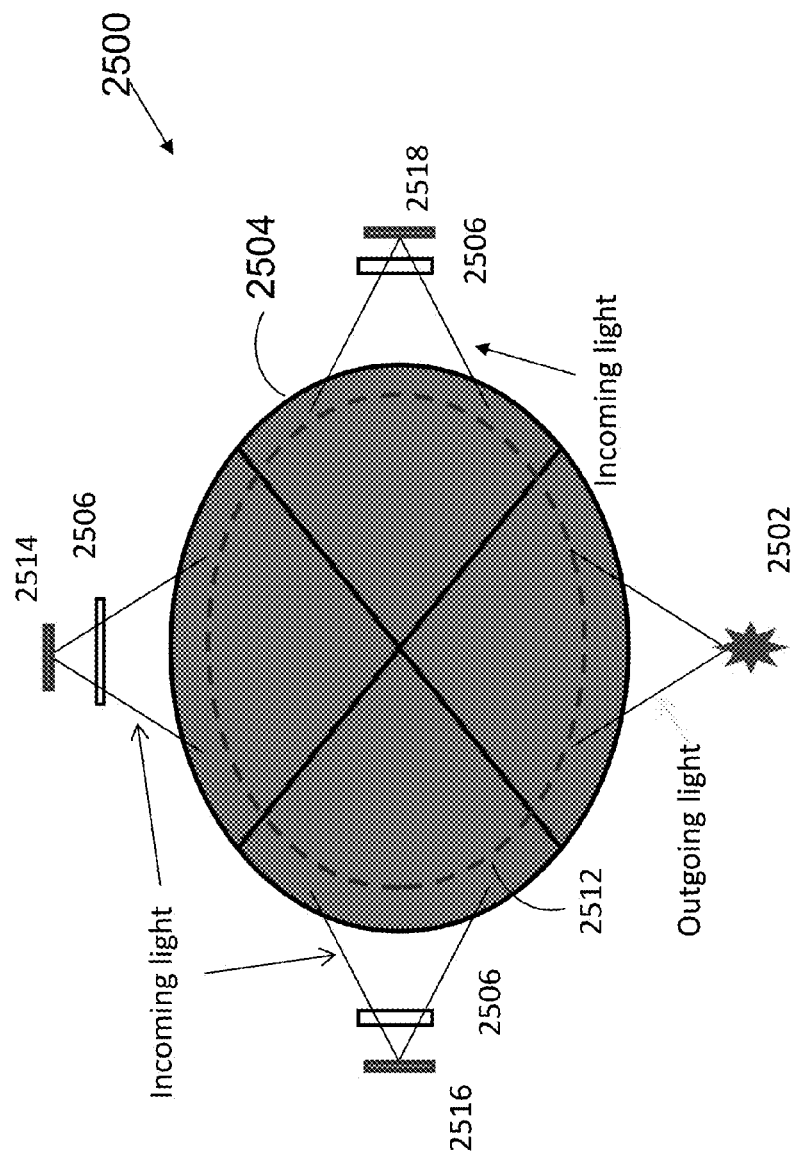
FIG. 38 is a top view of the elements of the multispectral flashlight camera of FIG. 37.
Figure 39:
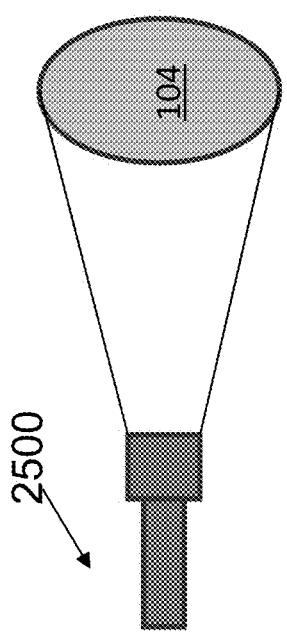
FIG. 39 is a diagram illustrating an operation of the multispectral flashlight camera of FIGS. 37 and 38.
Figure 40:
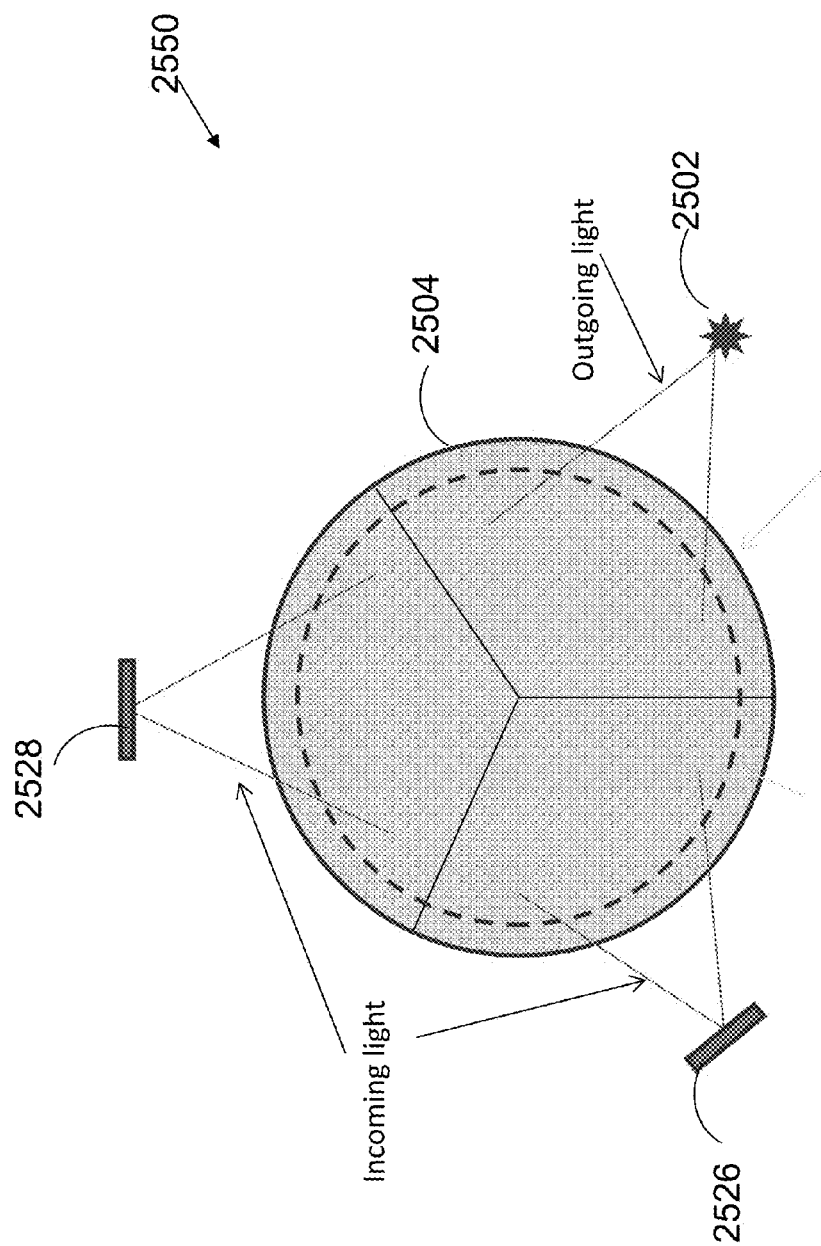
FIG. 40 is a top view of elements of a flashlight camera, in accordance with another embodiment.

FIG. 37 is a side view of elements of a multispectral flashlight camera 2500, in accordance with an embodiment. FIG. 38 is a top view of elements of the multispectral flashlight camera 2500 of FIG. 37. FIG. 39 is a diagram illustrating an operation of the multispectral flashlight camera 2500 of FIGS. 37 and 38. FIG. 40 is a top view of elements of a flashlight camera 2550, in accordance with another embodiment.

The integration of camera technology and functionality into a flashlight is desirable because it can enable a user to take a picture of a target he/she shines a light on. In current flashlight camera technology, LEDs are arranged around the perimeter of the camera. Light from the LEDs shine on the target and the camera captures its image. However, in such designs, the field of view of the camera may not coincide with the LED light cone produced by the LEDs arranged around the perimeter of the camera. Accordingly, dark regions, or regions of diminished light intensity, may be present in the resulting camera image due to the mismatch. Furthermore, an image in only one spectral band is available.

The multispectral flashlight camera 2500 can employ features of the embodiments of the present inventive concepts, for example, those described with respect to FIGS. 22-24. Accordingly, elements of the multispectral flashlight camera 2500 may be the same as or similar to those described in other embodiments, and will therefore not be repeated for brevity.

In some embodiments, a camera aperture lens is shared by illumination sources and imaging detector arrays at the foci of the lens through aperture splitting using a pyramid mirror. These detector arrays are called focal plane arrays (FPAs). Because they share the same aperture and have the same focal lengths, the illumination area is the image of the FPAs. Therefore, the camera sees only the illumination area, and therefore the entire, full image will be illuminated. Because aperture splitting can accommodate multiple sources and FPAs, a multispectral flashlight camera can be constructed. A multispectral flashlight camera allows the user to access images of the same scene at different spectral bands. It can be used for material detection such as detection of homemade explosives (HME). A long wave infrared (LWIR) channel can be used to perform a variety of applications, for example, related to disturbed earth detection for buried improvised explosive devices (IEDs). It can also be used for vehicle and industrial inspection.

In some embodiments, the multispectral flashlight camera 2500 comprises an aperture lens 2512, a pyramid mirror 2504, one or more light sources 2502, two or more FPAs 2514, 2516, 2518, each operating in a different light wave spectrum, filter wheels 2506 with filters at various spectral bands, power. The flashlight camera 2500 can also include processing electronics for image acquisition and processing, for example, described herein. The flashlight camera 2500 can comprise a power source, such as one or more batteries for supplying power to the flashlight camera.

In some embodiments, the lens 2512 is made of a Cleartran material which transmits visible to long wave infrared (LWIR) light. In other embodiments, the lens 2512 can be made of other infrared materials that transmit the same light spectrum. In some embodiments, the pyramid mirror 2504 has three or more facets. In some embodiments, the half cone angle of the pyramid 2504 is 45 degrees. In other embodiments, the cone angle can be different. In some embodiments, each of the filter wheels 2506 can be configured to have two or more bandpass filters.

As shown in FIG. 38, one light source 2502 and three FPAs 2514, 2516, 2518 are provided. The light source 2502 can be a board band source such as tungsten lamp. The light source 2502 can be similar or the same as a light source in accordance with embodiment, for example, described herein. FPA 2514 can be in the visible band, FPA 2516 can be in the short wave infrared (SWIR) band, and FPA 2518 can be in the LWIR band.

As shown in FIGS. 37 and 38 the light from a light source 2502 exits a lens 2512 and illuminates a target, for example, target region 104 shown in FIG. 39. The reflected light from the target enters the same lens 2512. However, only a fraction of the light, for example, 25% of the light, enters any one of the FPAs 2514, 2516, 2518 due to beam splitting or the like. The filter wheels 2506 allow the camera 2500 to have enhanced spectral resolution and more spectral bands. FIG. 39 illustrates an operation of a camera. The illumination spot coincides with the imaging spot.

The embodiment in FIG. 40 comprises a visible channel 2526, an uncooled thermal channel 2528, and a LED light source 2502. This flashlight camera 2550 allows a user access both visible and thermal images of the same illuminated target. Because visible LEDs don't have emission beyond 700 nm, the thermal channel 2526, for example, above 8000 nm, will only see emitted infrared light from the target.

While the present inventive concepts have been particularly shown and described above with reference to exemplary embodiments thereof, it will be understood by those of ordinary skill in the art, that various changes in form and detail can be made without departing from the spirit and scope of the present inventive concepts.

What is claimed is:

1. A light-emitting device control system, comprising:
a beam steering mechanism that directs a beam of light at a first surface location, wherein an illumination region is formed at the first surface location in response to the directed beam of light;
a sensor that recognizes a hand gesture only at a control spot identified by color light that is different than, smaller than, and a portion of a size of, the illumination region, wherein the sensor detects a presence of the hand gesture by hand temperature or skin color;
a processor that converts data related to the hand gesture at or near the control spot into a command signal;
a controller that instructs the beam steering mechanism to move the illumination region to a second surface location in response to the command signal corresponding to the hand gesture in the control spot; and
a control spot generator that generates the control spot for providing a region at a specific position for the hand gesture allowing the sensor to recognize the hand gesture only in the region at the specific position for the hand gesture; and
a light source module that outputs the beam of light to the beam steering mechanism for directing the beam of light to at least one of the first surface location and the second surface location, wherein the light source module comprises the control spot generator, and wherein the light source module further comprises a lens, a light source, and a partial filter having a color filtered region and an unfiltered region, wherein the control spot is formed by the color filtered region, the illumination region is formed by the unfiltered region, wherein the partial filter is at a focal plane of the lens, and wherein the control spot provides the region at the specific position for the hand gesture to be recognized as a command corresponding to the command signal.

2. The control system of claim 1, wherein the control spot generator includes a three-colored light emitter diode (LED) comprising a light pipe assembly having an exit port and three LEDs having various colors, wherein the light source module includes a lens, and wherein the light pipe assembly transports light from the three LEDs to the exit port of the light pipe assembly at a focal plane of the lens.

3. The control system of claim 1, wherein the control spot generator includes a control spot LED comprising a single or multi-colored LED at a focal plane of a light source of the light source module.

4. The control system of claim 1, wherein the sensor detects a presence of a hand making the hand gesture at the control spot, and wherein the beam steering mechanism moves the illumination region to the second surface location in response to the hand gesture.

5. The control system of claim 1, wherein the light source module comprises:
a plurality of LEDs that generate the beam of light;
a lens;
the control spot generator; and
narrow-beam optics that generate a narrow beam from the LEDs to maximize a throughput of light output via the lens.

6. The control system of claim 1, wherein the beam steering mechanism includes a two-axis gimbal on which are mounted the light source module and the sensor for steering a line of sight (LOS) of the light source module and the sensor module, and wherein the two-axis gimbal can be of a pitch-yaw type, a pitch-roll type, or yaw-roll type.

7. The control system of claim 1, wherein the beam steering mechanism comprises a mirror and a gimbal that adjusts gimbal angles of the mirror to steer a LOS of a light source generating the beam of light.

8. The control system of claim 7, wherein the gimbal includes an outer ring and an inner ring, and the beam steering mechanism includes a motor on the outer ring and rotates the inner ring about an axis, wherein the mirror is positioned in the inner ring, and the beam steering mechanism includes a motor that moves the mirror about an axis relative to the inner ring.

9. The control system of claim 1, wherein the beam steering mechanism comprises two refracted wedge prisms that rotate relative to each other, and wherein a deviation angle of the light beam from a horizontal axis is obtained by rotating the two wedge prisms relative to each other, and an azimuth angle of the light beam is obtained by rotating both wedge prisms in the same direction.

10. The control system of claim 1, wherein the beam steering mechanism includes a micro-electrical-mechanical system (MEMS) mirror array comprising a set of individual mirror elements, and wherein each mirror element has two axes of rotations.

11. The control system of claim 1, wherein the tracking and control sensor comprises a thermal imager having a linear or area focal plane array (FPA), and wherein the tracking and control system further comprises a scan mirror for the linear array.

12. The control system of claim 1, wherein the tracking and control sensor includes a lens that transmits both visible and thermal light, a thermal detector or array, and a visible FPA coupled to the thermal detector or array, the visible FPA positioned between the thermal detector or array and the lens.

13. The control system of claim 1, wherein the tracking and control sensor comprises a thermal sensor and a visible camera for capturing an image of a hand making the hand gesture and recognizing the hand gesture, and wherein the thermal sensor comprises a lens and a thermal detector.

14. The control system of claim 13, wherein the visible camera is outside the beam steering mechanism and the thermal sensor is inside of the beam steering mechanism.

15. The control system of claim 13, wherein the thermal sensor distinguishes a temperature of a hand at the illumination region from a background temperature, and the processor generates the command signal from thermal image data corresponding to the hand.

16. The control system of claim 1, wherein the sensor comprises a skin detection sensor and a three-colored light emitting diode (LED) that illuminates the hand gesture at the control spot at the illumination region, wherein the skin sensor senses the presence of a human hand by analyzing reflected light from the human hand.

17. The control system of claim 16, wherein the skin detection sensor comprises a multi-color LED source for illuminating human skin at the control spot and a radiometric calibrated camera assembly or radiometer that measures reflectance at a control spot at the illumination region from the reflected light of the LED source.

18. The control system of claim 17, wherein the multi-color LED source comprises a plurality of LEDs, each operating at a different wavelength, wherein two LEDs are near infrared (NIR) LEDs, the system further comprising a control spot generator at the exit port of a light-pipe assembly.

19. The system of claim 18, wherein the light-pipe assembly comprises three input light pipes and an output light pipe, wherein an LED of the plurality of LEDs is at an entrance of one of the three input light pipes, the output light pipe is bonded to a blank filter position at a focal plane of the light source module, an exit port of the output light pipe faces the beamsplitter and a lens.

20. The control system of claim 18, wherein NIR images generated by the an imaging sensor of the skin detection sensor are employed to suppress or eliminate a hand gesture background, wherein the processor determines a ratio of NIR images provided by the two NIR LEDs to distinguish the hand gesture background from the hand gesture.

21. The control system of claim 1, further comprising a camera that captures an image at a control spot at the illumination region, the image including an image of the hand gesture and background data of the hand gesture.

22. The control system of claim 21, wherein the processor converts the data related to the hand gesture into the command signal by removing the background data of the hand gesture from the image, processing the image of the hand gesture, comparing the processed image of the hand gesture with a set of stored hand gesture images, and generating the control signal in response to a match between the processed image of the hand gesture and a stored hand gesture image.

23. The control system of claim 21, wherein the camera captures a plurality of images of a motion of the hand gesture, and wherein the processor converts the data related to the hand gesture into the command signal by subtracting images of the hand gestures to remove the background data from the images.

24. The control system of claim 1, further comprising a multi-face pyramid mirror that divides the focusing beam of the lens into equal focusing sub-beams and directs the sub-beams in different directions, and wherein the multi-face pyramid mirror is a three-face mirror that directs the sub-beams in three different directions.

25. The control system of claim 24, wherein a visible focal point array is positioned at a focus of a first sub-beam, a thermal detector or array is placed at a focus of a second sub-beam, and an LED or an exit port of a three-color LED light pipe is positioned at a focus of a third sub-beam, allowing an illumination of a target and a capturing of a visible image and a thermal image of the target at the same time.

26. The control system of claim 1, wherein the light-emitting device control system is constructed and arranged in an optical wireless communications network, and wherein the beam steering mechanism moves the illumination spot to a location for both illumination and optical wireless communications, the light of the illumination spot is for both illumination and communication and for carrying data that is received by an optical wireless device positioned at the location of the illumination spot, wherein the illumination light and communication light can be from the same light source or from separate light sources, wherein the wireless communication light source is a laser or an LED light source providing a spectrum in the visible or infrared range, and wherein the light source decouples illumination light from communication light allowing an adjustment of an illumination light level without affecting the optical wireless communications.

27. The control system of claim 1, wherein the light-emitting device control system is constructed and arranged in an optical wireless communications network, wherein the beam steering mechanism moves the illumination spot to a location, wherein the control system generates a transmitter beam spot that intersects at least a portion of the illumination spot, the transmitter beam spot including data that is received by a optical wireless device positioned at the first surface location of the illumination spot, wherein an optical wireless transmitter is mounted at a light source platform, the transmitter beam spot and the illumination spot moving together from the first surface location to the second surface location.

28. The control system of claim 1, wherein the light-emitting device control system is constructed and arranged in a controller-free video game system that uses players' gestures and gesture motions as commands for the video game, the system including a plurality of visible-thermal dual-band cameras to capture the gestures, the cameras arranged in orthogonal directions to capture 3-dimensional gesture motions, wherein the illumination region provides lighting for a visible camera of the visible-thermal dual-band cameras.

29. The control system of claim 28, wherein the cameras include two cameras when a single player uses the controller-free video game system.

30. The control system of claim 28, wherein the cameras include three cameras when multiple players use the controller-free video game system.

31. The control system of claim 1, wherein the light source module outputs the beam of light in the visible light spectrum or other light spectrum.

32. The light-emitting device control system of claim 31, wherein the other light spectrum includes infrared light.

33. A multi-spectral flashlight camera, comprising:
a pyramid mirror;
a light source;
two or more focal plane array (FPA) devices, each operating in a different light wave spectrum;
an aperture lens shared by the light source and the FPA devices at a foci of the lens, wherein light from the light source exits the aperture lens and forms an illumination area relative to a target, wherein reflected and emitted light from the target enters the aperture lens, wherein the pyramid mirror divides the received light so that a percentage of the received light via the aperture lens enters an FPA device of the two or more FPA devices, and wherein the illumination area and an image area corresponding to the FPA devices are at a same area, each FPA device seeing the target at a different spectrum allowing an illumination and capture of multi-spectral images of the target at the same time; and
processing electronics for image acquisition and processing.

34. The multi-spectral flashlight camera of claim 33, further comprising a filter wheel having multiple bandpass filters, and wherein the FPA devices include a visible band, a short wave infrared band, and a long wave infrared band.

35. A multi-spectral flashlight camera, comprising:
a pyramid mirror;
an LED light source;
a visible channel;
an uncooled thermal channel;
an aperture lens that is shared by the light source, the visible channel, and the uncooled thermal channel at a foci of the lens allowing illumination and capture of visible and thermal images of a target at the same time, wherein light from the LED light source forms an illumination area relative to the target, wherein an illumination area and an image area corresponding to the uncooled thermal channel and visible channel are at a same area, wherein the light from the light source is redirected by the pyramid mirror and exits the aperture lens and illuminates a target, and wherein the visible image is provided by the reflected light of the illuminated target, the pyramid mirror redirects the reflected target light received via the aperture lens into the visible FPA device of the visible channel and wherein the thermal image is provided of the self-emission target, the pyramid mirror redirects the thermal light into the thermal FPA device of the thermal channel; and
processing electronics for image acquisition and processing.

36. A light-emitting device control system, comprising:
a beam steering mechanism that directs a beam of light at a first surface location, wherein an illumination region is formed at the first surface location in response to the directed beam of light;
a sensor that recognizes a hand gesture only at a control spot identified by color light that is different than, and a portion of a size of, the illumination region, wherein the sensor detects a presence of the hand gesture by hand temperature or skin color;
a processor that converts data related to the hand gesture at or near the control spot into a command signal;
a controller that instructs the beam steering mechanism to move the illumination region to a second surface location in response to the command signal corresponding to the hand gesture; and
a control spot generator that generates the control spot for providing a region at a specific position for the hand gesture allowing the sensor to recognize the hand gesture only in the region at the specific position for the hand gesture, wherein the light-emitting device control system is constructed and arranged in an optical wireless communications network, and wherein the beam steering mechanism moves the illumination spot to a location for both illumination and optical wireless communications, the light of the illumination spot is for both illumination and communication and for carrying data that is received by an optical wireless device positioned at the location of the illumination spot, wherein the illumination light and communication light can be from the same light source or from separate light sources, wherein the wireless communication light source is a laser or an LED light source providing a spectrum in the visible or infrared range, and wherein the light source decouples illumination light from communication light allowing an adjustment of an illumination light level without affecting the optical wireless communications.

* * * * *

UNITED STATES PATENT AND TRADEMARK OFFICE
CERTIFICATE OF CORRECTION

| | |
|---|---|
| PATENT NO. | : 9,587,804 B2 |
| APPLICATION NO. | : 13/826177 |
| DATED | : March 7, 2017 |
| INVENTOR(S) | : Chen |

It is certified that error appears in the above-identified patent and that said Letters Patent is hereby corrected as shown below:

In the Claims

Column 30, Line 35, Claim 20, delete the first instance of the word "the" before the word "an".

Signed and Sealed this
Twenty-fifth Day of April, 2017

Michelle K. Lee
*Director of the United States Patent and Trademark Office*